United States Patent
Zachary et al.

(10) Patent No.: US 6,427,142 B1
(45) Date of Patent: *Jul. 30, 2002

(54) INTELLIGENT AGENT WORKBENCH

(75) Inventors: Wayne W. Zachary, Ft. Washington; Jean-Christophe Le Mentec, Horsham; Serge Schremmer, Blue Bell; James Stokes, Warminster; Joan M. Ryder, Maple Glen; James H. Hicinbothom, Harleysville; Monica Weiland; William Weiland, both of Flourtown, all of PA (US)

(73) Assignee: Chi Systems, Inc., PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/003,489

(22) Filed: Jan. 6, 1998

(51) Int. Cl.$^7$ .......................... G06F 17/00; G06F 15/18

(52) U.S. Cl. .................. 706/49; 45/46; 45/47; 45/60; 45/11; 45/61

(58) Field of Search .............................. 706/45–47, 49, 706/60, 61, 11

(56) References Cited

U.S. PATENT DOCUMENTS

| | | | | |
|---|---|---|---|---|
| 5,388,189 A | * | 2/1995 | Kung | 706/45 |
| 5,555,346 A | | 9/1996 | Gross et al. | 706/45 |
| 5,586,218 A | | 12/1996 | Allen | 706/12 |
| 5,638,494 A | * | 6/1997 | Pinard et al. | 709/202 |
| 5,706,406 A | | 1/1998 | Pollock | 706/51 |
| 5,727,175 A | | 3/1998 | Malone et al. | 345/356 |
| 5,787,409 A | | 7/1998 | Seiffert et al. | 706/45 |
| 5,809,492 A | | 9/1998 | Murray et al. | 706/45 |
| 6,012,152 A | * | 1/2000 | Douik et al. | 714/26 |

OTHER PUBLICATIONS

Zachary, W. W., "Cognet and Baton: an integrated approach to embedding user models in complex systems", IEEE ICCS, Systems, Man and Sybernetics, Oct. 1991.*

Yang et al, "A Proposed Framwork for Intelligent Systems Based on Multi–Agent Conception", IEEE International Conference on Intelligent Processing Systems, Oct. 1997.*

Virginia Tech, "GOMS at a Glance . . . ", CS5724: Models and Theories of Human–Computer Interaction, downloaded from the web at <http://ei.cs.vt.edu/~cs5724/g2/glance.html> on Nov. 6, 2000, 1996.*

(List continued on next page.)

Primary Examiner—George B. Davis
(74) Attorney, Agent, or Firm—Schnader Harrison Segal & Lewis LLP

(57) ABSTRACT

An intelligent agent workbench is disclosed for developing a computer-based intelligent agent that can be inserted between a system and an individual performing a predefined function with the system and/or that can supplant such function performed by such individual. In the workbench, an agent author allows a workbench user to create and modify an intelligent agent in a graphical representation. The workbench also has an execution engine for executing a non-graphical representation of the agent both within the workbench and outside the workbench as a stand-alone agent, and an interpreter for automatically translating between the non-graphical and graphical representations. The agent has an instance structure representing a current problem instance, perception structures, task performance structures, and a priority structure. Each perception structure represents information perceived from the system, and includes sub-structures for obtaining information from the system and updating the instance structure therewith. Each task performance structure represents a task the agent can perform, and includes sub-structures for accessing the instance structure to obtain instance information, modifying instance information in the instance structure, and determining a priority for the task performance structure and notifying the instance structure of the determined priority.

37 Claims, 37 Drawing Sheets

OTHER PUBLICATIONS

Zachary et al., "Interface Agents in Complex Systems," in Ntuen, C. and Park, E.H. (Eds.) Human Interaction with Complex Systems: Conceptual Priciples and Design Practice, Kluwer Academic Publishers, 1996, pp. 35–52.*

Zachary et al., "GINA: A Workbech for Constructing New Agents," Proceedings of the Human Factors and Ergonomics Society 40th Annual Meeting, p. 864, 1996.*

Peters et al., "Integrating Agents into Virtual Worlds," Proceedings of the Workshop on New Paradigms in Information Visualization and Manipulation, 1998, pp. 69–74.*

Lester et al., "The Pedagogical Design Studio: Exploiting Artifact–Based Task Models for Construvist Learning," Proceedings of the 1997 International Conference on Intelligent User Interfaces, pp. 155–162.*

Rich et al., "Collagen: When Agents Collaborate with People," Proceedings of the 1997 1st International Conference on Autonomous Agents, pp. 284–291.*

"Verity Intelligent Agents Proactively Connect People with Information," PR Newswire, Sep. 12, 1996.*

"FTP Software: FTP Software Leads Market in Java–Based Mobile, Secure Intelligent Agents," M2 Presswire, M2 Communications, May 21, 1996.*

* cited by examiner

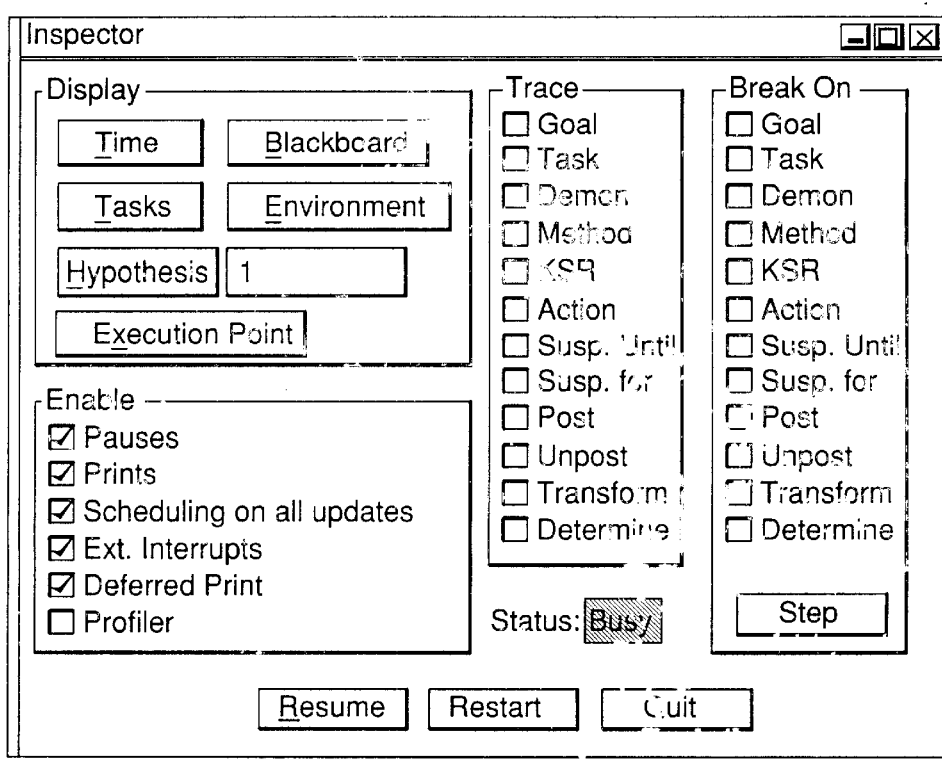

FIG. 39

```
Out log
blackboard_blackboard_name loaded.
INITIALIZATION Init_IPMS loaded.
TASK acknowledge_maneuver_completion loaded.
TASK Analyze_Situation loaded.
TASK Plan_Attack loaded.
TASK Plan-Approach loaded.
TASK Plan_to_Regain_Contact loaded.
TASK Attack_Target loaded.
TASK execute_maneuver loaded.
METHOD request_absolute_maneuver loaded.
METHOD request_maneuver loaded.
METHOD post _waypoint loaded.
METHOD update_range loaded.
METHOD update_expection loaded.
DETERMINE disambiguate_hearing loaded.
DETERMINE update_bearing loaded.
DETERMINE calculate_new_line-of-sight loaded.
DEMON TA-datum loaded.
DEMON own_ship_update loaded.
DEMON maneuver_complete loaded.
DEMON maneuver_initiated loaded.
DEMON SA-datum loaded.
Model size: 8612
Initializing ipms
```

FIG. 40

```
Out log
Run DEMON own_ship_update
Run DEMON own_ship_update
Run DEMON own_ship_update
Run DEMON own_ship_update
Run DEMON own_ship_update
Run DEMON TA_datum
Run DEMON TA_datum
Start TASK Analyze_Situation 1 at 12.000
   Start GOAL Process_new_TA_data
      Start GOAL Create_Designation
      Stop GOAL Create_Designation
      Start GOAL Try_to_Disambiguate
Interrupt TASK Analyze_Situation 1 at 12.000
in response to blackboard modification by METHOD request_abso
actical maneuver
Start TASK execute_maneuver 1 at 12.000
   Start GOAL Initiate_Maneuver
   Stop GOAL Initiate_Maneuver
Stop TASK execute_maneuver 1 at 12.000
Resume TASK Analyze_Situation 1 at 12.000
      Stop GOAL Try_to_Disambiguate
   Stop GOAL Process_new_TA_data
Stop TASK Analyze_Situation 1 at 12.000
Run DEMON own_ship_update
Run DEMON own_ship_update
Run DEMON maneuver_complete
Run DEMON maneuver_complete
Start TASK acknowledge_maneuver-completion 1 at 13.200

TASK acknowledge_maneuver-completion:pause
Program paused at : TASK acknowledge_maneuver-completion:GOAL
Loss_on_maneuver Run GOAL Anticipate_Contact_Loss_on Maneuver
   Start GOAL Anticipate_Contact_Loss_on_Maneuver
Program paused at: TASK acknowledge_maneuver_completion:GOAL
Loss_on_Maneuver:TRANSFORM
```

FIG.46

INTELLIGENT AGENT WORKBENCH

BACKGROUND OF THE INVENTION

The present invention relates generally to a system for generating an intelligent agent. More particularly, the present invention relates to such a system wherein a computer-based workbench for developing an intelligent agent in a complex domain is provided, where the workbench is based on the notion of developing the agent from a cognitive model of human experts performing the tasks to be assigned to the agent.

As is known, computers are increasingly being introduced as the vehicle for work, particularly information-based work which has traditionally been performed by manual methods. Computerization of the working environment has created many problems for new computer users, especially inasmuch as the user must possess a requisite amount of computer-system knowledge and skills as well as domain knowledge and skills, and the requisite computer-system knowledge and skills may very well be more substantial than the domain knowledge and skills. It has been suggested that the computer itself and specifically the human-computer interface (HCI) can and should help solve these problems.

Research has begun to create components of the user interface, called 'agents' or 'intelligent agents', that act to assist the human being in applying the functional capabilities of computer systems. Such agents can provide at least three main benefits to human operators of highly complex systems: (1) reducing the amount of interaction between human and system, particularly at the most detailed level, so that the human operator needs to devote less attention to low level syntax and/or interface details, and can instead focus on the overall situation and supervisory control; (2) freeing a human for other concerns and activities that humans are uniquely good at, including decision-making, situation assessment, goal-setting, etc.; and (3) reducing a user's requirements for training and knowledge, allowing the human operator to devote more training on domain knowledge and skills and less on computer-system knowledge and skills. Such agents are therefore able to operate autonomously within a software system and are able to perform complex tasks that normally require human intelligence.

However, to date, most research on intelligent agents has focused on applications such as electronic-mail management or electronic purchasing. Such applications are 'horizontal' in that they cut across many domains. Less research, particularly at a general or methodological level, has been devoted to intelligent agents for complex, domain-specific tasks. Such domain specific tasks form 'vertical' applications in that they are focused on a specific domain. Intelligent agent concepts and technology would be highly beneficial in vertical applications, perhaps even more so than in horizontal applications.

However, a major obstacle to development of intelligent agents in vertical applications is that such vertical applications are by their very nature highly complex and closely tied to specific task domains. Unlike horizontal applications, intelligent agents in vertical applications require substantial amounts of domain-specific and task-specific knowledge in order to be able to operate at a level of competence rivaling that of a human being. As should be understood, then, agent development can potentially be lengthy and costly. In addition, vertical applications are more numerous and yet limited in the number of end-users, with the result that the development cost per user can be high. A need exists, then, for a way of removing this obstacle.

BRIEF SUMMARY OF THE INVENTION

In a preferred embodiment of the present invention, the aforementioned need is satisfied by a computer-based intelligent agent workbench for developing a computer-based intelligent agent in a complex domain or system, where the intelligent agent interfaces between the system and an individual performing a pre-defined function in connection with the system The workbench is based on the notion of developing an agent from a cognitive model of human experts performing the tasks to be assigned to the agent.

In the workbench, an intelligent agent authoring tool allows a workbench user to create and edit an intelligent agent in a higher-level graphical representation. The workbench also has an execution engine tool for executing a lower-level non-graphical representation of the intelligent agent both within the workbench and outside the workbench as a stand-alone intelligent agent, and an interpreter tool for automatically translating between the lower-level non-graphical representation of the intelligent agent and the higher-level graphical representation of the intelligent agent.

The intelligent agent itself has an instance structure representative of a current problem domain, a plurality of perception structures, a plurality of task performance structures, and a priority structure. Each perception structure is representative of information that must be perceived from the system, and includes sub-structures for obtaining information from the system and for updating the instance structure with the obtained information.

Each task performance structure is representative of a task the intelligent agent can be called on to perform, and includes sub-structures for accessing the instance structure to obtain instance information, for modifying instance information in the instance structure, and for determining a priority for the task performance structure and notifying the instance structure of the determined priority. Each task performance structure has a triggering condition for triggering the task performance structure, where the triggering condition is based on a current state of the instance structure as updated by the perception structures. The priority structure determines priority among conflicting demands for attention by multiple task performance structures based on the respective determined priorities thereof.

BRIEF DESCRIPTION OF THE SEVERAL VIEWS OF THE DRAWINGS

The foregoing summary, as well as the following detailed description of a preferred embodiment of the present invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings:

FIGS. 39, 40, 41, 42, 43, 44, 45 and 46 are views showing the debugging graphical interface ('DGI') and the operation thereof in accordance with the preferred embodiment of the present invention.

DETAILED DESCRIPTION OF THE INVENTION

Figure 1:
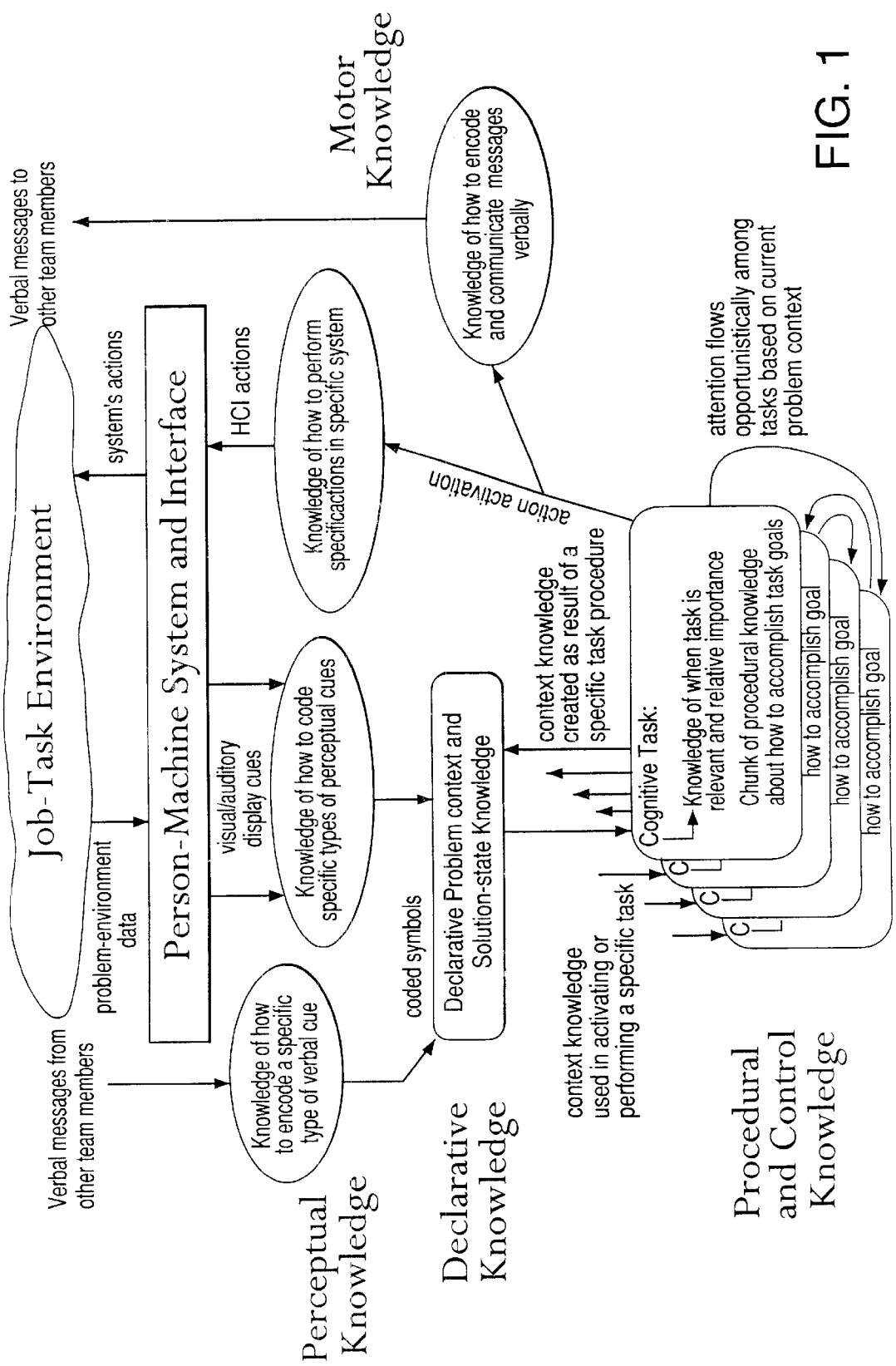
FIG. 1 is a block diagram showing a COGNET framework in accordance with a preferred embodiment of the present invention.

Certain terminology may be used in the following description for convenience only and is not limiting. The words 'left', 'right', 'upper', and 'lower' designate directions in the drawings to which reference is made. The words 'inwardly' and 'outwardly' are further directions toward and away from, respectively, the geometric center of a referenced object. The terminology includes the words above specifically mentioned, derivatives thereof, and words of similar importance.

The basic principle of the workbench of the present invention is that an intelligent software agent can be built most easily from a cognitive model of the human decision processes that are used to direct the entity of interest. This principle is operationalized through the use of the COGNET notation. COGNET (COGnition as a NEtwork of Tasks) is a descriptive framework that integrates all three levels of phenomena of interest in human performance in complex systems—cognition, perception, and action (including both motor and sensory activities).

Cognitive Modeling with COGNET

Briefly, COGNET is an integration of concepts and constructs from human engineering, cognitive science, and artificial intelligence, that provides: (1) a theory for understanding expertise-based, human real-time, multi-tasking performance; (2) a description language for modeling human competence in complex naturalistic domains; and (3) a methodology for collecting data and building user-models using the COGNET theoretical concepts and notation. COGNET and the COGNET framework are well-known and therefore need not be described in more detail than that which is set forth below.

In the COGNET framework, a person (or team) is assumed to be in a computer-mediated work-setting and pursuing some high-level goal or objective with regard to the external environment. The person/team has sensory/perceptual means to gain information about the environment, and some ability to take actions. Usually, the action space is defined by the computer-based system (e.g., telecommunications switch, factory automation system, flight control system) that is used by the person/team to accomplish their work in the external environment. Similarly, the ability to sense and perceive the environment (e.g., telephone call status, factory floor, aircraft trajectory) is usually mediated by the system, so that the system senses the environment and presents the information to the human user(s) in some other form (typically visual or auditory displays).

Within their overall work goal, the low-level or atomic actions of the person/team are undertaken as part of performing some higher-level activity, also called a cognitive task (e.g., join two phone calls, re-configure an assembly line, capture a flight plan waypoint). Some of these tasks compete for the person's attention, others may be complementary, and still others may need to be performed essentially in parallel. Each tasks represents a specific 'local' goal which the person may pursue in order to achieve or maintain some aspect of an overall, high-level goal. COGNET assumes that the problem solving process is constructive, and that there is no single, goal-directed procedure for achieving the overall goal; it is this lack of a clear 'top-down' procedure that make these problems difficult and complex. Each local goal corresponds to a 'chunk' of procedural knowledge. The way in which the procedure is instantiated, however, can be heavily dependent on the past evolution and/or current state of the problem, making the tasks very context-dependent. For example, the way in which a supervisor re-configures an assembly line may depend on which specific workers are on the line, what skills they have, and the repair status of all the available machines.

As procedures (as opposed to atomic actions or individual inferences), these high level cognitive tasks will typically involve a substantial sequence of behaviors, performed over some period of time. However, tasks may interrupt one another, and a given task may be interrupted and resumed several times as the person/team copes with the on-going sequence of real-time events in the external problem environment. Although the tasks may compete for attention, they ultimately work together in the aggregate to solve the overall problem-instance.

What unites the separate chunks of procedural knowledge into a global problem-solving strategy is their use of a common problem representation. This problem representation is declarative. It provides the problem-context information on which attention demands are mediated and task-performance is adapted. As a given activity is performed, the person gains knowledge about and/or makes inferences about the overall problem situation, and incorporates this information back into the problem representation. However, as the problem representation evolves, its changing contents can modify the relative priority among the activities competing for attention, allowing a new activity to capture the focus of attention. Much of the information about the problem is also gained directly from perceptual processes. COGNET allows individual problem solvers to cooperate through communication and coordination activities to achieve a common high-level goal. Any person/agent may communicate with other agents in its environment, and use the structure of the communication process both to enhance communication and to organize its own problem solving activity. The overall COGNET framework is pictured in FIG. 1. As should be evident, the cooperative process embodied in the framework often requires an internal representation of the team relationships and responsibilities, in addition to the representation of the problem being solved.

The framework in FIG. 1 integrates sensory/perceptual, cognitive, and motor level phenomena, and communicative/interactional phenomena as well. When applied to a given problem domain, COGNET provides a framework for building a complete description of the way in which experts perform in that domain. The components of the COGNET description language are:

- a notation to describe the representation of the current problem instance, including elements of its evolution and present inferred state. This notation is a generalized, multi-panel blackboard structure and its content is termed the Mental Model of the current problem situation.
- a notation for describing the information processing and associated person-machine interaction associated with each high-level Cognitive Task a person may perform. This notation is derived from the well-known GOMS notation, but includes extensions that allow for accessing and creating information in the problem representation (the 'blackboard', to be described below). Other extensions allow for the interruption, suspension, and subrogation of the current task to other tasks. Each Cognitive Task represents an independent chunk of procedural knowledge that can be activated by a triggering condition that is based on specific patterns in the Mental Model blackboard.
- a production rule notation for describing the independent processes (the 'Perceptual Monitors', to be described below) by which information, once registered by an agent's sensory mechanisms, is perceived and introduced into the current representation of the problem (i.e., the blackboard). These perceptual processes operate in parallel to the cognitive processes which carry out the cognitive tasks, and to the motor processes which execute atomic behaviors.
- a priority notation for describing how conflicting demands for attention by two or more tasks are resolved. The underlying attention process is the well-known Pandemonium process, as will be described in more detail below.

Problem Representation Blackboard

Figure 2:
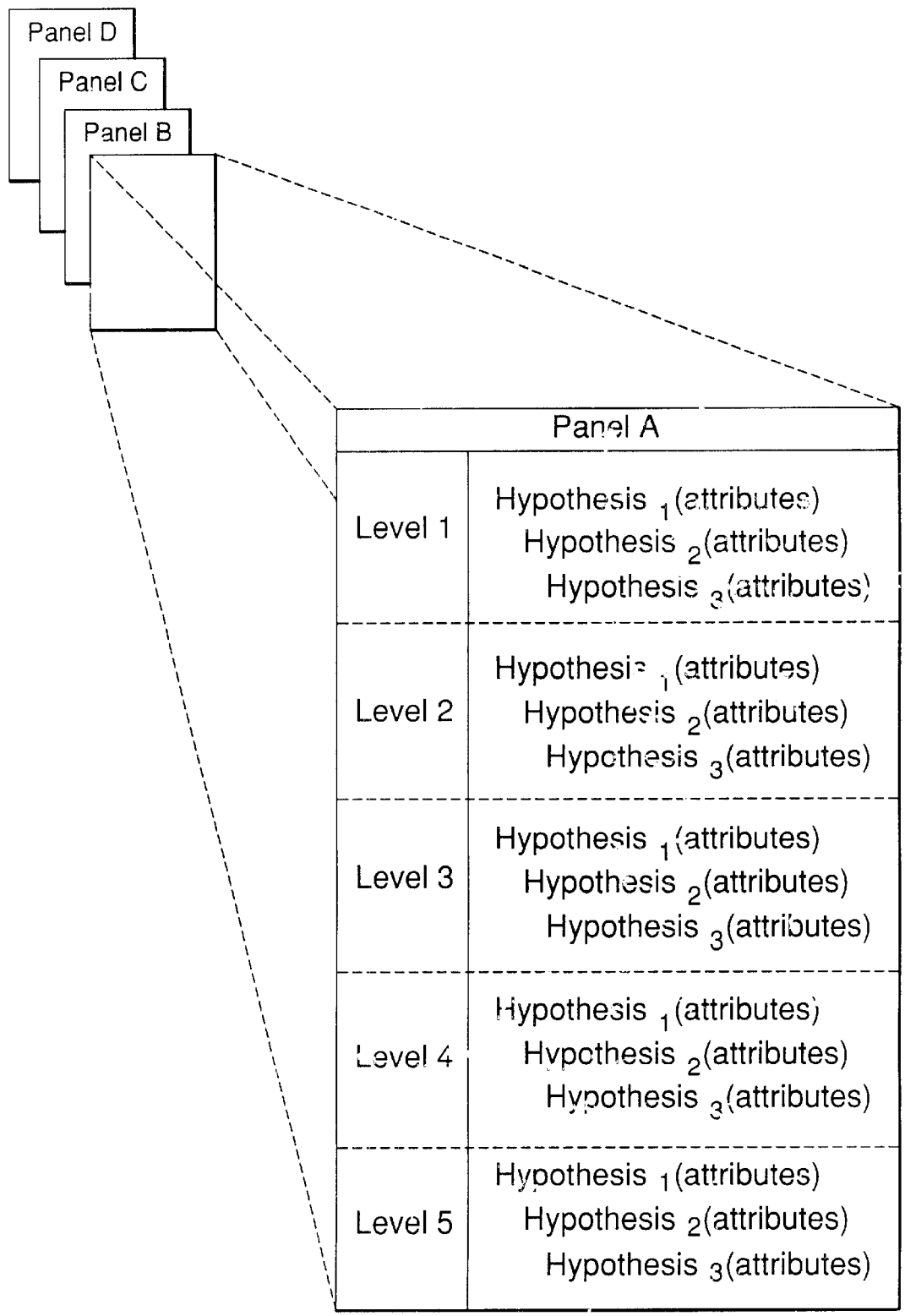
FIG. 2 is a block diagram showing a multi-panel blackboard structure employed with the preferred embodiment of the present invention.

A person's internal representation of the current problem-situation is formalized in COGNET using a blackboard structure, as seen in FIG. 2. Generally, a blackboard structure is a repository for declarative knowledge objects or hypotheses, organized into layers that correspond to increasing levels of abstraction. The blackboard may be organized into multiple panels, which correspond to different aspects of the problem (or problem solution) that each have their own abstraction hierarchy. Given the view in COGNET that the problem representation consists of declarative knowledge about the problem or situation, the blackboard structure proves an ideal means of knowledge representation.

On each level of a blackboard panel, there are posted specific symbolic concepts of facts which are collectively called 'hypotheses', each of which will have a different value for the attributes that define the kind of knowledge found at that panel-level. For example, on a 'tactical-situation' panel (in a military-based model, e.g.), one level may represent 'areas of concern'—places where a person believes there may be a threat of some sort (regardless of how those specific places came to be so considered). At that level, then, each hypothesis might have simple attributes including map coordinates, and possibly a type of threat hypothesized and time at which the hypothesis was formed.

In COGNET, the problem representation is unique to the problem domain, and to some degree, to the individual expert being modeled. Accordingly, there is no 'generic' blackboard content assumed in COGNET. Instead, the type of structure shown in FIG. 2 must be defined for each specific problem domain being modeled. This is done by defining first the blackboard panels, then the levels, and finally, the specific attributes that define the pieces of declarative knowledge posted at each panel-level location.

Task Level Notation

The purely declarative knowledge in the blackboard panels is contrasted to the purely procedural knowledge that is contained in the various cognitive tasks performed by experts in a given domain. As noted above, the COGNET notation for representing the procedural knowledge is an expansion of the widely used GOMS notation. The core of this notation is a goal hierarchy, in which each cognitive task is defined by a single top-level goal, and a hierarchy of sub-goals that must be accomplished in order to achieve that top-level goal. This goal/subgoal decomposition continues to the level at which specific operators are defined that, when executed, achieve the local subgoal. All of these elements—goals, subgoals, operators—can be linked to conditions that determine when, if, and how they will be carried out and applied. In many cases, there are chunks of activity that are common to several cognitive tasks. These can be 'packaged' into units called Methods. This portion of the structure is common to both COGNET and GOMS. In GOMS, however, there is no notion of problem representation nor attention, both of which are critical constructs in COGNET.

To provide a capability for realistic attention processes in which, for example, a task being performed can be interrupted by another task which is recognized to be more important in the current context, the basic GOMS notation is expanded to include attention 'triggers'. Each task has one or more triggers, which are situations under which it will begin to seek to become the focus of attention. These triggers are defined in terms of the problem representation, as Boolean expressions based on informational elements on the problem representation blackboard. Because the execution of cognitive tasks is also affected by the current problem situation, the GOMS notion of subgoal/operator conditions is analogously expanded in COGNET. Each subgoal or operator condition may also be a Boolean expression based on informational elements on the problem representation blackboard.

Unlike GOMS, which has no fixed operator set, COGNET provides a set of seven fixed operators which are used to represent the symbolic portions of all forms of cognitive tasks. Three of these provide the cognitive task with means to change the problem representation blackboard (as reasoning processes are completed). These three operators are Post (a hypothesis to the blackboard), Unpost (a hypothesis from the blackboard), and Transform (a hypothesis already on the blackboard). Two other operators—Suspend_For and Suspend_Until—relates to attention processes within cognitive tasks, allowing the task to 'go to sleep' until some expected condition or event occurs. Three other 'generic' operators, two of which deal with internal (i.e., cognitive ) operations and one of which deals with external (i.e., motor action) operations, are (respectively) Determine (used for symbolic operations), Calculate (used for numerical operations), and Perform_Action. These are used to construct domain-specific operators that correspond to the specific actions taken in a given domain, and the domain-specific reasoning processes developed by experts for dealing with that domain.

COGNET also includes operators for accessing the blackboard. The operators find, find_all, find_oldest, find_min, and find_max retrieve hypotheses from the blackboard. The operators select_first, select_all, select_oldest, select_min, and select_max search hypotheses. The operators attribute, link, all_links, creation_time, and last_update_time provide access to the data stored in hypotheses.

In addition, COGNET includes several computational operators such as are commonly found in computer languages, including numerical operators (addition, subtraction, etc.), boolean operators (logical and, or, etc.), variable operators (to create and modify variables and their values), and the like.

The COGNET task-level notation is shown as follows:
Goal: Goal name . . . Trigger_
    Goal: Subgoal name . . . Trigger
        Operators <. . . conditions>
            Perform_Action NAME<(accompanying data/parameters)>
            where NAME=any action operation
            Post hypothesis on blackboard
            Unpost hypothesis on blackboard
            Transform hypothesis on blackboard
            Suspend until condition
            Determine . . . (generic mental operator—e.g., find, display, calculate, decide, etc.)
where: Trigger is a Boolean pattern of blackboard information;
    Condition is a Boolean pattern of blackboard information; and
    Methods are commonly applied fixed (but contextualized) operators and subgoals.

When applying COGNET to a specific domain, the individual cognitive tasks in the task network are first identified, and then modeled using the above notation.

Perceptual Processes

The only perceptual processes of interest in a COGNET model are those that affect the contents of the problem representation blackboard. However, such events can occur at any time, and may occur in parallel with cognitive processes. Thus, perception is reduced in COGNET to a set of events by which external information is perceived and placed on the problem representation blackboard. Each of these events is modeled by a process which is called a 'perceptual monitor', which monitors the external environment for the corresponding perceptual event. When that event is detected, the monitor places the corresponding hypothesis or attribute change on the blackboard via a Post or Transform operator. A Perceptual Monitor takes the form of a simple production rule:
IF (external event) THEN POST (hypothesis) ON (blackboard location)
When an external event of the type indicated occurs, an hypothesis of the type and content indicated in the rule is constructed and posted on the indicated blackboard location.

Attention Conflict Resolution

Individual cognitive tasks, in COGNET, each have triggers that determine when they 'awake' and begin to compete for the focus of attention. This means that at some times (or perhaps even at all times), there will be multiple cognitive tasks competing for attention analogous to the 'shrieking demons' of the aforementioned Pandemonium model. In such model, the 'demon shrieking the loudest' is placated first. Similarly, COGNET assumes that each cognitive task will have associated with it a numerical priority value that corresponds to the 'loudness of its shrieking'. This priority can be specified in the model as a constant value, or as a formula based on blackboard contents that can be numerically evaluated. In this latter case, the priority of the task involved will be sensitive to the context, as defined by the momentary blackboard contents. Attention conflict resolution then simply reduces to giving attention to the cognitive task with the highest priority value (including the one currently with the focus of attention).

Building COGNET Models

Figure 3:
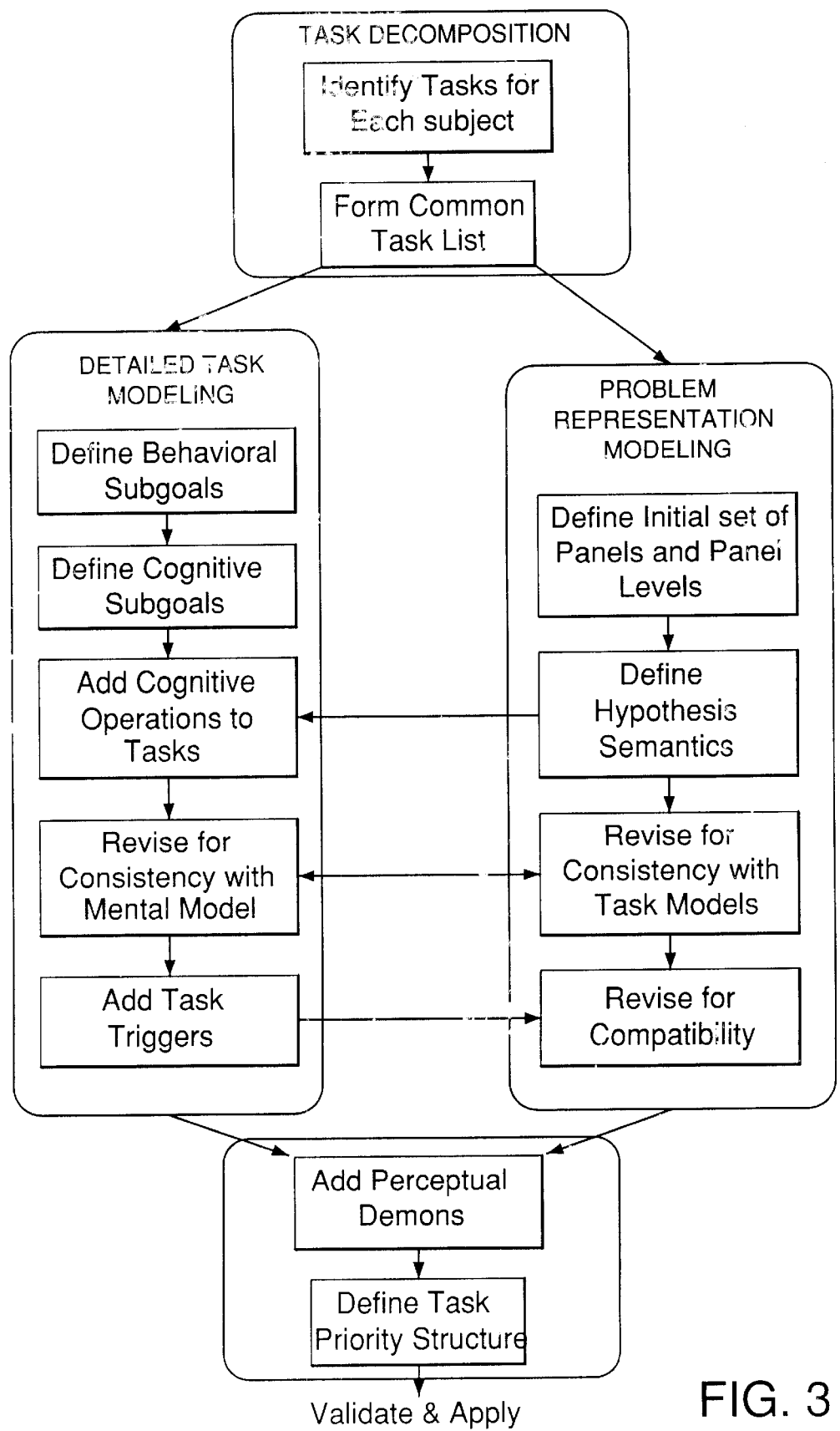
FIG. 3 is a block diagram showing the top level of a methodology for eliciting the data needed to build a COGNET model from human experts in accordance with the preferred embodiment of the present invention.

The top level of a methodology for eliciting the data needed to build a COGNET model from human experts is shown in FIG. 3. In general, COGNET models are built through a cognitive task analysis process, in which human experts in the task domain are observed solving real or simulated problems in the domain. There are two types of data used in a COGNET cognitive task analysis.

The first is a recording of the expert problem-solving process. Ideally, this is obtained through an on-line recording of the interactions with the operational (or training) system which can be 'played back' later. In addition, it is desirable to have a set of transcripts or time lines of the actions that occur between the person and the system. In the ideal case the transcripts/time lines can be generated by the system from the on-line recording of the user-system interactions, especially inasmuch as manual recording and transcription of these interactions can be lengthy and labor-intensive.

The second type of data in a COGNET analysis is a set of verbal protocols taken from the expert. These protocols, usually taken using a Question-Answering method, provide guided introspective verbal descriptions of the problem-solving process used by each human expert. The verbal protocols are usually taken during a replay of the recorded problem-solving sessions, rather than during the initial session itself. This is because the cognitive demands of the introspection process can interfere with the time-sensitive decision-making required by the problems being solved.

As shown in FIG. 3, the various components of a COGNET model are built through several sequential passes through these two data sets. The first pass, shown at the top of FIG. 3, focuses on decomposing the overall process into a set of identifiable cognitive tasks. Initially, the protocols for each subject are reviewed to identify the high level procedures used. Procedures that show commonalty across multiple subjects become candidate cognitive tasks in the model. Next, separate and essentially parallel analyses are done to develop more detailed models of the cognitive tasks, and of the (blackboard) problem representation. These are shown on the left and right paths (respectively) in the center of FIG. 3.

Detailed task modeling is done by identifying, for each cognitive task, all instances of that task in the problem recordings and the associated verbal protocols. Then, these instances are analyzed to define a common hierarchy of goals and subgoals, using the well-known GOMS analysis process. The process initially focuses on the behavioral subgoals, because they will have observable behaviors associated with them in the problem-solving recordings. Later, and possibly through further discussion with the experts themselves, cognitive goals and subgoals may be identified and added. A cognitive goal is one that encompasses no observable behavior, but rather includes only inferences or other mental operations; typically these cognitive subgoals are modeled by posting new hypotheses on the blackboard or transforming ones that are already there.

At the same time, the problem representation is modeled, using a similar process. The verbal protocols are analyzed to identify categories of information that the experts use to describe the problem or problem solving process. These elements of declarative knowledge are collected across subjects and problem instances, and are organized into a blackboard structure. There is some interaction between this analysis and the detailed task modeling at this point, to ensure that the cognitive subgoals which involve blackboard manipulation are described in the same terms by which blackboard structure is being defined.

Near the end of this process, both parts of the representation (procedures and blackboard) are reviewed against the original data and against each other, and revised as needed to insure consistency between them. As a final step, the triggers that activate the cognitive tasks are defined as Boolean patterns that can be evaluated against the blackboard contents.

The final phase of model development involves adding the perceptual monitors and defining the task priority structure. As was discussed above, perceptual monitors represent points at which the expert's perceptual processes recognize relevant sensory stimuli and post them on the blackboard. These are easier to add at this point, because the blackboard will already have been defined. Identification of these perceptual events will require further analysis of the verbal protocols, and possible further interviewing with the experts. Task priorities can be defined either before, after, or in parallel with the perceptual monitor analysis. By reviewing the analysis to this point, it should be possible to identify points in the various recorded problem-solving processes where more than one cognitive task should have been triggered. Further interviewing with the experts may be needed to determine the knowledge used by the experts to select which task to perform at such points in time. These task priorities can either be fixed (e.g., task 'a' always has priority over task 'b', or can be context dependent, in which case the context must be defined in terms of patterns of information available on the blackboard problem representation.

Workbench Architecture

Figure 4:
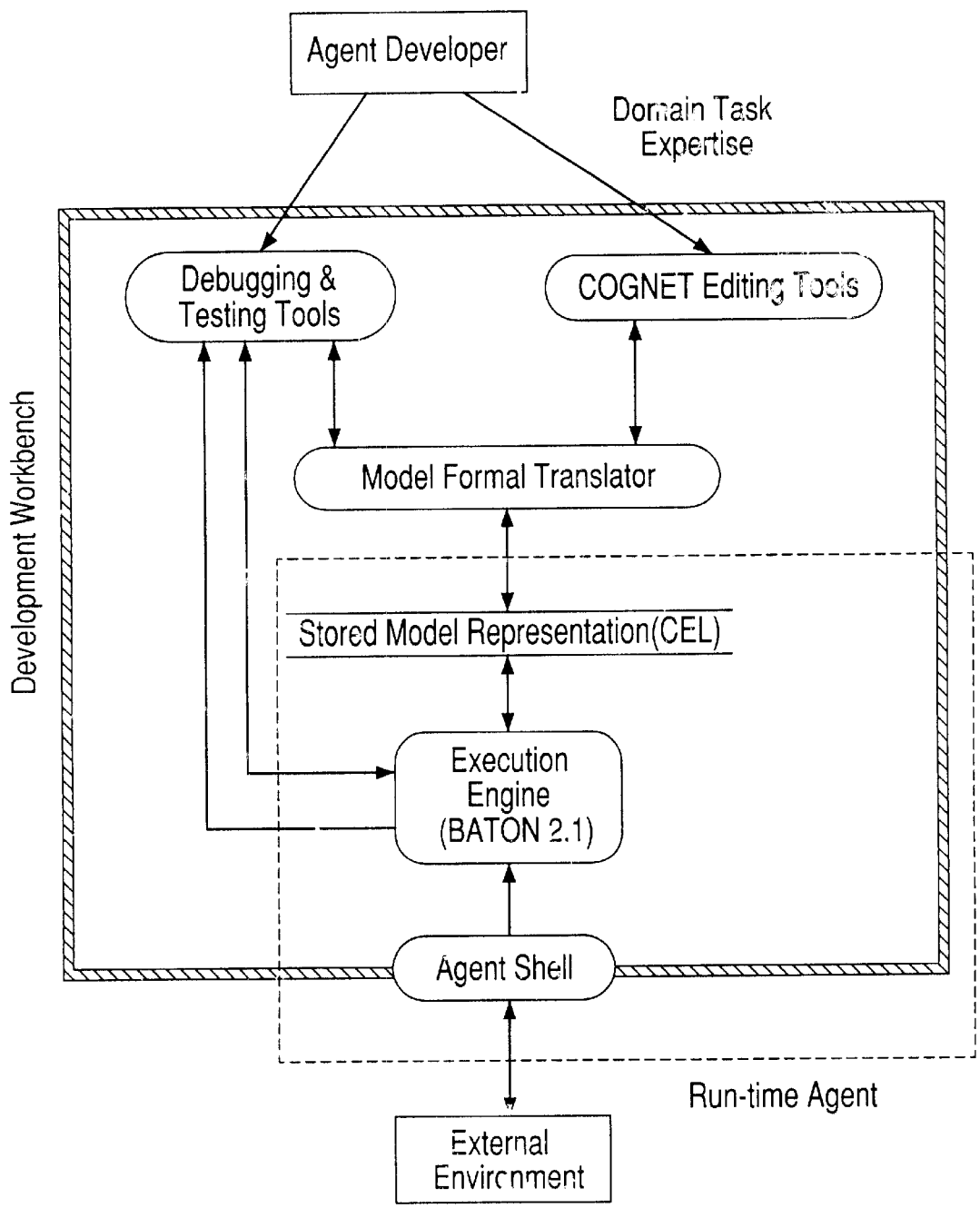
FIG. 4 is a block diagram showing the integrated development and execution architecture of the intelligent agent workbench in accordance with the preferred embodiment of the present invention.

The workbench of the present invention provides tools for building an intelligent agent and for executing the agent both within the workbench and outside the workbench as a stand-alone agent. Such tools allow the: creation and modification of executable COGNET models in the CEL language (discussed below); development of the shell components of a given agent; integration of the shell and kernel components as a complete agent; and testing and debugging of the reasoning kernels and/or fully integrated agent software. These tools are intended to fit together into an integrated development and execution architecture, as shown in FIG. 4.

As can be seen, all the tools in the workbench operate directly or indirectly on the COGNET model that defines the logic and behavior of the actor being simulated. The original COGNET notation, as described above, was built on a computational metaphor of human information processing, but the description language presented above was not explicitly executable. That is, no computational mechanism had ever been constructed to 'run' COGNET models as cognitive simulations. In the workbench of the present invention, such a mechanism is provided by creating a more precise dialect of the COGNET description language, where all potential ambiguity from a COGNET model is removed and control constructs needed to render the model fully executable in software are added. The dialect is the COGNET Execution Language (i.e., 'CEL').

In the workbench of the present invention, an intelligent agent model is coded and stored in CEL; when the agent is activated, its CEL model is executed by a software 'engine' that interprets and executes CEL. The software engine of the workbench of the present invention, then, executes a CEL representation of an agent's reasoning strategy. The engine is the Blackboard Architecture for Task Oriented Networks (i.e., BATON).

While CEL is a fully-defined, closed, and formally complete language appropriate for intelligent agent specification, it is much less intuitive in structure and syntax than the original COGNET syntax on which it is based. This makes usability of the workbench problematic, particularly for non-programmer users. Thus, the workbench contains a COGNET authoring tool that provides the workbench with a more graphical and intuitive interface to CEL. The COGNET authoring tool allows a workbench user to create, browse, modify, and otherwise edit an intelligent agent model in a graphical representation. The representation is the CEL Graphical Representation (i.e., CGR). Thus, the workbench user interacts with the intelligent agent model in CGR form, while BATON executes the same model in CEL form. The workbench translates between the representations automatically.

One component of an intelligent agent that is not encoded in CEL model is the communication shell. This is a layer of C++ software that translates actions and events in the protocol of the external application environment, into an internal representation that is accessible to the relevant portions of the CEL model. Specifically, the shell translates host environment events into BATON events that are recognizable by the Perceptual Monitors in a specific model. In addition, the shell translates actions invoked by the Perform_action operators in a CEL model into corresponding application environment events and inserts them in the application environment event-stream. The communication shell in the workbench is programmed directly in C++, and is not modifiable by the workbench user through the authoring interface. Rather it is separately defined and debugged for each class of event in the agent's application environment. Once this is done, however, the shell software will not require any further modification unless the event definitions in the application environment change.

The workbench of the present invention also provides a set of run-time tools to support the testing and debugging of an intelligent agent model. These tools allow the developer to 'look inside' the model while it is being executed and to see why it is doing what it is doing. The debugging tools are discussed below.

Using the Workbench

Preferably, the workbench of the present invention is run on a MICROSOFT Corporation WINDOWS operating system platform or the like. However, one skilled in the art will recognize that the workbench may if properly configured be run on any other type of platform without departing from the spirit and scope of the present invention.

Figure 5:
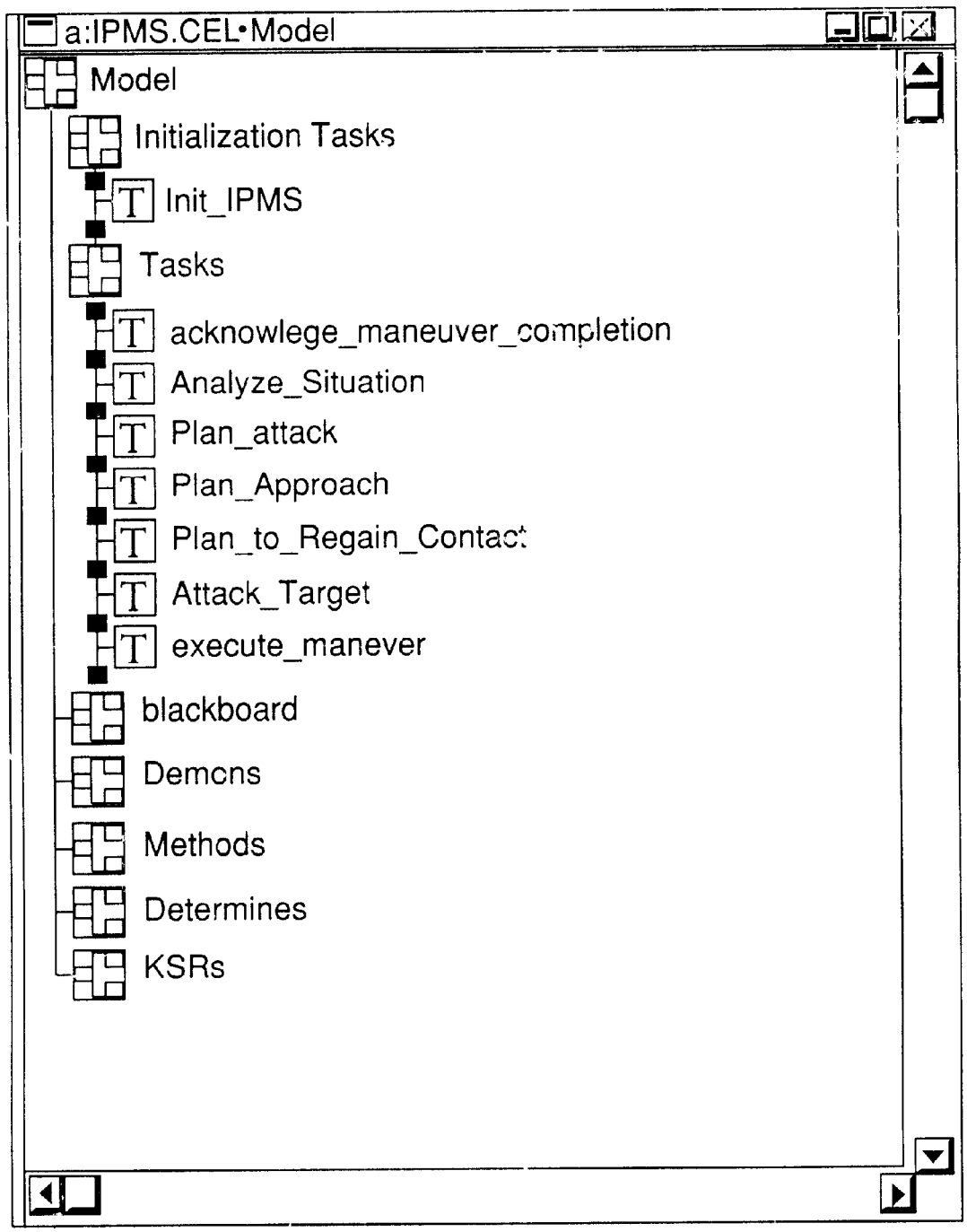
FIG. 5 is a view showing the appearance of a model window for an existing model in accordance with the preferred embodiment of the present invention.
Figure 6:
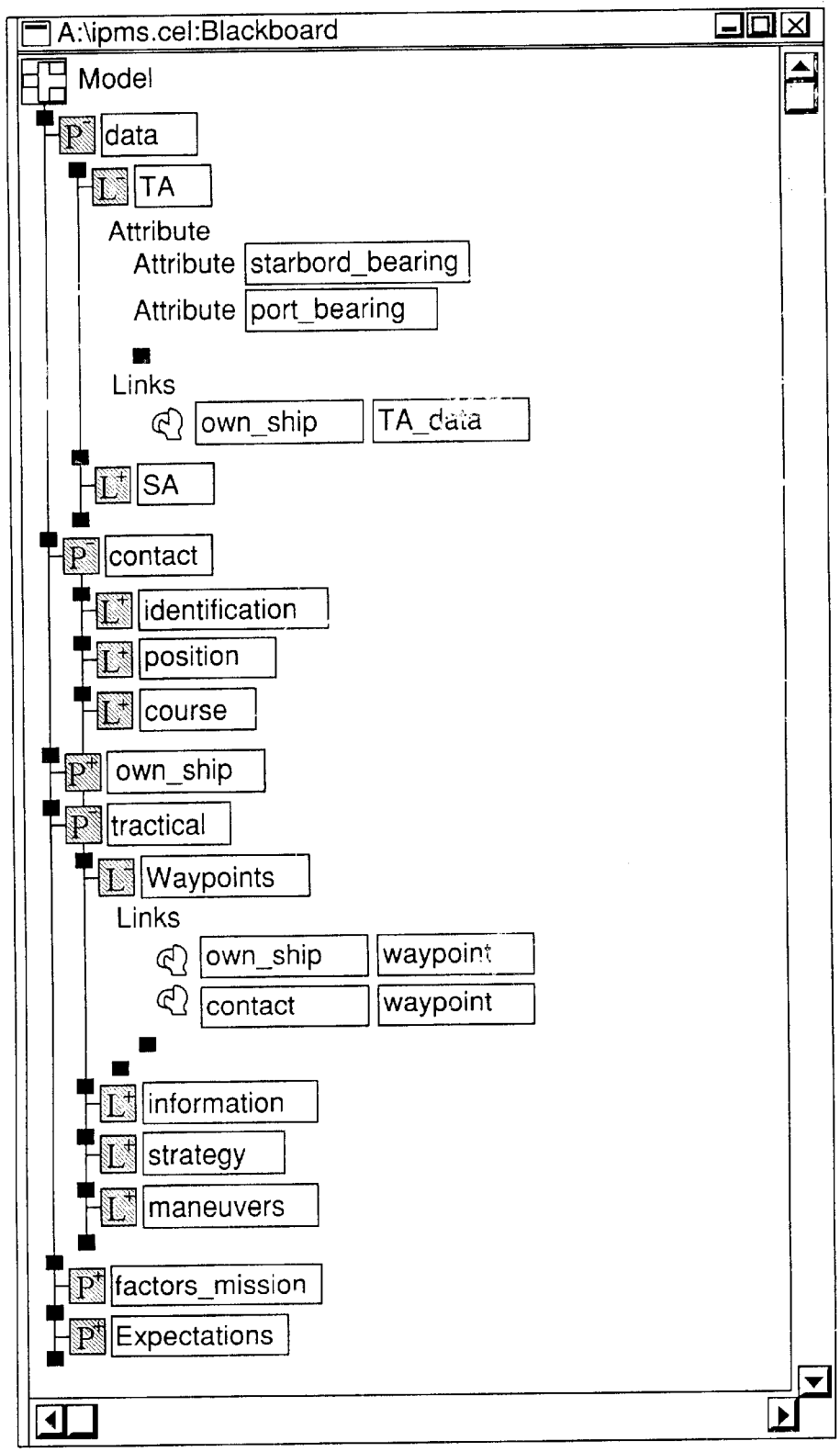
FIGS. 6, 7, 8, 9, 10 and 11 are views showing examples of 'blackboard', 'task', 'initialization task', 'demons', 'methods', and 'determines' component windows, respectively, in accordance with the preferred embodiment of the present invention.
Figure 7:
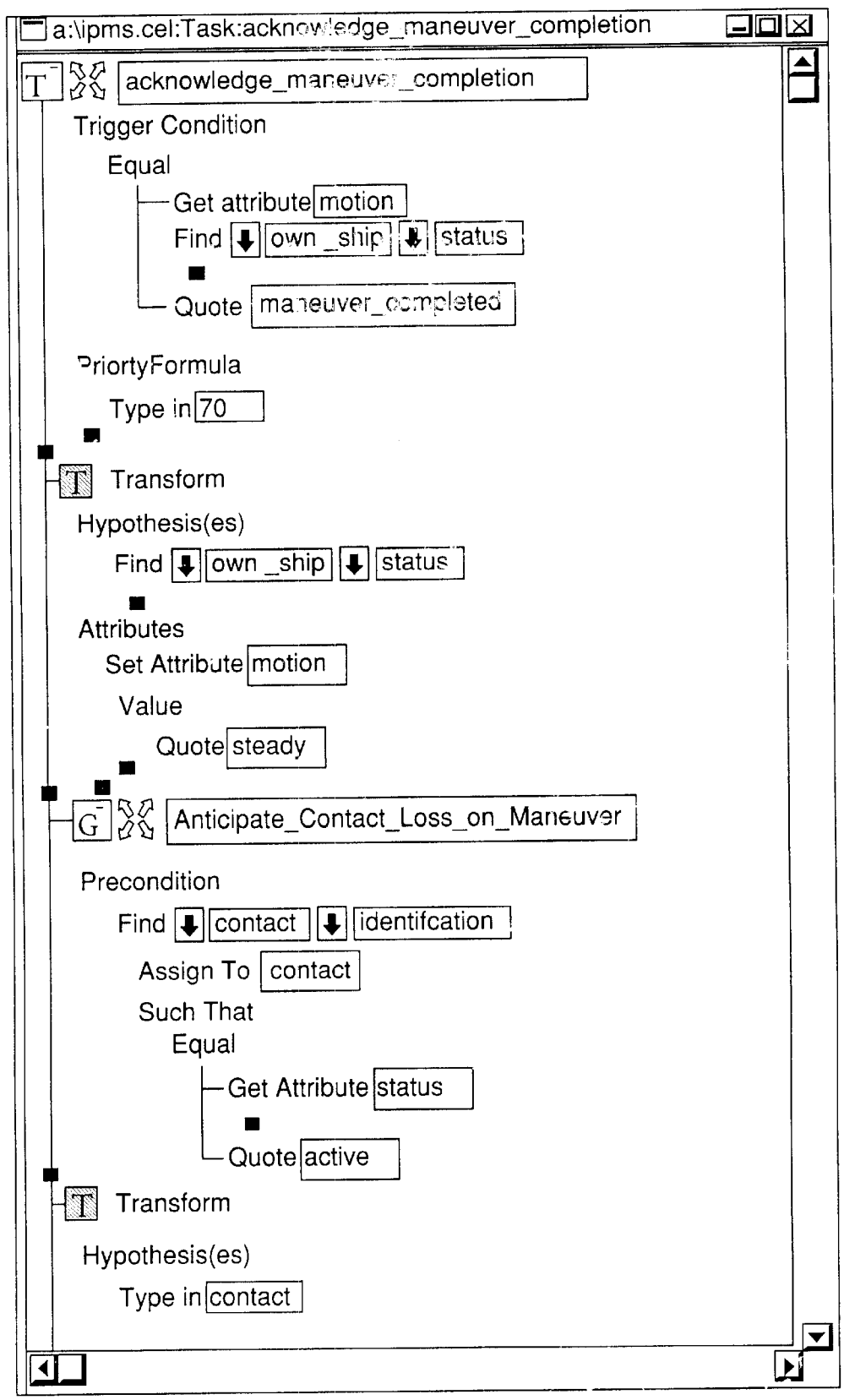
Figure 8:
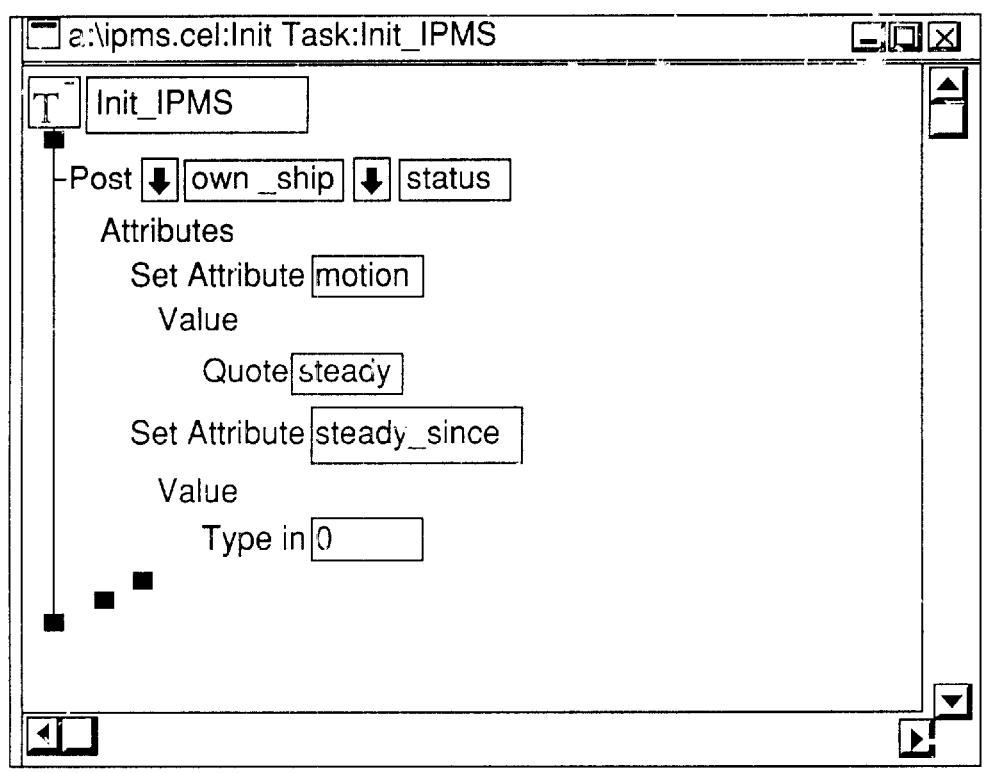
Figure 9:
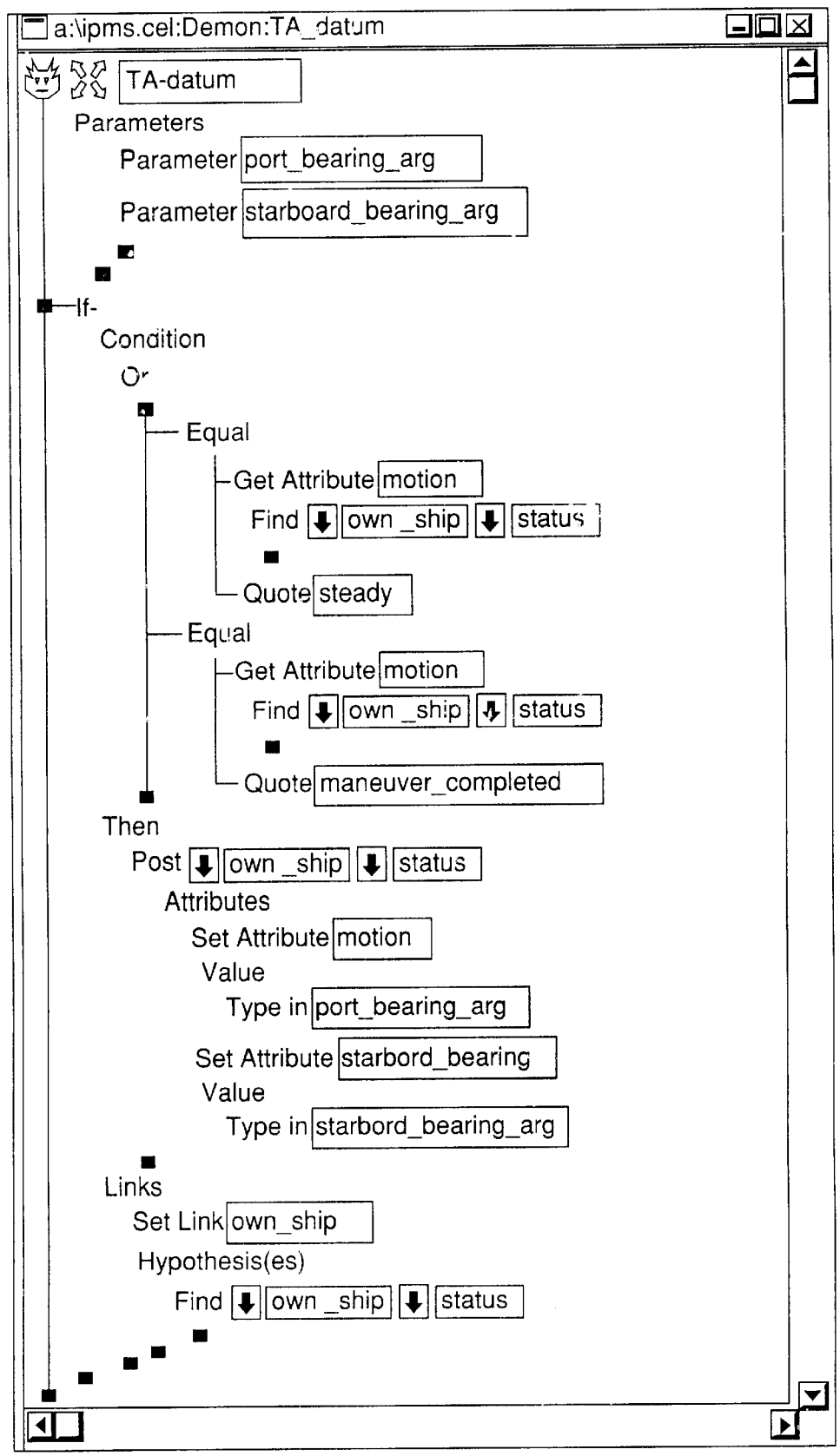
Figure 10:
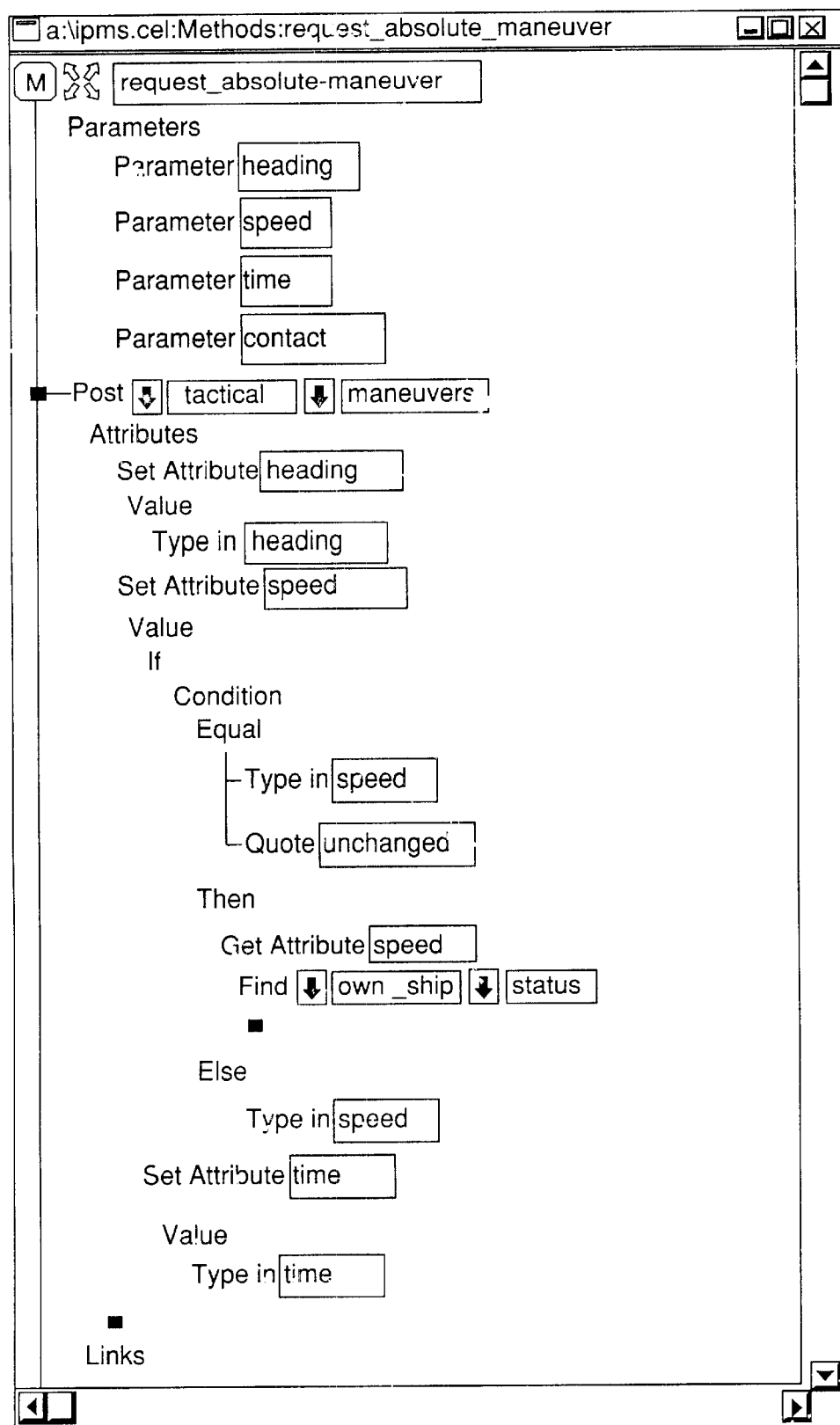
Figure 11:
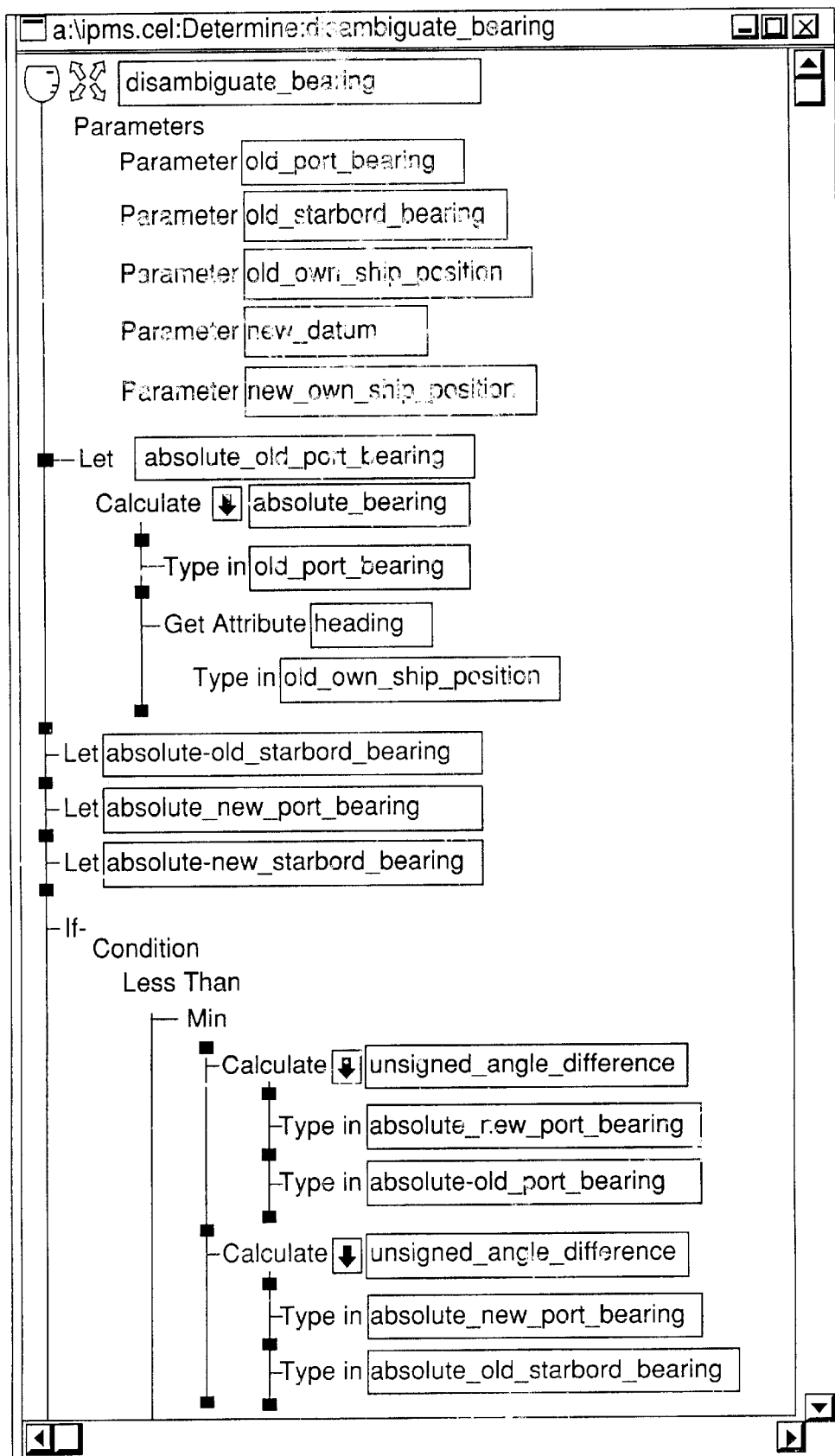

As a model is opened (or initiated as a new model), a Model window is created for it. The workbench user can have any number of models open at the same time, each with its own Model window. FIG. 5 shows the appearance of the model window for an existing military model, to be described below. The model window shows the main components of a the workbench of the present invention model organized into a tree structure. These components are the blackboard, the individual cognitive tasks, if any have been defined yet, the methods, the determine operations, the perceptual monitors, and the initialization tasks used to start the execution, if any have been defined yet. Each component is shown as an icon on the tree. The structure of each component ('task', 'blackboard', 'method', 'perceptual monitor', etc.) is displayed in its own window when the corresponding icon is activated. Thus, the icons represent the hierarchical or 'tree' structure of the model with the root at the top ('Model') and the various levels of branching, 'sub-trees' indented below it. Each level of branches is indicated by another level of indentation. Examples of the 'blackboard', 'task', 'initialization task', 'demons', 'methods', and 'determines' component windows using data from the military model to be described below are shown, respectively, in FIGS. 6–11. The actual model content is added, edited, and viewed through the various component windows, which share a common interface mechanism to be described below.

An agent built in the workbench of the present invention consists of a reasoning kernel and a shell. The reasoning kernel contains the COGNET model which defines the procedural reasoning, perceptual processes, and mental model of the problem. The shell contains C++ code that translates events in the task/application environment into internal events that stimulate the perceptual monitors, and that translates requests for actions by the action operators into external events and inserts them into the task application environment.

The model components that can be created and edited in the authoring tool (i.e., in the model window and various component windows) constitute the reasoning kernel of the model. The agent shell is created, edited, and tested within an external C++ programming environment. The various pieces of shell code must first be linked to the workbench of the present invention before the model can actually be executed, as discussed below.

A fully developed and debugged agent can be separated from the rest of the workbench of the present invention and run as a stand-alone application. One typically runs the stand-alone version when execution efficiency is of concern. The authoring tool and its graphical user interface may impose an overhead which may affect the timing of the execution, especially during high-speed conditions.

For this reason, a second executable engine is provided with the workbench of the present invention. This is an executable version of the BATON execution engine that is not linked to the graphical authoring tool or to the graphical debugger described below.

Workbench Implementation and Source Code

Preferably, the workbench of the present invention is implemented in an object-oriented manner using C++ programming constructs on a PC-type desktop computer, and the user interface is implemented using class libraries such as the Z-APP GUI class libraries. However, one skilled in the art will recognize that other programming constructs, computers, and class libraries may be employed without departing from the spirit and scope of the present invention.

The BATON Execution Engine

As was discussed above, the COGNET language describes human reasoning processes in real-time, multi-tasking human-computer interaction tasks, and the COGNET Principles of Operation define a processing architecture that allow underlying human cognitive mechanisms to be simulated on a computer. COGNET is based on the Newell paradigm in cognitive science, where human information processing is broken into three parallel macro-level processes: perception, cognition, and motor activity.

As should be understood, perception, which includes the physical process of sensation, receives information from the external world and internalizes it into the symbolic or semantic representation of the situation. A completely parallel cognitive process manipulates this internal representation of the problem using previously acquired procedural knowledge. The cognitive process (i.e., cognition) thus operates on an internal 'mental model' of the world, not on direct sensations of the world. The cognitive process also modifies the mental model, as a result of reasoning processes (induction, deduction, abduction) involving application of stored knowledge to the current problem representation. The problem representation thus is affected both by the perceptual processes and the cognitive processes. The cognitive process, in addition to being able to modify the problem representation, can also invoke actions through commands or instructions to the motor system (i.e., motor activity). The motor system operates outside the scope of the problem representation, and does not have access to and does not depend on the contents of the current extended working memory. The motor system provides manipulation of physical instrumentalities that in turn manipulate the environment.

Figure 12:
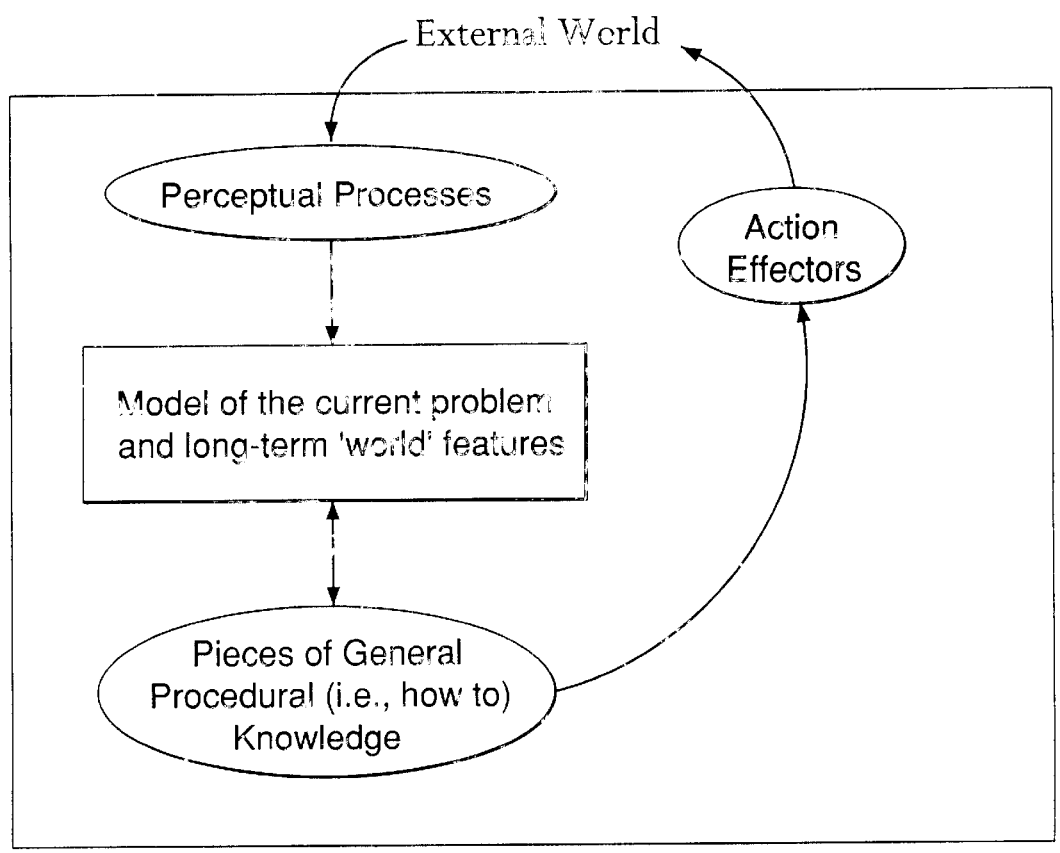
FIG. 12 is a block diagram showing an architecture for how a cognitively-based simulation engine is structured in accordance with the preferred embodiment of the present invention.

From this simplified model of how human information processing is structured, FIG. 12 shows an analogous architecture for how a cognitively-based simulation engine is structured. Here again there are three separate processes, plus an internal model of the world. The perceptual processes monitor the external world for interesting events; when such events occur and are detected by the perceptual processes, they are represented symbolically in the internal problem representation. In parallel, a cognitive process applies pieces of general procedural knowledge to the current model of the outside world. This can result in changes to the stored model of the world as a result of inferential processes, as well as commands to one or more action effectors. These effectors translate the commands into specific actions that are inserted as events into the simulated world outside the intelligent agent. Thus the perceptual processes and action effectors provide the inputs and output for the internal reasoning processes and mental model of the world. Put differently, the internal model of the world and the general procedural knowledge represent the previously discussed reasoning kernel of the agent, and the action effectors and perceptual processes represent the previously discussed communication shell that surrounds this kernel and connects it to the outside world.

The Newell paradigm thus leads to the general organization of a COGNET-based agent. The problem representation component of a COGNET model is translated into the agent's blackboard representation. The procedural knowledge captured in the individual COGNET tasks is translated into the cognitive processing component that operates on this internal problem representation. Together, these two form the reasoning kernel of the agent. The perceptual and action portions of the model are then translated into a shell that links the reasoning kernel with the external world.

Figure 13:
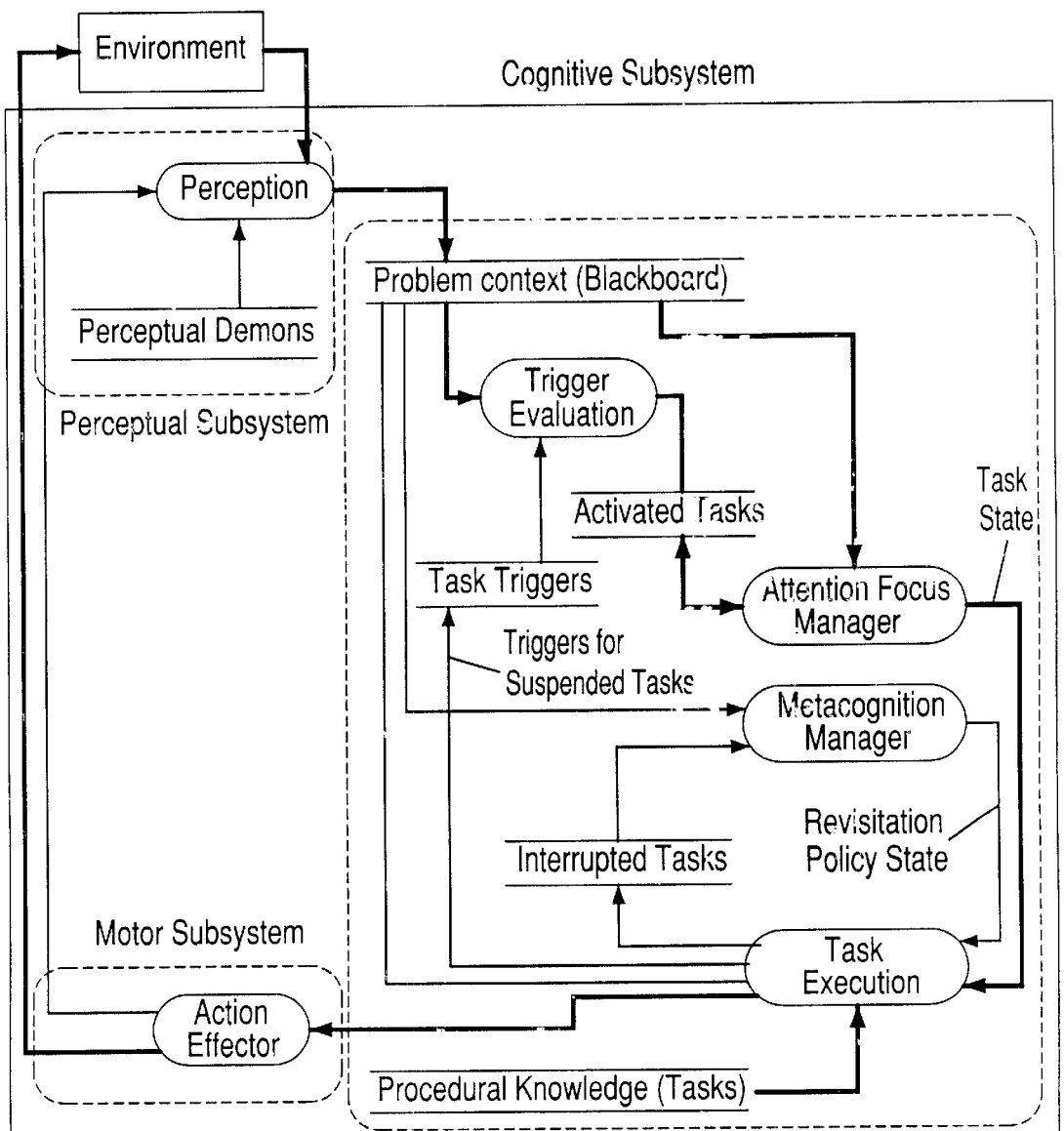
FIG. 13 is a block diagram showing the architecture of FIG. 12 in more detail.

FIG. 13 shows the processing architecture of FIG. 12 in more detail. There are six process components in the execution engine, organized into three subsystems which operate essentially in parallel: Perceptual, Cognitive and Motor.

The Perception process monitors information from the environment, reacting only to the specific external stimuli modeled by the Perceptual Monitors component of the COGNET model being executed. When 'fired' by the presence of the information it seeks, each Perceptual Monitor posts a specific message or hypothesis on the blackboard structure, which provides (updated) problem context to the remainder of the model being executed.

The Trigger Evaluation process regularly monitors the blackboard contents to determine the tasks in the underlying COGNET model whose Task Trigger patterns (i.e., enabling conditions) are satisfied. As Task Trigger patterns are satisfied by the current problem context on the blackboard, the tasks are activated and allowed to compete for attention. The Trigger Evaluator considers both the permanent trigger patterns associated with the model tasks, and the 'temporary' triggers created by tasks that have suspended themselves while waiting for some future event or problem context. The most typical condition under which a task suspends itself is one that involves a communication or interaction with another agent or event outside the local human-computer system, e.g., sending a message and waiting for a response, or initiating a remote action and waiting for a result.

It is axiomatic in COGNET that the person is always performing one and only one cognitive task at any given time. The Attention Focus Manager operates in parallel to the task performance process, determining if and when an activated task that does NOT have the current focus of attention is able to capture that focus from the currently executing task. This is essentially a Pandemonium model of attention, as was discussed above. In particular, each activated task has a certain priority for execution, which itself can be context sensitive (i.e., dependent on the blackboard contents). The Attention Focus Manager constantly compares this priority against that of the task which currently has the focus of attention. Any time an activated task exceeds the priority level of the currently executing task, the Attention Manager sends a message to the Task Execution process informing it to begin (or resume) executing the task which has now captured the focus of attention. The previously executing task now becomes an interrupted task, and is suspended, in its present state of completion, until it is able to again regain the focus of attention.

The Task Execution Process traverses the goal-subgoal-operator hierarchy in the GOMS-like model of the task that it has been told has the current focus of attention. The Task Execution process contains one sub-process for each type of operator in the COGNET task-level syntax, plus one to handle the process of traversing the goal-hierarchy, given the current problem context. The operators in the task model represent actual actions that the intelligent agent can perform, and fall into three classes. One class of operators represent actions in the system environment (e.g. maneuver a vehicle, fire a weapon, communicate a message). A second class represents directed perceptual actions, obtaining information of a particular type from a particular sensor. The third class represents cognitive operations, in which the information is posted, unposted or transformed on the problem representation blackboard, or derived from the current problem blackboard contents.

When a task is interrupted, its current state of execution is saved in anticipation of the task later regaining the focus of attention. The task state that is saved is a pointer to the location in the goal/subgoal/operator hierarchy where execution had proceeded, along with relevant information about the problem context at the time of interruption. This context is important because the lapse of time until the task regains the focus of attention is indeterminate, and some higher level decision may have to be made as to how the resumption of the task is to be undertaken. The execution may have to be re-initiated at the beginning, or at some intermediate subgoal, or the performance may have to be adjusted based on the changes in problem context since the task was interrupted. These are metacognitive processes, and are to be handled by the Metacognition Manager.

Actions in the external environment and perceptual activity classes are not taken directly, but are rather passed to the communication shell, where they are translated in the appropriate protocol and format for the task environment in which the agent will execute. This is done by the Action Effector process, which translates 'requests' for actions into events to be executed in the final application environment.

An Executable COGNET Syntax

In the workbench of the present invention, the COGNET modeling language must be fully executable and yet fully intuitive such that it is accessible to non-programmer users such as training instructors. However, the need to be fully executable makes the COGNET description language complex and difficult to read. Therefore, the workbench employs a two-level strategy where two different representations or dialects of COGNET are provided—one for software execution and another for user entry and editing. The execution language, CEL, was discussed above and will be discussed in more detail below. The entry-editing oriented representation is CGR (i.e., CEL Graphical Representation) and is also discussed below.

CEL was developed from the original COGNET description language described above. The purely textual CEL is defined to be very close to the original COGNET language, but adds a more precise syntax and three important features needed to fully define the semantics of the language. These are:

1. Variable Definitions. CEL needs a capability to define by name pieces of information that are maintained across steps in a procedure. These temporary information stores function as local variables in conventional programming languages.
2. Scope and Binding boundaries. COGNET models frequently find or create a specific blackboard hypothesis and manipulate it for several steps, but the basic COGNET architecture leaves undefined the duration of this association or binding of the hypothesis to a reasoning process. A similar problem arises with the newly-added construct of local variables. CEL implicitly limits the scope of the binding between a hypothesis or local variable to the span of the immediate Goal (or Task, if there is no immediate goal) within which it was created or retrieved).
3. Control and Debugging Operators. CEL also must be able to define certain kinds of control operations such as iteration and conditional IF/THEN/ELSE processing. In addition, CEL must be able to insert special operators that the developer can use to communicate with the debugger and/or execution engine (e.g., 'pause here', 'print message X at this point,' etc.).

CEL operators can be divided into three major types. The first type contains the operators which are used to specify the highest level components of a COGNET model. These operators may be termed 'model-level' operators:

Cognitive tasks—high level procedural units that are spontaneously invoked when activated (i.e., when their triggering conditions are met) and when they have higher priority than any other activated task;

Methods—complex procedural components that are activated only when invoked by a cognitive task, another method, or a Determine operation;

Determines—less complex procedural components that are activated only when invoked by another procedural component, and that create (i.e., return) some symbolic or numerical value;

Perceptual Monitors—simple operations that are invoked when a specified type of event outside the agent is detected; and Blackboard—the problem representation that is shared by all the procedural components.

A second type contains the CEL operators which can occur within the operator sequences that are subordinate to each model-level operator. These are independent operators, in that they can occur as independent elements in a CEL sequence. Each invocation of an operator of the first and second type consists of an operator type name, plus some optional label, plus some optional arguments or operands which may involve keyword connectors. The arguments can themselves be composite statements comprised of lower level sub-operators. For example an argument may be a <condition>, which can really be any nested sequence of operators which evaluates to a Boolean value. The various sub-operators that can occur inside arguments to procedural or blackboard definition constitute the third type of CEL operator. A further description of CEL and its operators is provided below under the subheading COGNET Execution Language (CEL).

Higher Level CEL Syntax

CEL syntax is based on the well-known Lisp syntax and shares many of its features. CEL, like Lisp, uses parentheses to structure the relationship between and among sequences of operators in the language. Every operator starts and finishes with a parenthesis and can therefore be seen as a list. The first element of this list is the identifier of the command and the remaining elements are its operands. For example, an addition 3+2 is expressed in CEL by: (+3 2).

Every argument to each CEL operator can itself be a CEL expression, like in the expression: (+3(/ 5 8)). There is no theoretical limit to the degree of nesting, although compiler and operating system implementations do impose limits.

An example of a valid blackboard description in CEL is:

```
(blackboard bb
    (panel data
        (level TA
            (attributes port_bearing starboard_bearing)
            (links
                (own_ship TA_data)))
        (level SA
            (attributes bearing)
            (links
                (own_ship SA_data)))))
```

Syntax and Semantic Checking in BATON

Complete intelligent agents are built by stringing together syntactically correct CEL operators in syntactically correct and semantically meaningful sequences. Any time a new CEL operator is added to or changed in an agent's model, potential errors may occur. However, because BATON is an interpreter for CEL, it is able to provide direct support for detecting such errors as each line is added or changed. This capability is particularly important for the CGR graphical authoring interface. There, the user, who is not presumed to be a programmer, will be modifying or adding lines of CEL by manipulating graphical representations of a COGNET model. This leaves a great deal of opportunity for the workbench user to create many errors of commission and/or omission.

The error checking facility within BATON, however, greatly constrains this 'room for error' in two ways. First, at each point where a new CEL operator may be added or where an argument of an existing operator may be changed, BATON identifies the set of all syntactically and semantically appropriate options and passes these to the authoring tool. The authoring tool then displays these as the only possible options to the user at this point. Second, once an operator has been defined or changed with the authoring tool, BATON can parse and check it for conflicts and errors, and reports any that were detected back to the authoring tool. The tool, in turn, reports these to the user, enabling an immediate correction.

Workbench Authoring Tool

An intelligent agent is created using the workbench of the present invention by building a COGNET model of the reasoning processes driving the agent's behavior. The COGNET language and its executable form, CEL, are discussed above. The authoring tool is a means through which an agent's COGNET model can be created or edited, using a CEL Graphical Representation or CGR. The specific details of CGR are discussed below.

Outline-based Model Editing

There are four components of a COGNET model that are required in the workbench of the present invention. These are Tasks, Blackboard, Perceptual Monitors, and Actions.

Task and Blackboard components are contained entirely within the reasoning kernel, and are built and edited using the workbench authoring tool. The Perceptual Monitors component exists both within the reasoning kernel and in the shell. The reasoning kernel portion is defined in CEL through the authoring tool. The shell portion must be defined separately in C++ and linked to the rest of the workbench. The Actions components exist in the reasoning kernel only as operators. All of their functionality is defined in the shell in C++ functions that are linked to the rest of the workbench. Only Actions components defined in the shell can be seen or used in model construction within the authoring tool.

There are also four optional components to a model: Methods, Determines, Initialization procedures, and Calculate operations.

Methods and Determines are optional parts of the reasoning kernel, and are entirely built and edited through the authoring tool in the workbench of the present invention. The Initialization procedures are tasks that are executed only once before the model is run. These tasks are also entirely built and edited through the workbench authoring tool. Calculate operators are part of the reasoning kernel, but represent operations that are purely computational and that would be easier to represent in C++ than CEL. Thus, like Actions, Calculate operations exist in the reasoning kernel only as operators that are invoked as part of procedures. The actual calculations must be separately defined in C++ and linked to the workbench along with the shell.

The five model components that are authored using the CGR—Tasks, Methods, Blackboards, Initializations, Determines, and Perceptual Monitors—are all essentially hierarchical in structure. This hierarchical structure is preferably conveyed visually in the authoring interface through an outline metaphor. Like a real outline, each COGNET component can be displayed in the authoring interface in expanded form in which the full hierarchy is shown, or in collapsed form in which the subsidiary elements of some parts of the hierarchy are hidden.

Model Components and Elements

In the workbench of the present invention, an outline refers to a collection of COGNET elements that are arranged in a hierarchy. These model elements, although they differ from one component to another, are similar in that they contain four parts: a type or operator-name (e.g., Goal or Post); a label or referent, (e.g., Plan Attack or Own_ship); a normal set of textual comments describing the element; and a set of semantic details, required to fully define this instance of that type (i.e., of that operator-name). The type and label parts are the identifier of the element (e.g., Goal, Plan, Attack, or Post Own_ship).

Only some of the CEL operators can be used as elements in the workbench of the present invention outline: Task, Demon (only in the Perception component), Define Method (only in the Methods component), Blackboard, Initialization, Call Method, Goal, Post, Transform, Unpost, Let, Find, Find_all, Find_oldest, Select_first, Select_oldest, Select_all, Update, For_each, While, Perform_action, Suspend_until, Suspend_for, Push, and Pop.

In addition to these, there are several debugging commands that can be inserted into an outline as pseudo-operators. These are: Pause—which causes the model to pause at that point in execution; Exit—which causes the model to cease execution at that point; and Print—which causes the model to print a string defined by the semantic details of the print.

Of this whole set of operators usable in an outline, only some can 'sprout' sub-outlines of elements. Specifically, only the Task, Goal, Define Method, Initialization, and Demon elements can have subordinate elements in an outline. These are collectively called subtree elements, and typically define the branch points in a particular outline. The non-subtree elements are always 'leaves' or terminal elements in the outline, in that they can not have any elements hanging off of them in the outline. These elements are collectively called leaf elements.

Graphical Display Conventions for Outlines

Figure 14:
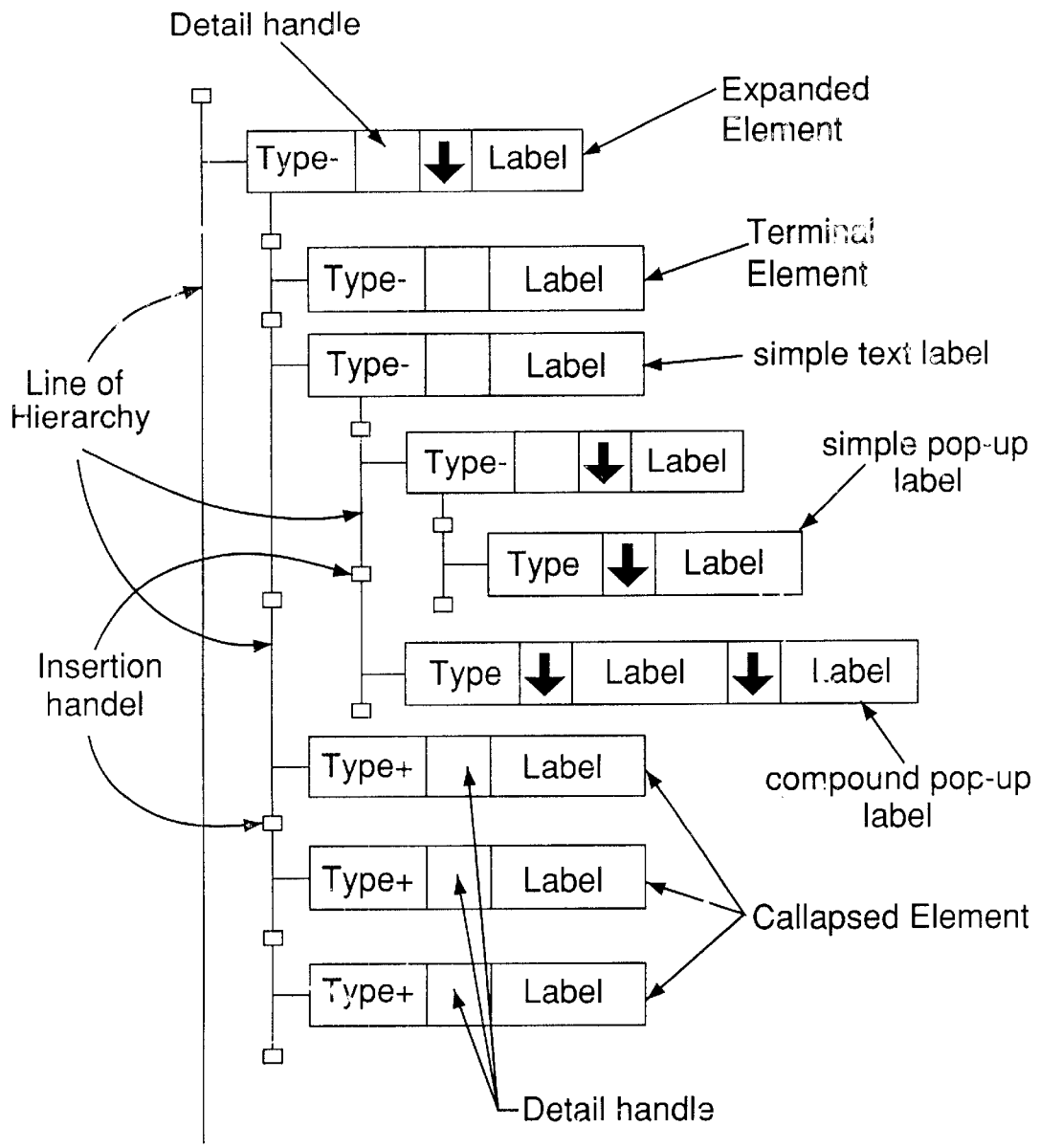
FIG. 14 is a view showing components graphically represented as an outline in accordance with the preferred embodiment of the present invention.

As discussed above, each model component is edited through a different component window. Within each window, the components are graphically represented as outlines, as shown in FIG. 14. The depictions of these outlines explicitly represent the hierarchical relationship among model elements as lines of hierarchy. This type of graphical depiction of a model and its component parts is the COGNET Graphical Representation (i.e., CGR).

In FIG. 14, each element is shown in summary form, with only its type and label visible (i.e., all details are hidden). The type is represented by an icon or by text, depending on the type. The type symbol for subtree elements may also indicate whether Iconic subordinate outlines are shown or collapsed. This is shown by either a − or + symbol, respectively, following the icon. Leaf elements, and subtree elements for which no subtree has yet been defined, have no trailing +/−.

Following each icon is the label associated with that element. The label will be one of three types:

A simple text label contains the text field that labels that instance of the operator, e.g., a string of text that names a particular goal or task.

A simple pop-up label is a two-part structure. The selection arrow is a graphical control through which the user selected the desired element from a set of constrained choices. The user activates the arrow to produce a menu of choices. A specific item from the menu can then be selected. A simple pop-up label is used for elements whose possible labels are constrained, (e.g. as the list of defined actions constrains the label choices in a Perform_action operator).

A compound pop-up label is essentially two simple pop-up labels side by side. This is used for elements whose labels have two constrained parts, e.g. a Post element, whose label consists of a blackboard panel and a panel level at which the new hypothesis is to be posted.

Some elements may have a 'detail handle' between the label and the element symbol. The detail handle is used to display and hide the details associated with that element.

Hierarchical relationships in a CGR outline are shown in the same manner. Elements that are shown as indented and directly below another element are subordinate elements. These 'lines of hierarchy' are explicitly drawn in the authoring tool for two reasons. The first is to make it easier for the user to trace and visually estimate the actual place of any given element in the hierarchy. For example, the level of detail of an element can be seen by how many vertical lines are to the left of its type icon on the screen. The second reason is to simplify the insertion of new elements and/or the moving of existing elements. Each place where a new element can be created or moved to is visually indicated by a black box along a line of hierarchy. This box is an 'insertion handle', and is discussed in more below.

Selecting and Manipulating Elements and Sub-hierarchies

In order to do most operations on a model in CGR, insertion of new elements being the sole exception, it is necessary to select either an individual element or a sub-hierarchy under a given 'branch' element. These operations are done first by expanding an appropriate sub-hierarchy (if necessary) and then selecting the given element or sub-hierarchy.

To manipulate the content of any element, it is first necessary to display it in its full form, with the details shown. This is done using the detail handle opening and closing the details of an element. The detail handle is a means to display/hide the details associated with an element in a CGR outline.

CGR Element Manipulation

All model components that are edited in CGR (tasks, blackboards, methods, determines, initialization, and perceptual monitors) are based on a hierarchical organization. Each component hierarchy can be manipulated by adding, modifying, deleting, and changing the position of elements. CGR provides a consistent set of conventions for interacting with model components and individual elements. CGR is described below in terms of the interface to each of the four basic functions listed above.

Adding New Elements to an Outline

Because of the hierarchical structure of tasks, blackboards, methods, and demons, new elements are never added in a vacuum, but at a specific point in the existing structure. As noted above, these points are explicitly marked in the outline by insertion handles. Each insertion handle represents a possible point at which a new element could be added to (or pasted in) the model. To reflect the hierarchical organization of COGNET, CGR is based on a visual metaphor of an outline processor. It is important to note, however, that unlike a true outline, CGR has strong constraints on where individual types of elements can be inserted into the 'outline' hierarchy. For example, a Task element can occur only at the top of a task description. Similarly, Goal elements can only occur within a Task or Determine or Method, but not within a Demon, and so on. While the experienced model builder will have learned all of these rules, they can impose an obstacle to the novice user. However, building a mechanism to check for all possible violation of these rules would impose a substantial burden on the workbench of the present invention.

To avoid these problems, the workbench processes each component hierarchy as it is being built, and determines which elements can be inserted at each possible point of insertion (i.e., insertion handle). This set of allowed insertable elements is presented to the workbench user inside a pop-up menu that is presented when the insertion handle is activated.

A new element is added to a model in a two-step process. First, the user selects the desired insertion handle and then selects the desired element from the menu. The workbench then adjusts the outline, inserts an element of the selected type at the location of the former insertion handle, and creates insertion handles above and below the new element in the outline. The new element is created with an 'unnamed' label and empty details. The insertion process is completed by adding the label information in the element entry in the outline, and then by defining the details inside the details box. These two activities—adding the label and adding the details—can be done at any time, and need not both be done at the same time. Preferably, a new element is inserted in a hierarchy with its details shown and the required detail components already inserted in the detail box. The entry of label and detail information is done differently depending on the type of element involved, as will be discussed below.

Figure 15:
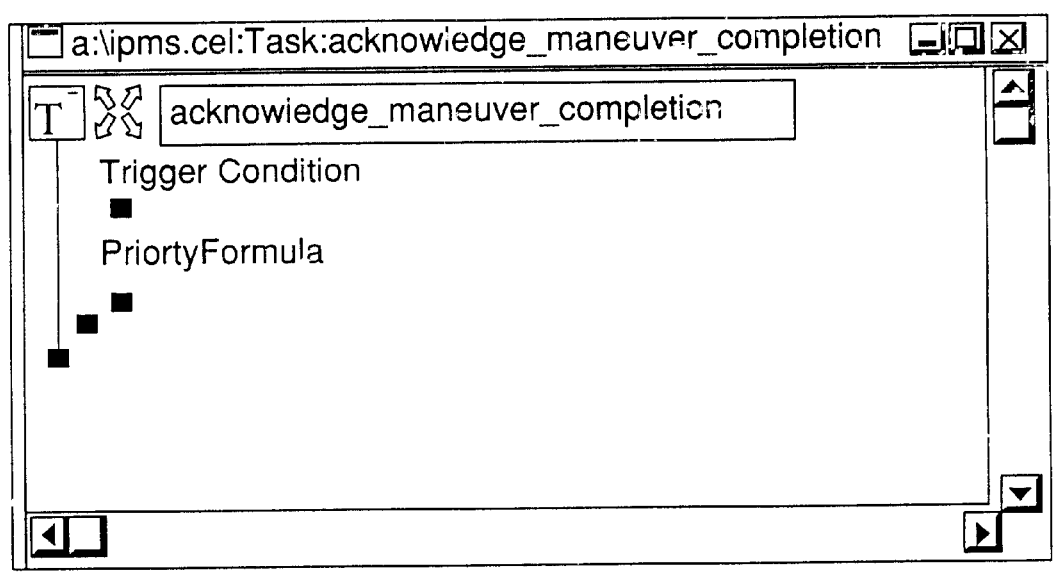
FIGS. 15, 16 and 17 are views showing an example sequence in which a new element is entered into a 'task' description in accordance with the preferred embodiment of the present invention.
Figure 16:
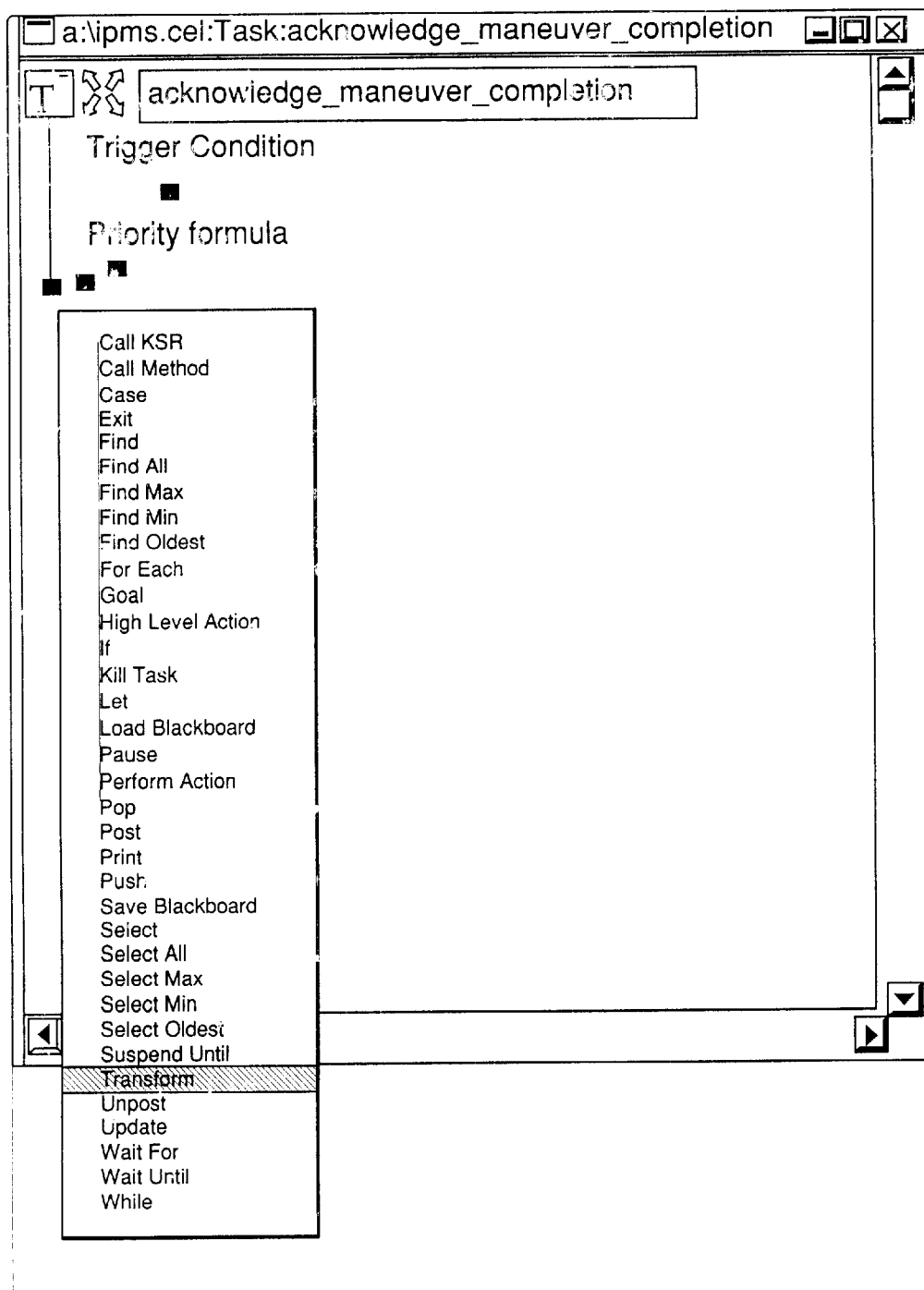
Figure 17:
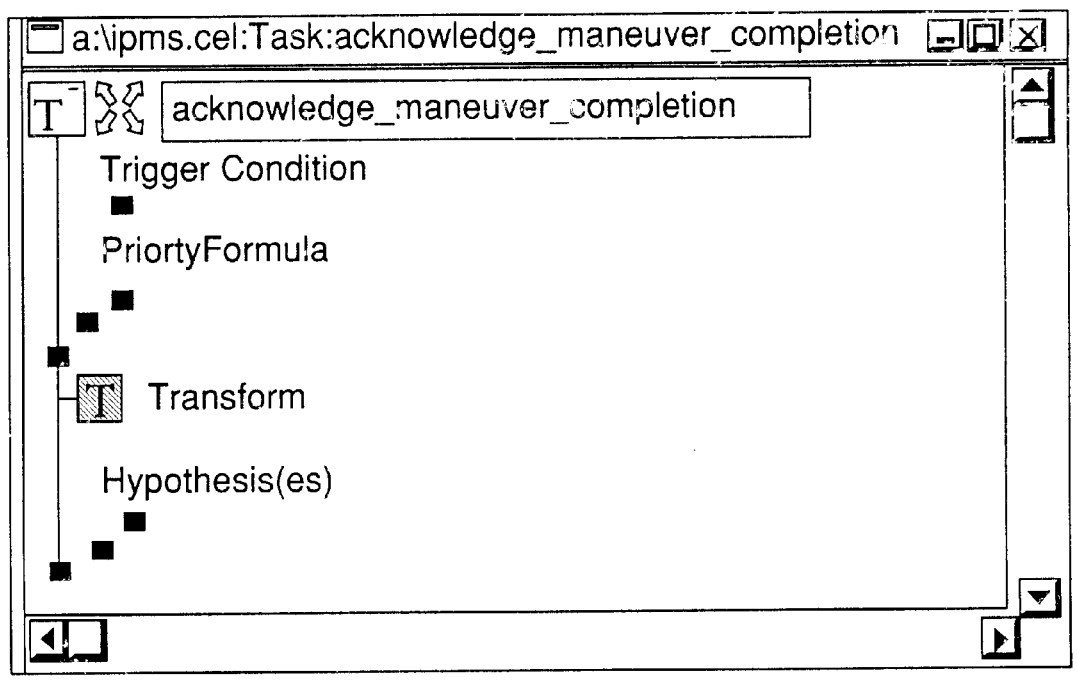

FIGS. 15–17 show an example sequence in which a new element is entered into a 'task' description. In FIG. 15, the initial outline is shown containing only a single element, a task definition (as represented by the 'T' symbol with place holders for the required Trigger and Priority Formula details). In FIG. 16, the user has activated the insertion handle and generated a pop-up menu of possible choices, and has selected the specific element type 'Transform', which is highlighted in the menu. In FIG. 17, the Transform element has been added into the hierarchy at the location of the original insertion handle.

Defining and Changing Labels

When a new element is inserted, its label field initially is created as 'unnamed'. Some elements have labels that are not tied to other parts of the model, and hence are arbitrary. Others have labels that function as references to or invocations of other model components, such as references to blackboard panels/level slots, or invocations of procedural Methods, Determines, Actions or Calculate operations. The workbench of the present invention constrains the choice of label items for these elements to the semantically and syntactically appropriate options, just as it constrains the choices for element insertion.

There are three different types of labels within the workbench: 1) Arbitrary, non-repeating labels of model components that occur only once within a model component and are fully under user control. 2) Arbitrary, user-managed labels that are used in multiple elements within a model component, e.g., names of variables and hypotheses. These names are arbitrary in the sense that they are fully under user-control, and their consistent use within the model component must be managed by the workbench. 3) Constrained, workbench-managed labels that refer to information outside the local component, and are managed by the workbench. That is, the workbench constrains the choice of a label to those external components that are already defined in the model.

When the new element is either Task, Goal, Define_method, Define_demon or Blackboard, the label is arbitrary and must be typed in by the user. The user has total flexibility in defining the name in these elements, as it is an arbitrary label that does not 'point' to anything else in the model. Preferably, for any of these elements, the user can enter or edit a label simply by activating the label field and typing in the label.

Some element labels—Unpost, Transform, Update, Let—will refer to names of variables or hypotheses that are local to the goal. For these elements, the user has responsibility both for identifying the name of the correct hypothesis or variable to be created or operated on, and for using that name in a consistent manner elsewhere within the current component. For example, the user may define a hypothesis with a POST element and assign it a local name. If the user wants to change some attribute of that hypothesis later on in the same goal with a Transform element, then it is entirely up to the user to ensure that the exact same name is used in both cases. Labels for these elements are created in the same way as arbitrary, non-repeating labels.

Where labels are not user-created, the label choices are constrained by the workbench of the present invention. Because those labels function as references to other components in the model, the user must select labels that point to some existing part of the model, as follows:

for Perform_action elements, the user must choose from among the set of pre-defined C++ Action functions that have already been programmed and linked to the model as part of the application shell;

for Call_methods, the user must choose from among the set of currently-defined methods; and for Post, Find, Find_all, Find_oldest, Select_first, Select_all, and Select_oldest, the user must choose from the existing blackboard panels and levels. In any of these cases, there is a predefined list of choices available for the label field, and upon user activation (by the 'down arrow' to the left of the label field), the workbench provides this list to the user for direct selection and automatic insertion into the label field.

Defining and Changing Element Details

There are conceptually three parts to any element in a CGR outline—its type, its label, and its details. Of these three, only the last two can be changed. It is difficult if not impossible to change an element from one type to another because the label field and all details would have to change along with a type change.

Figure 18:
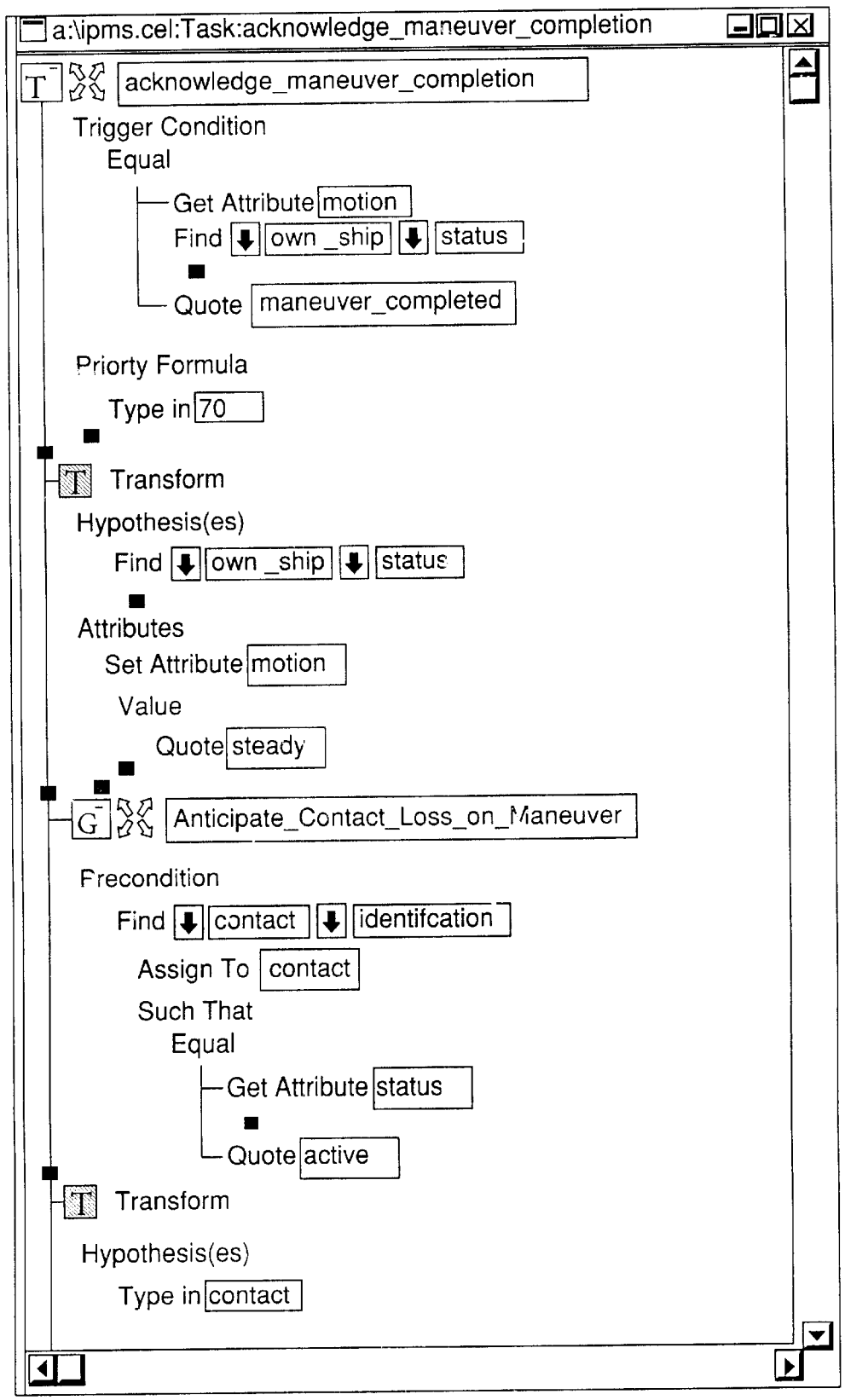
FIG. 18 is a view showing a portion of an outline with detail boxes displayed for each element in accordance with the preferred embodiment of the present invention.

Element detail information is entered and/or changed in a two step process. First, if the element is not displayed in full, the details must be displayed, as shown in FIG. 18, either using the View menu or using the detail handles, as described above. Once the details box is displayed, the user can enter or edit the entries inside it.

Each element in a CGR outline represents a specific operation that will be performed when executed by BATON. Each type of element has a well-defined syntax that specifies what information is needed to execute a given instance of the operation. The information items beyond those provided in the label constitute the details of that element. Each specific information item in a detail constitutes one component of the detail. Each component of a detail, in general, will provide one of four different kinds of information to its parent element:

1) definitions—in elements that define pieces of knowledge, (e.g., Blackboard, Method, Demon, Determine), component details provide definitions of the specific parts of the structure being defined, such as the names of panels, levels, attributes, and links. Definition also occurs when a component detail identifies a specific hypothesis and assigns a local name for that hypothesis via the ASSIGN detail component.

2) conditions—some detail components define the conditions under which the element (and sometimes its sub-hierarchy) will be executed. Examples of these details are task-triggers, goal-preconditions, and execution-conditions for the If, Condition, and While elements.

3) values—in many cases, a specific semantic detail provides the parent element with a specific value for a specific 'slot' in its syntax. For example, the Priority Formula detail component under a Task element will provide a numerical value that determines a Task's relative priority when other tasks are competing with it for the focus of attention. Other examples of this are found in Perform_action and Use_method, where the details provide specific values that are used to fill the 'slots' in the definition of the Action or Method. It should be noted that a condition is actually a special kind of value, i.e., one in which the value is of type 'Boolean'.

4) identifiers—one final type of information provided by detail components is a pointer or identifier of the specific piece of data or knowledge to be operated on by the element. For example, in Post or Transform elements, the details will identify which specific attributes and links are to be assigned values (or updated).

Each different element type will have a different layout and content for its semantic details, because each element type requires different components for it to be fully specified. To avoid the user having to learn separate interfaces for each of the nearly two dozen element types, the interface for specifying semantic details uses a small number of common interaction principles to create a consistent style of interaction for all CGR details.

CGR Principles of Interaction for Details

1. Within any and every detail, information is organized into pieces or components. A different set of components are available for each element type.

2. In any and every detail, each component consists of a title and 'child' detail, in which the detail's content is specified. This is consistent with the relationship that the main detail has to its 'parent' element in a task, method, demon, or blackboard outline.

3. In any and every detail, whether parent or child, the components available to the user are contained in a pop-up menu controlled by an insertion handle, just as in the main outline. For a new detail in which no data have yet been entered, the insertion handle is located below the element label. Later, as details are added, additional insertion handles may be created inside the various child details.

4. In a detail, components can be either order dependent or order independent. Many components, such as priorities, preconditions, etc., and other high-level semantic components of individual elements do not have any inherent sequential relationships. They can be defined in any order. Other components are clearly order dependent, e.g., the order in which the operands are listed in a subtraction operation.

5. Among components of a detail, order independent relationships are represented by simple 'stacking' of the title +child-detail boxes in the parent detail box with no connecting lines.

6. In a detail, the relationships between order dependent components are displayed and manipulated using the same graphical mechanisms used to create, manipulate, and display CGR outlines for tasks, blackboards, etc.. Thus, relationships among order dependent components are shown with lines of hierarchy, with insertion handle pop-up menus being used to indicate which information can be inserted where. This principle provides consistency between the manipulation of outlines and details.

When a detail component provides a condition or value to the parent element, the child detail that supplies the value of the detail may consist of an entire sub-hierarchy of detail-level operators which, when executed, evaluate to a numerical value. This potential for sub-hierarchies means that component details can be highly recursive, and potentially much more complex than the higher-level CGR outline. The detail level operators that can be used to construct sub-hierarchies that evaluate to a specific type of value include:

the arithmetic operations add, subtract, multiply, divide, to create numerical values;

numerical constant and string constant operators to create numerical or string values;

Boolean operations +, >=,>,<=,<, And, Not and Or;

blackboard operators Find, Find_oldest, and Find_all, which locate and retrieve hypotheses that satisfy specified patterns;

'link' operators Select, Select_oldest, and Select_all, which locate and retrieve hypotheses that satisfy patterns from blackboard associations (links); and the blackboard pattern matching operation Exist, which tests to see if a condition exists.

Creating and Manipulating Details in CGR

Figure 19:
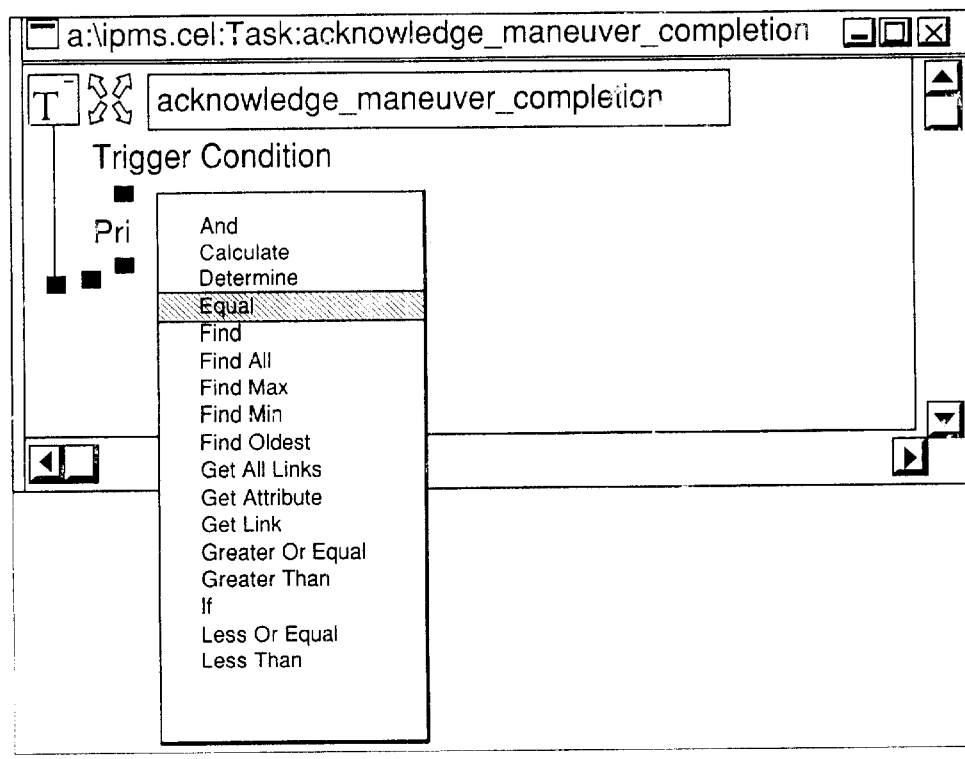
FIG. 19 is a view showing the appearance of a TASK operator before its details have been defined, in accordance with the preferred embodiment of the present invention.

When a new element is added to a CGR outline, it is created with its details shown, and all required components inserted. For example, FIG. 19 shows the appearance of a Task operator before its details have been defined. The Task has been given the label 'acknowledge maneuver_complete'. The two required component details—'Trigger Condition' and 'Priority Formula' (partially blocked by the shown menu)—are automatically included as component titles, each with a 'child' detail underneath. This is indicated by the insertion handle indented and inserted beneath each detail component title. FIG. 19 also shows the pop-up menu contained in the insertion handle for Trigger Condition detail. Because a trigger condition requires a Boolean value as its 'child', the menu contains every operator that could be used to construct an expression that could evaluate to a Boolean value, as well as valid debugging operators. In this case, the user wants this task to be triggered whenever the attribute 'motion' of the current 'own_ship' hypothesis, on the 'own_ship' blackboard panel and status level, contains the string 'maneuver_complete'. This is done by: defining the literal string 'maneuver_complete' to be tested for; finding the hypothesis and its motion attribute so that the string and the attribute value can be compared; and linking the two as the children (i.e., operands) of an=operation. In practice, however, the steps must be done in the reverse order. That is, the equal operation must be defined first, as the primary child of the Trigger Condition operator. This is because the result of the comparison it implies (i.e., are each of its 'children' operands equal to one another) establishes the Boolean value that is required as the primary 'child' of the Trigger Condition component. The process of defining this comparison is shown in FIGS. 20–26.

Figure 20:
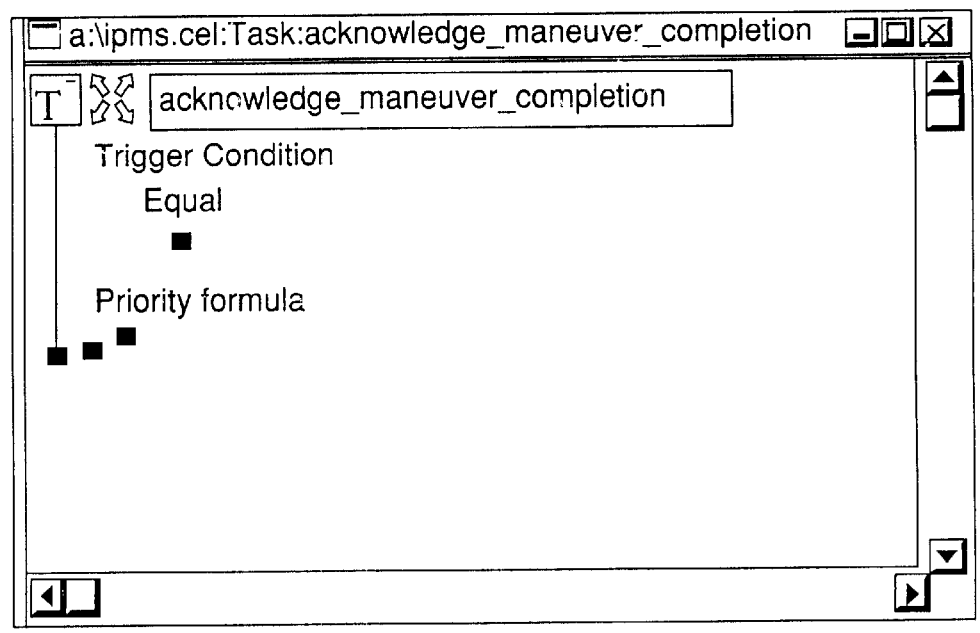
FIGS. 20, 21, 22, 23, 24, 25 and 26 are view showing a process of defining a comparison in connection with the Task operator of FIG. 19.
Figure 21:
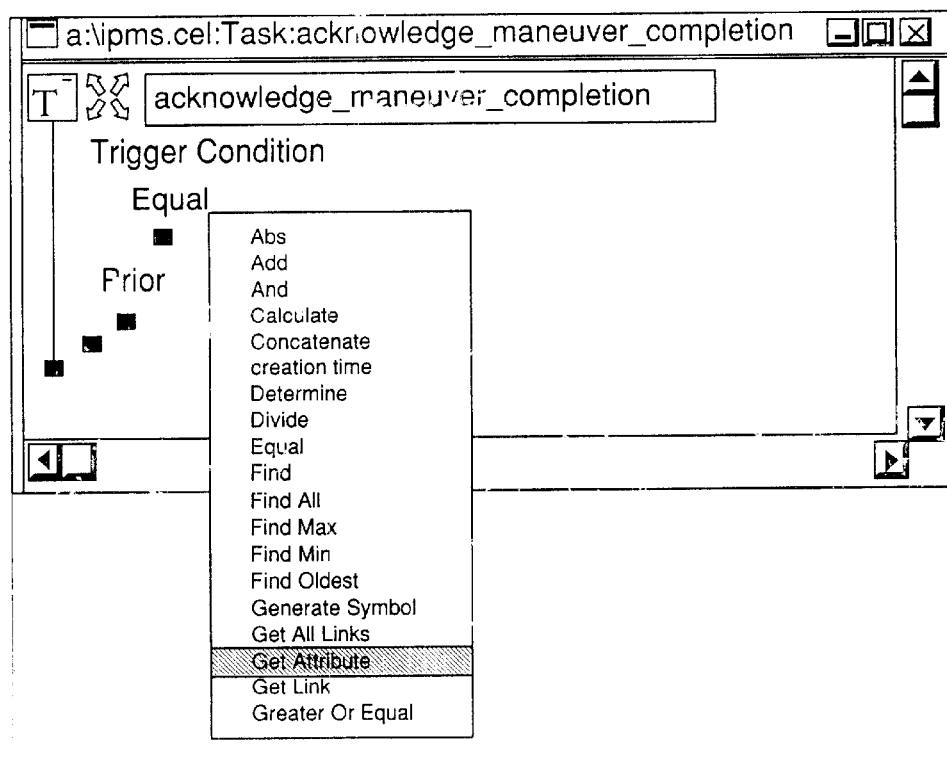
Figure 22:
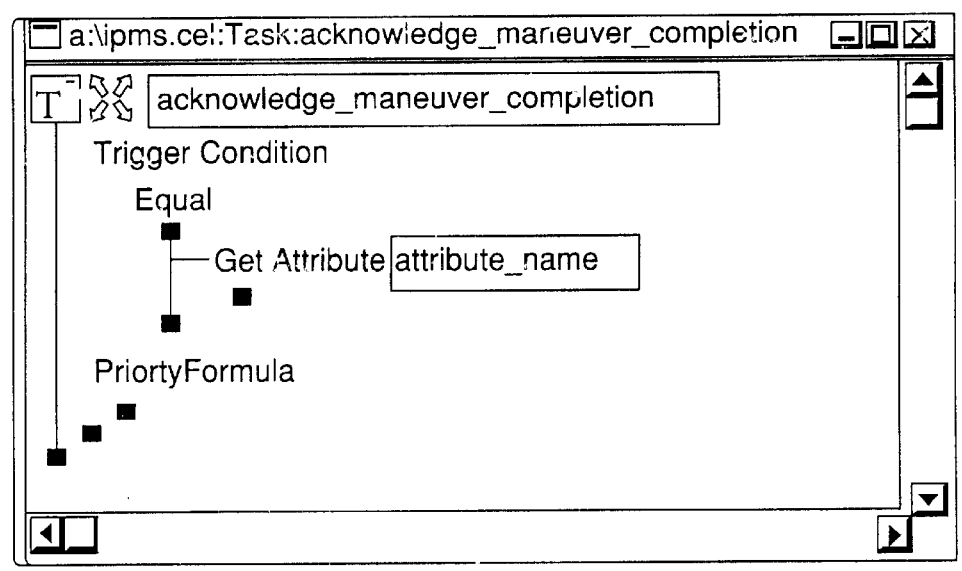
Figure 23:
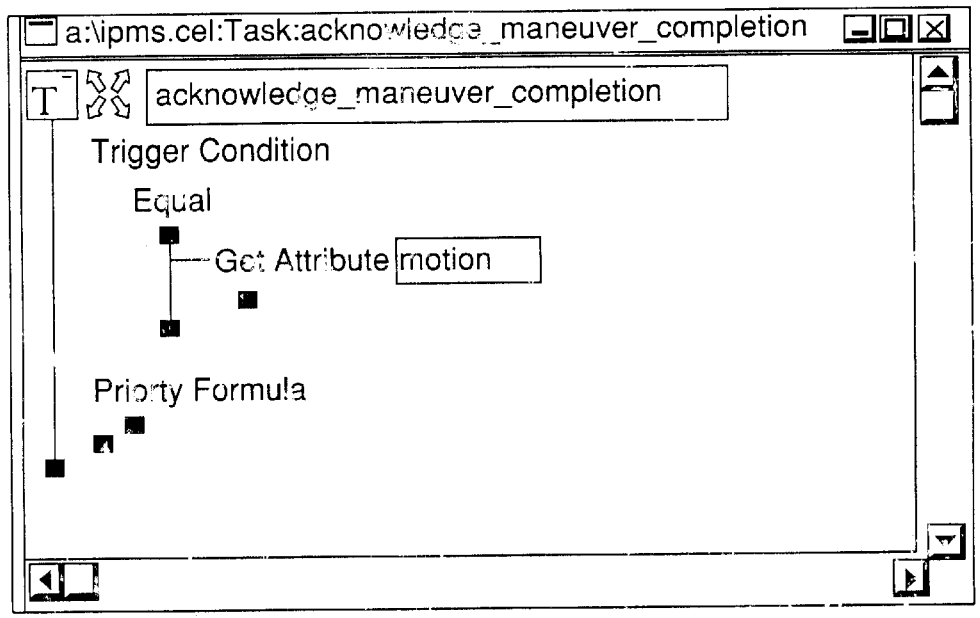

In FIG. 19, the user has selected the '=' entry on the menu to create the sub-hierarchy shown in FIG. 20. CGR has created this sub-hierarchy to meet the semantics of the '=' operator, with the=at the top, and an insertion handle beneath. This insertion handle can be used to create a sub-hierarchy of components whose values will be compared to determine if they are equal. The insertion handle's pop-up menu is shown in FIG. 21. In FIG. 22, the first insertion handle has been used to define and insert the first part of the comparison—the value of the motion attribute of the 'own_ship' status hypothesis. Semantically, finding the desired hypothesis and getting the value of its 'motion' attribute are separate operations, and therefore are done in separate sub-sub-hierarchies. First, the user displays the pop-up menu inside the first (i.e., upper) subordinate branch under the=operator, and chooses the Get_attribute operation (FIG. 21). This is chosen here, as opposed to the Find operation which will actually find the hypothesis, because it is the attribute value that is the actual operand of the equal, not the hypothesis. Once the Get_attribute operator has been selected from the menu, it is inserted as shown in FIG. 22, with an unnamed label (which will later be edited to say 'motion' in FIG. 23), and a child insertion handle.

Figure 24:
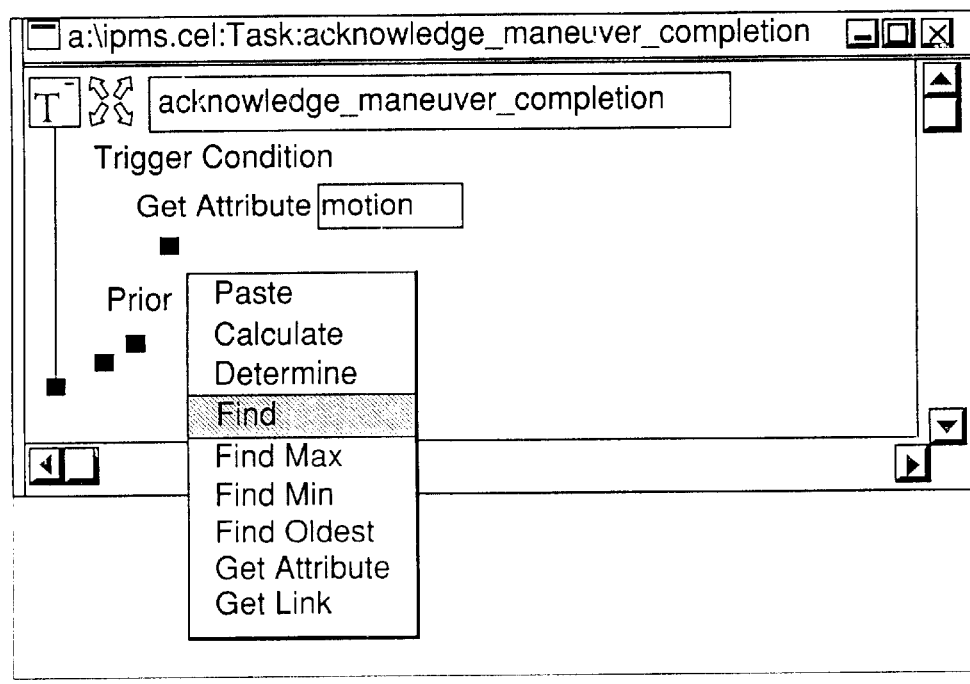
Figure 25:
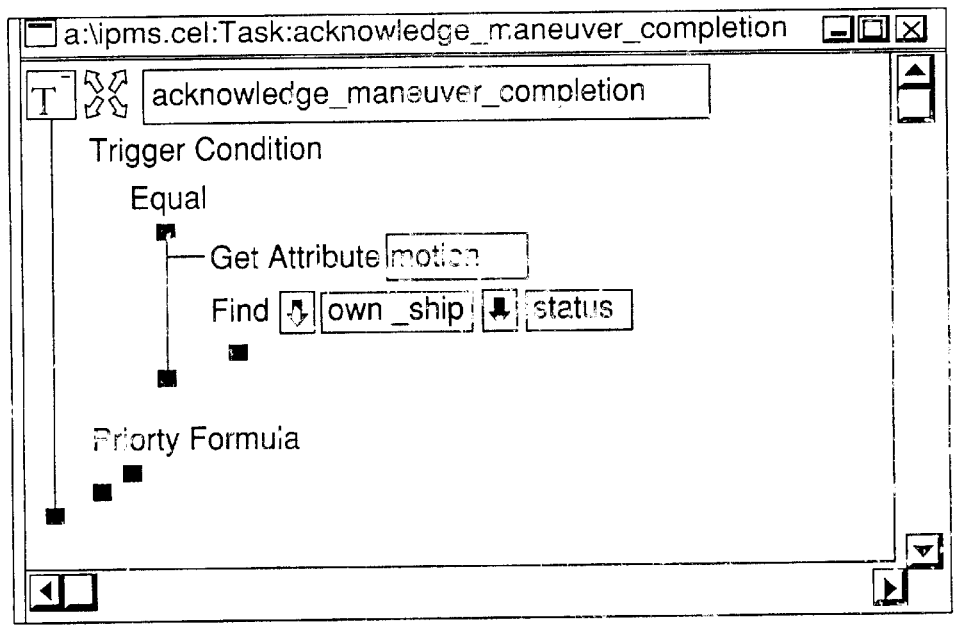

The operand of a Get_attribute operator is a hypothesis, so the child insertion handle under Get_attribute will be used to create an operator or expression that identifies the specific hypothesis whose specified attribute value will be returned by the Get_attribute operator. The pop-up menu generated by this insertion handle will therefore contain only operators that can be used to generate a statement or expression that will identify a specific hypothesis or hypothesis list. This menu is shown in FIG. 24. In this case, the user chooses Find. The user must then define where (on the blackboard) a hypothesis is being sought. This is done by employing the menus of blackboard panel/level locations available by way of the down arrows in the Find operator (FIG. 25). In the case of this model, there is always one and only one hypothesis at the 'own_ship' panel/status level. Otherwise, the user would need to further qualify the Find operation with a sub-sub-sub-hierarchy that defines additional criteria to be used to Find one specific hypothesis at the identified panel/level of the blackboard among the many that could exist there.

Figure 26:
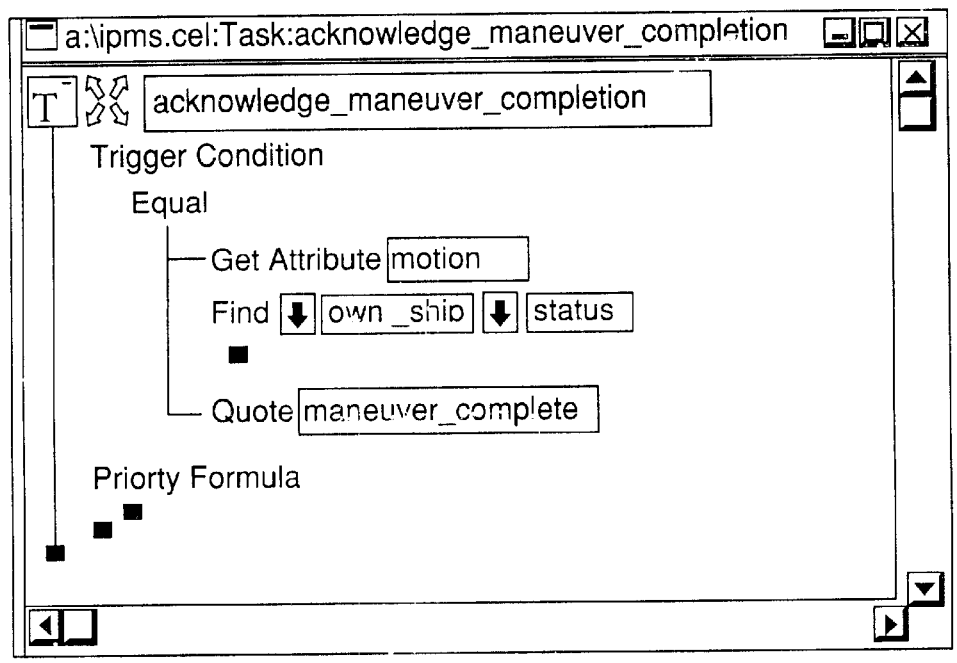

Next, the user defines the other side of the comparison, using the second insertion handle under the 'Equal' operator. Here, the user only needs to directly enter the string to be used in the comparison, and so selects the Quote entry from the insertion handle menu (not shown). The Quote operation allows the user to directly enter a literal string in the label of the operator once created. FIG. 26 shows the final result of defining the full detail for the Trigger Condition component of the Task element.

Another example is shown in FIGS. 27–39. This example shows how a Transform element is used to change the value of an hypothesis' attribute. Specifically, it shows how the motion attribute of the 'own_ship' hypothesis is changed, once the Task (whose trigger condition is discussed in the preceding example) begins to execute. The first thing that happens in the task is that the motion attribute of the 'own_ship' status hypothesis is assigned a new value.

Figure 27:
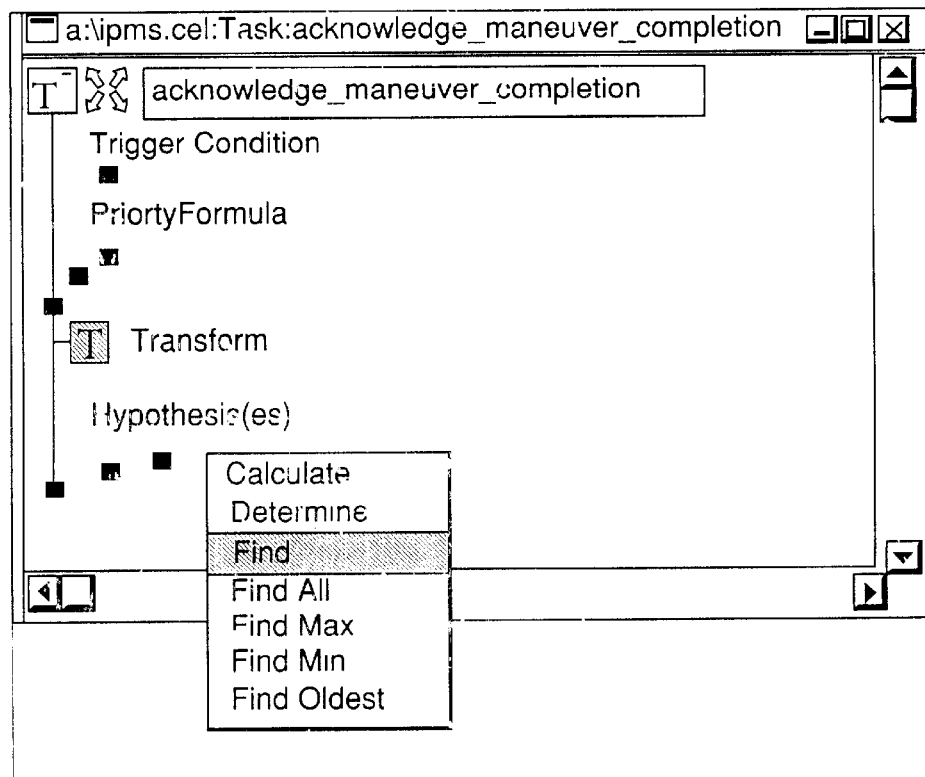
FIGS. 27, 28, 29, 30, 31, 32, 33, 34, 35, 36, 37, and 38 are views showing how a Transform element is used to change the value of an hypothesis' attribute, in accordance with the preferred embodiment of the present invention.

In this example, a transform element has been inserted as the first element of the hierarchy under the Task 'acknowledge_maneuver_complete,' and its details must now be defined. FIG. 27 shows the Transform element, with its one required detail component—Hypothesis(es)—which is used to identify the specific hypothesis or hypotheses to be transformed. Under the Hypothesis(es) component title is a child detail, indicated by an insertion handle. The user has generated a menu from that insertion handle and selected the Find operator.

Figure 28:
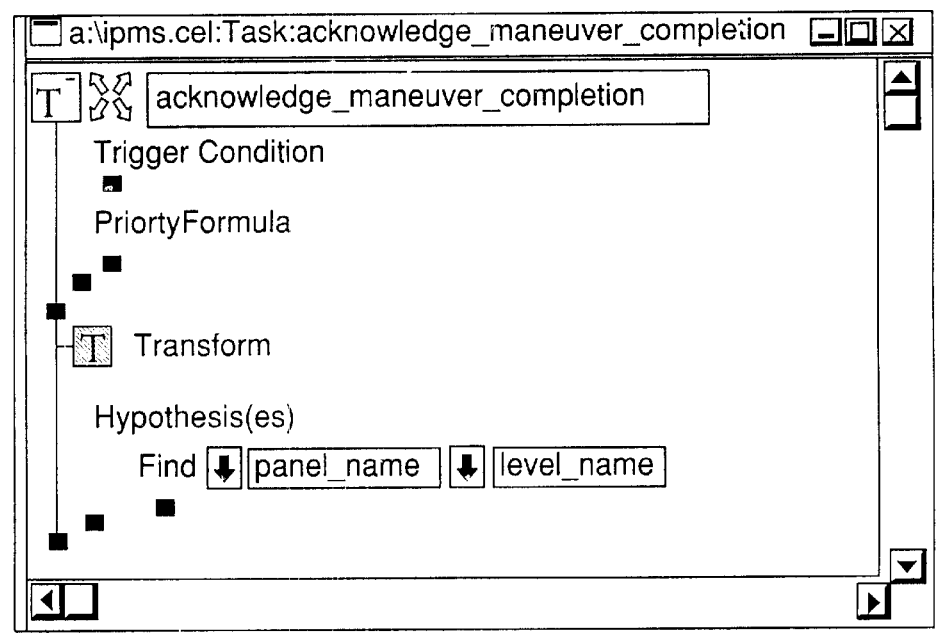
Figure 29:
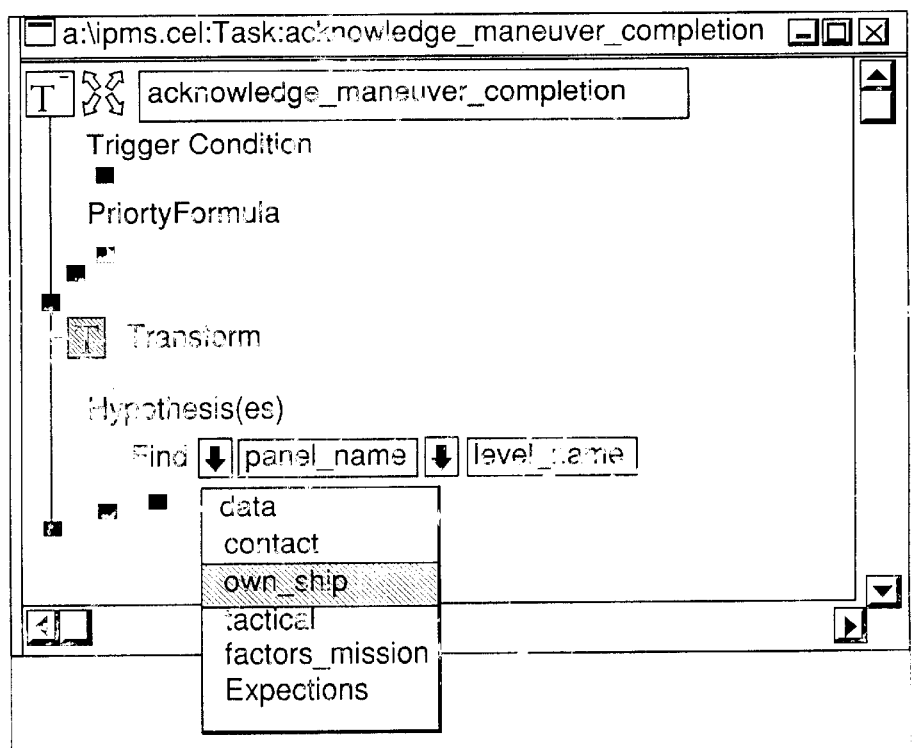
Figure 30:
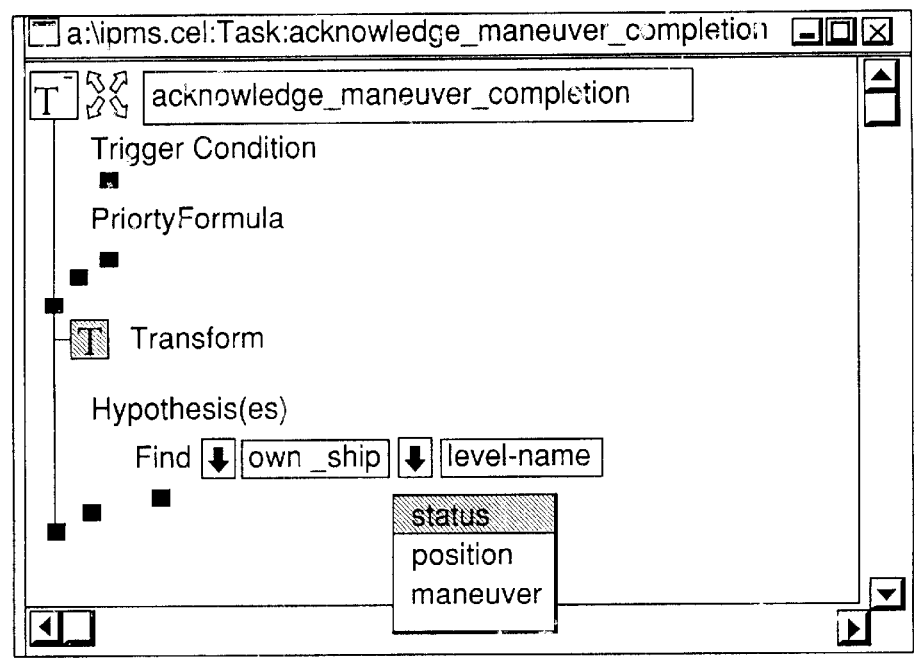
Figure 31:
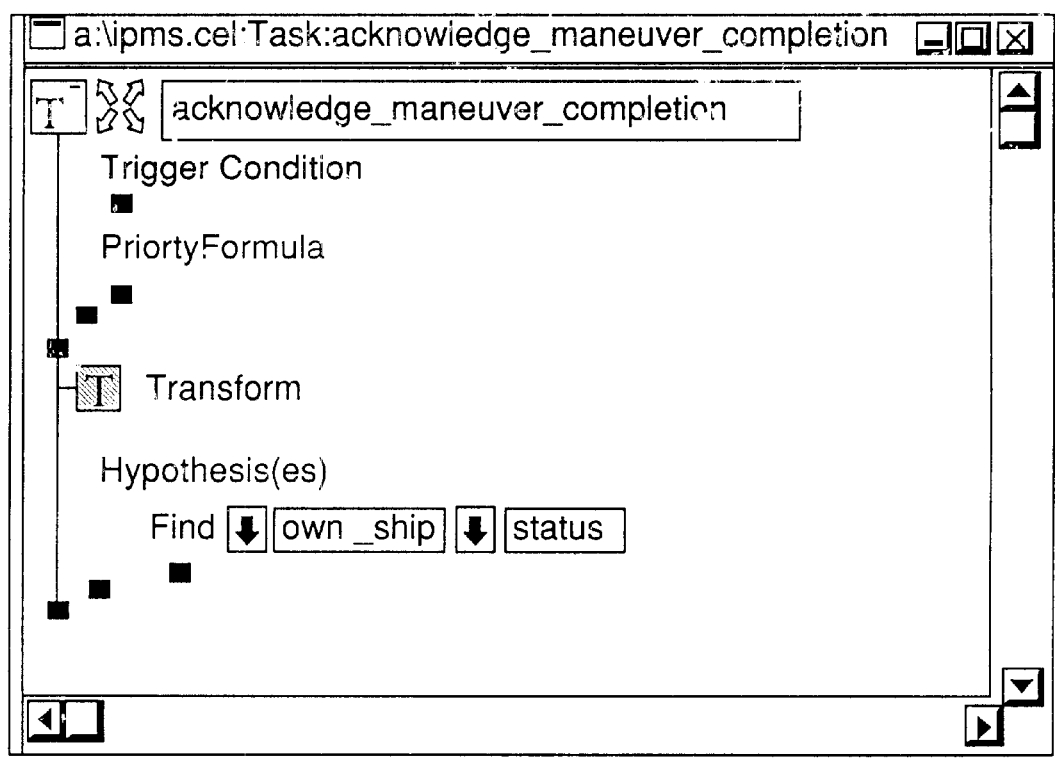

The Find operator is inserted as a child of the Hypothesis(es) component details. This is appropriate because the result of the Find operator will be a hypothesis or a list of hypotheses (if more than one hypothesis were found), which is precisely what the parent Hypothesis(es) detail needs. This appearance of the Find operator after insertion is shown in FIG. 28. Next, the user needs to define the location of the hypothesis to be found, and does so using the down arrows in the Find label, as shown in FIG. 29–31.

Figure 32:
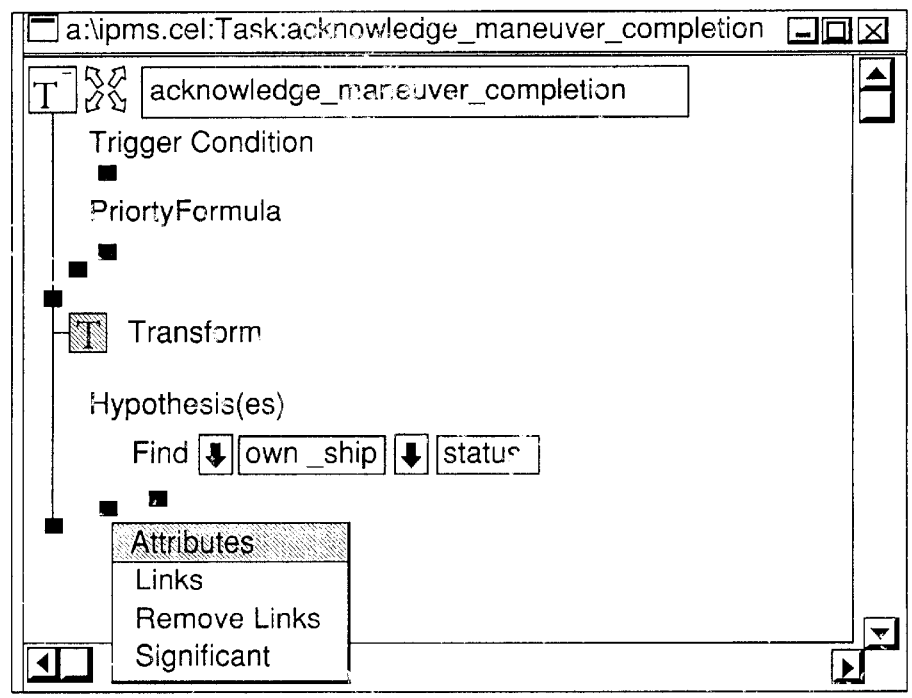
Figure 33:
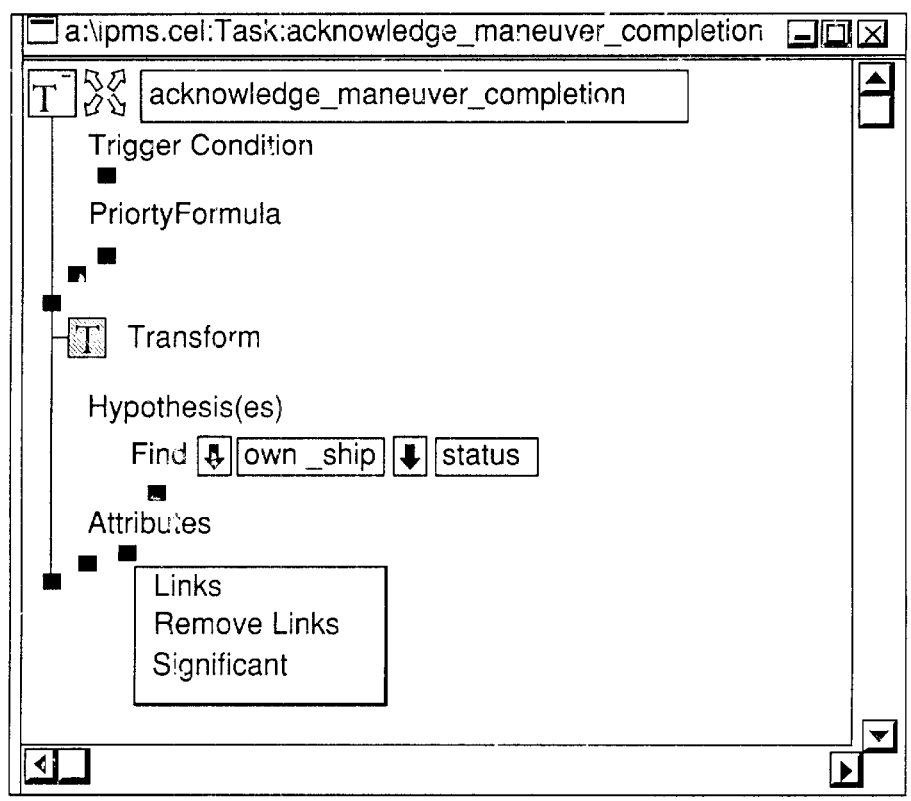

At this point, the one required detail (i.e., hypothesis(es)) is fully defined, but the Transform still needs other details, specifically, what needs to be transformed and how it is to be transformed. In general, a Transform element can: change a hypothesis' attribute values; change the links (i.e., hypotheses to which it is linked); remove one or more of the hypothesis' links; or some combination of the above. These choices can be seen in the pop-up menu generated by the highest level (i.e., left-most) insertion handle under the Transform element, as shown in FIG. 32. In this case, the user selects the Attributes choice, resulting in the insertion of an Attributes detail component, as shown in FIG. 33. This one detail component is used to define any and all changes to the attributes of the hypothesis(es) selected in the first detail component. Thus, the workbench of the present invention knows that changing attributes is no longer a choice for the top-level insertion detail insertion handle, and so removes Attributes from the list, as seen in FIG. 33 when the pop-up menu from the top-level detail insertion handle is again viewed.

Figure 34:
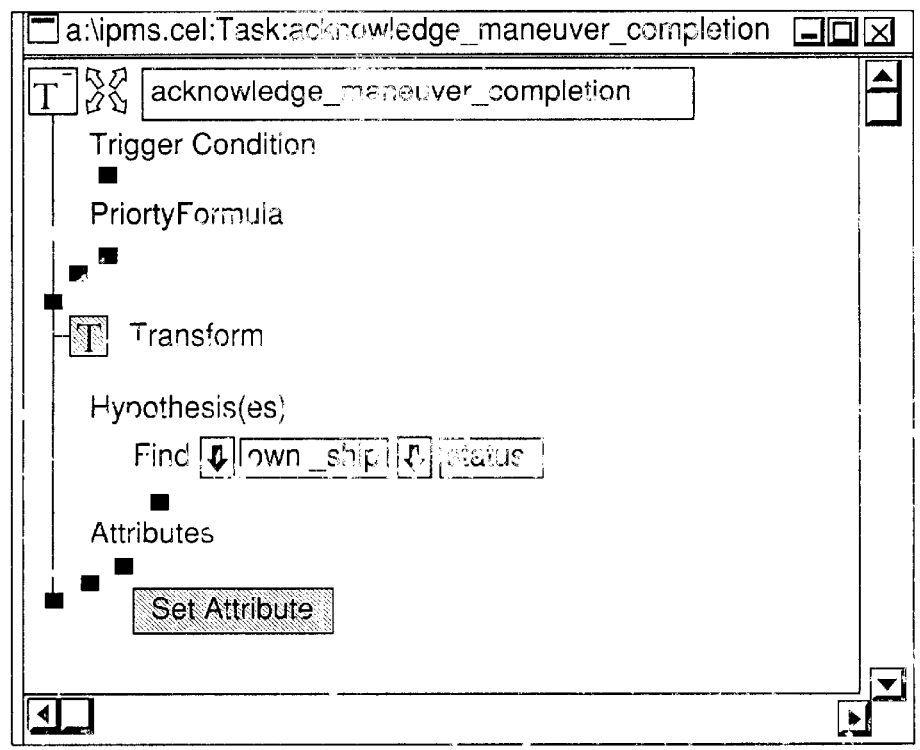
Figure 35:
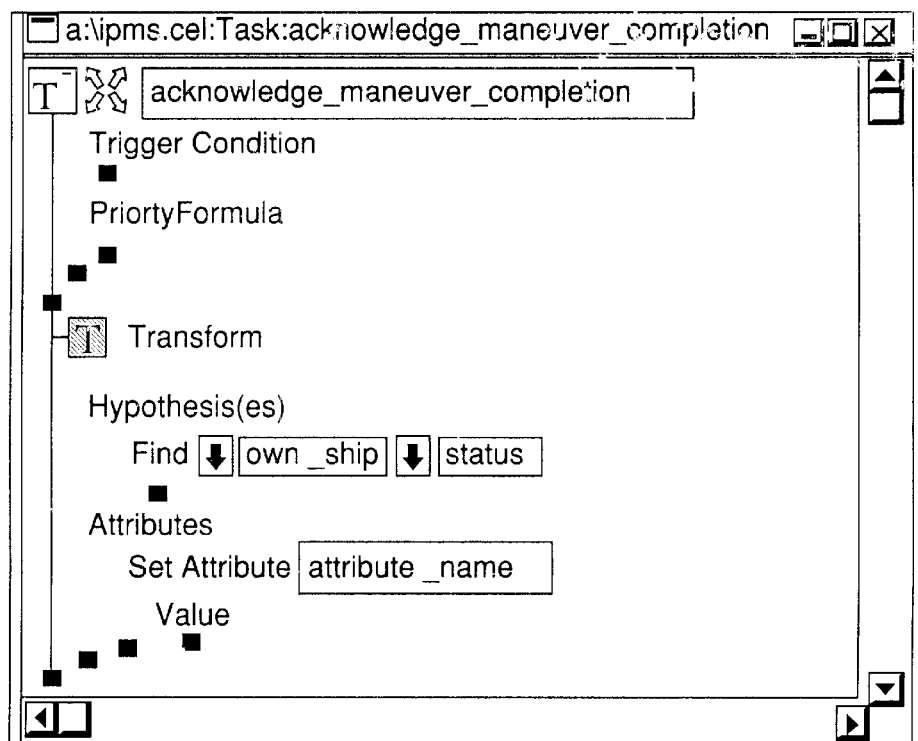
Figure 36:
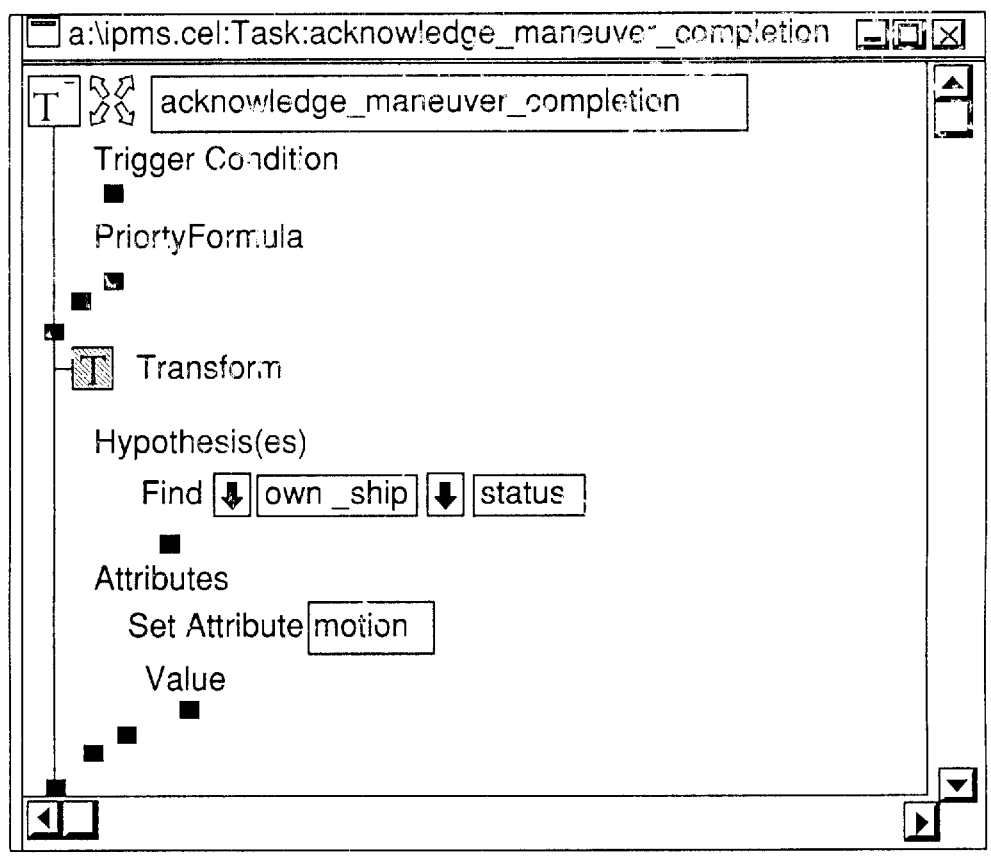
Figure 37:
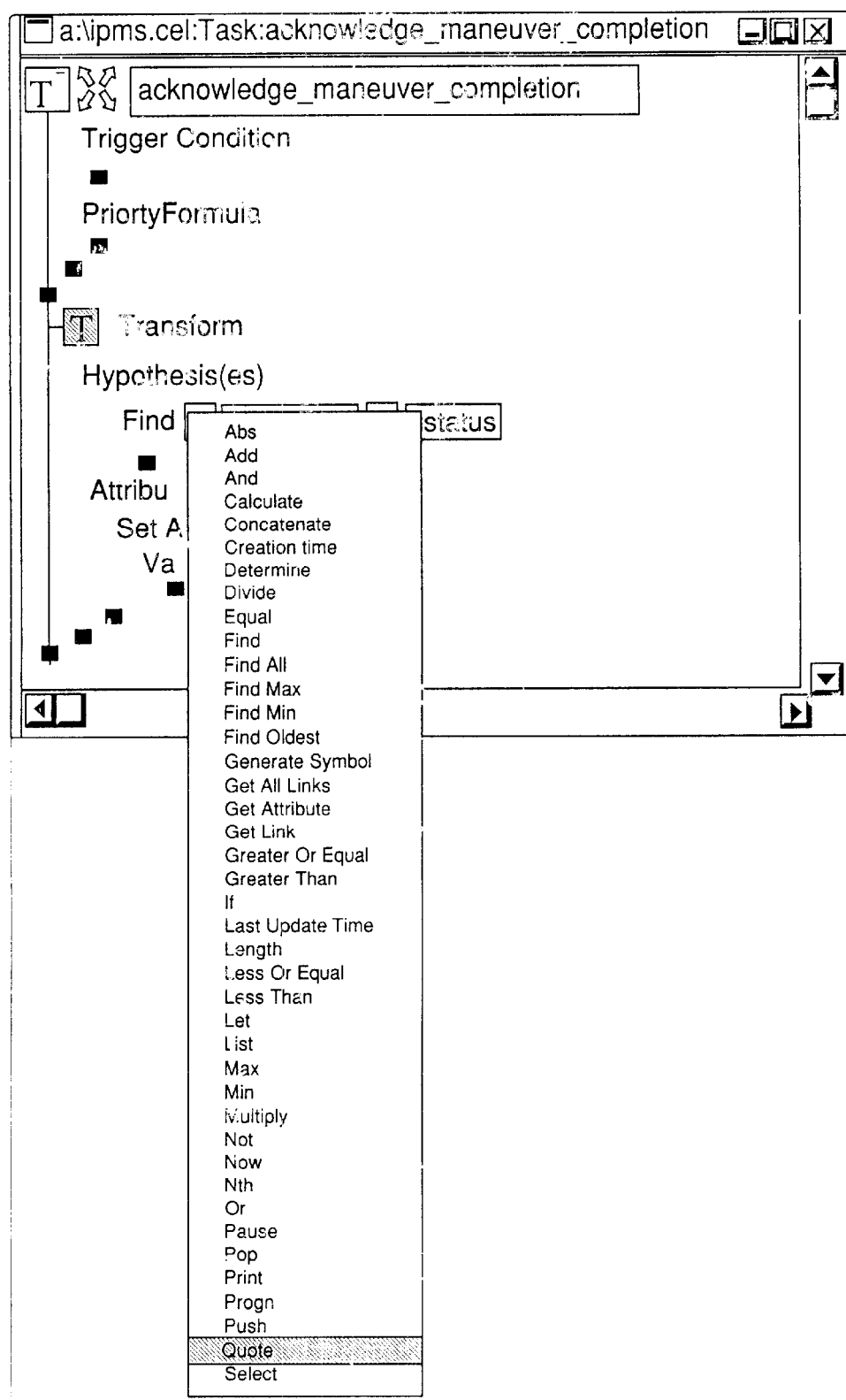
Figure 38:
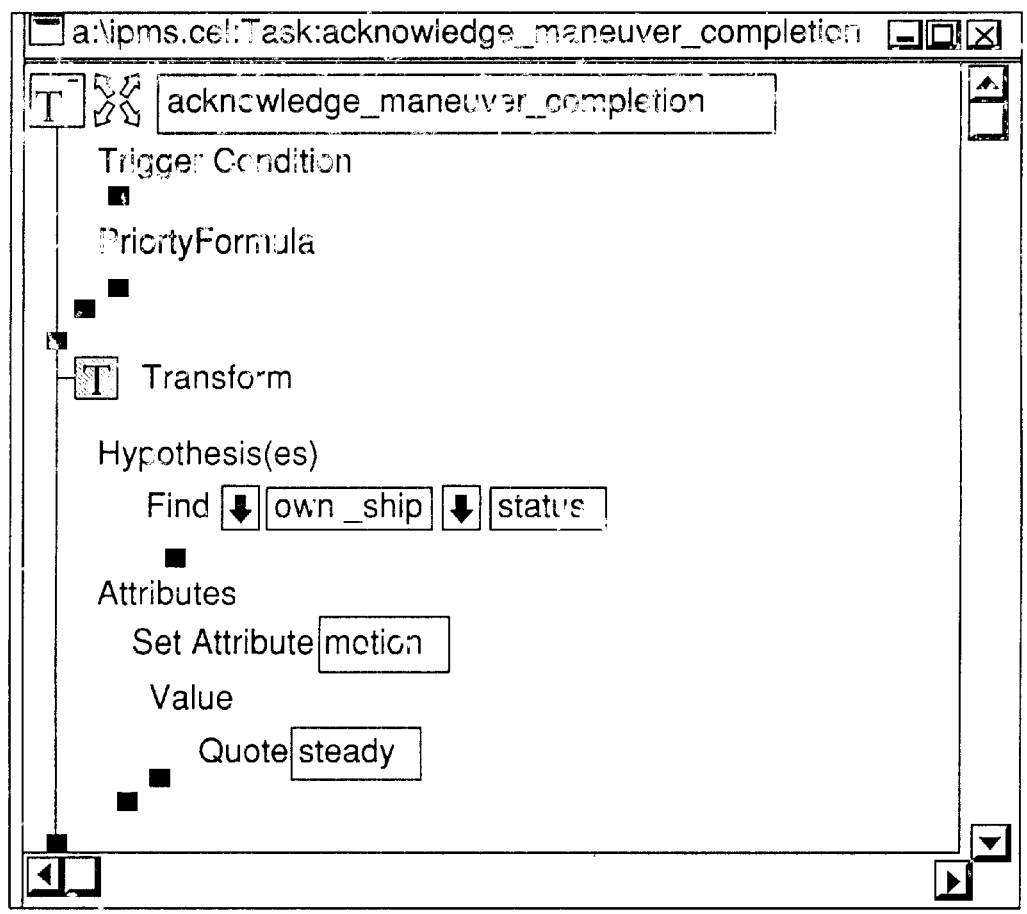

Finally, the user displays the menu generated by the child insertion handle under the Attributes detail component, as shown in FIG. 34 and selects 'set_attribute', to insert this as a child details of the Attributes component detail, as shown in FIG. 35. The workbench of the present invention inserts the Set_Attribute detail with an unnamed label, which the user changes to the name of the desired attribute in FIG. 36. Finally, in FIGS. 37 and 38, the user wants to use a Quote operator to enter the attribute value (because the value is a character string. This will generate an insertion handle in place of the deleted detail, as shown in FIG. 37. This handle is then used to choose and insert the Quote operator as a child detail of Set_Attribute. The result, after the string has been typed in, is shown in FIG. 38.

The Communication Shell

The workbench of the present invention is intended to be a highly reusable, portable package for developing various types of intelligent agents. The execution engine takes a CEL representation of the command and control logic of an intelligent agent, and executes that representation. During this execution, the agent receives inputs from the external application environment via its perceptual monitors, and effects actions in the external environment via action functions. These interactions with the external world are transacted through a communication shell that separates the execution engine from the external 'world.'

In a practical sense, the shell can be conceived of as an Application Program Interface (API) for the execution engine. Each application that will interact with an external environment, including with a human user, must have a communication shell that manages the information flow from the external environment to the virtual world of the model and BATON. The procedures for writing the shell software for the agent's actions and perceptual monitors, and for linking this shell code to the workbench, are discussed below.

Adding Additional Shell Actions and Demons

To execute an application with the BATON execution engine, a shell must be first defined. The Shell is the piece of C++ code that interfaces the execution engine with the external world. It must be linked with the execution engine to obtain an executable that is specific to the application.

The Shell is used to define the action functions, the calculate functions, the demons, and a set of functions that BATON calls during various phases of the execution. Each action function is defined by defining an instance (possibly static) of the class Action_Function. This class has a unique constructor that takes as its arguments characters that define the name of the action function as it must be used in CEL, and a pointer to the C++ function to call when invoking this action. The C++ type definition of the function is:
Value_Handle (*Cpp_Funct_Ptr) (const Vectory<Value_Handle>&);
The Value_Handle type is used to provide an automatic garbage collection mechanism on a generic type that can hold different data type such as Number, String, Symbol, or Cell.

Calculate functions are similar to action functions except that the value returned is effectively used by the model. Calculate functions are defined by defining an instance of the Calculate_Function class. The constructor requires the same arguments as the Action_Function class. An example of a Calculate_Function definition is:

```
Calculate_Function absolute_bearing ("absolute_bearing",
calculate_absolute_bearing);
An example of a C++ function used by such calculate function is:
Value_Handle calculate_absolute_bearing
( const Vectory<Value_Handle>& args )
  {
    return new Number( absolute_bearing( *Number::cast( args[ 0 ]),
    *Number::cast( args[ 1 ])));
  }
```

The function absolute_bearing returns a double that is used to construct a Number. The pointer to Number constructed by the new operator is used for constructing the Value_Handle to return.

Demons are defined by defining an instance of the class Demon. The constructor of this class takes a string that represents the name of the demon as defined in the CEL model. An example of a demon definition is: Demon update_ownship("ownship_update");

A demon can be invoked by the C++ program by calling the member function 'run' that takes as argument an optional reference to a Vectory<Value_Handle>. An example of a function that invokes the demon update_ownship is:

```
void call_update_ownship( double x, double y, double course, double speed )
  {
    Vectory<Value_Handel>vect_value( 4 );
    vect_value[ 0 ] = Value_Handle( new Number (x));
    vect_value[ 1 ] = Value_Handle( new Number (y));
    vect_value[ 2 ] = Value_Handle( new Number (course));
    vect_value[ 3 ] = Value_Handle( new Number (speed));
    update_ownship.run( vect_value);
  }
Workbench Debugging Tools
```

The COGNET framework provides a powerful method for formulating models of intelligent reasoning processes, and the workbench of the present invention provides a vehicle for translating these models into executable interface agent software. In models of more than trivial complexity, however, it is virtually impossible to concretely test the correctness of either the model logic or the CEL implementation by simple examination. As with all software, it is still necessary to execute the reasoning model and test its correctness. During execution of a model, one quickly discovers places where the model fails to operate as desired. Finding and correcting model problems can be an easy or a difficult process, depending on the tools provided to support the process. To make this as easy as possible, the workbench of the present invention includes a set of debugging tools. These tools allow the user to 'look inside' the model while it is being executed and to see why it is doing what it is doing.

The workbench debugging functionality is divided into four sets of tools:

(1) The trace tools allow the workbench user to create display information that traces the execution of the model at a user-defined level of detail. The trace tools allow the course of a model execution to be examined without any intervention in the execution process itself. The other tools may intrude on the execution process in various ways.

(2) The step tools allow the user to place the BATON execution engine in a mode where it will pause after each execution of each procedural task and/or goal. When paused, the workbench user can command BATON either to remain in the step-execution mode, and execute another operator and then pause; exit the step-execution mode and resume normal execution; or terminate execution and return to the main application (either the workbench of the present invention or the operating system in the case of stand-alone applications).

(3) The display tools allow the user to examine the internal state of the model when the execution is paused. The user can examine the contents of all or parts of the blackboard, at varying levels of detail. The user can also examine various system-level information, such as the time.

(4) The debugging expression tool is actually a special case of the display tool. The user can define a debugging expression that accesses variables and/or symbolic attributes inside the model being executed. While the execution is paused, the user can have this expression evaluated and displayed as a way of examining higher order relationships inside the model.

The debugging functionality in the workbench of the present invention is available whenever an agent model is being executed, either inside the workbench or outside the workbench as a stand-alone application. However, the interface to the debugging functionality is different in these two contexts. Within the workbench, debugging is controlled through a graphical interface, described below. When BATON and the agent's reasoning (i.e., COGNET) model have been separated form the workbench and linked as a stand-alone application, debugging is controlled through a command-line interface from the C console window, also described below.

The workbench debugging graphical interface (i.e., the DGI) can be run any time the workbench is executing. As seen in FIG. 39, the DGI ('Inspector') is divided into five control panels:

Model execution controls (Resume, Restart, Quit).

Break/Step controls. These allow the workbench user to direct BATON to break off execution of the model at different types of events, and to continue execution step-wise (i.e., one operator at a time). The workbench user can direct BATON to break off execution at the execution of the next Goal operator (Goal check-box), Task operator (Task check-box), perceptual monitor (Demon check-box), Method (Method check-box), keystroke-sequence (KSR check-box), Perform Action operator (Action check-box), Suspend-until operator (Susp.Until check-box), Suspend For operator (Susp.For check-box), Post operator (Post check-box), Unpost operator (Unpost check-box), Transform operator (Transform check-box), or Determine operator (Determine check-box) by clicking in the desired check-box(es). BATON will then execute the model until the next checked operator or event-type occurs, and then stop executing. The user then commands BATON to execute the next 'step' by hitting the Step button. If, during step-wise execution, the user wishes to discontinue step-level debugging, the selected Goal and/or Task indicators should be de-selected, and unconstrained execution will resume.

Trace controls. These allow the user to trace the execution of the agent model at various levels of details. Each of the listed items in the Trace panel, when selected, will cause the DGI to report each time an event of that type occurs—the execution of a Goal operator (with the Goal check-box), a Task operator (with the Task check-box), a perceptual monitor (with the Demon check-box), a Method (with the Method check-box), a keystroke-sequence (with the KSR check-box), a Perform Action operator (with the Action check-box), a Suspend-until operator (with the Susp.Until check-box), a Suspend For operator (with the Susp.For check-box), a Post operator (with the Post check-box), n Unpost operator (with the Unpost check-box), a Transform operator (with the Transform check-box), or a Determine operator (with the Determine check-box). An event is started and completed. For example, the Goal box, when selected, will cause the DGI to report each time a goal is started and completed.

Display controls. This panel contains buttons that allow the user to display various attributes of the model when it is paused. The Time button will cause the DGI to display current time. The Blackboard button will cause the DGI to display the contents of the blackboard. Only the panels with active hypotheses will be displayed, and only the identification number of each hypothesis on each level will be displayed. The Tasks button will cause the DGI to display all currently executing tasks. The Environment button will cause the DGI to display appropriate environment information. The attributes of an individual hypothesis can be displayed by entering the hypothesis number into the text-insertion field and selecting the Hypothesis button.

Enable/disable panel. This panel contains a number of preference settings which allow the user to enable/disable specific features of BATON execution. When the Pause box is selected, BATON will execute Pause operators within the current model; otherwise these operators will be ignored. When the Print box is selected, BATON will execute Print operators within the current model; otherwise these operators will be ignored. When the Scheduling on all updates box is selected, BATON will evaluate all trigger conditions every time the blackboard changes; otherwise triggers will be evaluated only when a blackboard update that has been declared as significant occurs. When the Ext. Interrupts box is selected, BATON will allow external interruptions (e.g., pauses in the external environment); otherwise these events will be ignored. The Deferred Print box is meaningful only when the Print box is selected (i.e., when printing is enabled). When this box is selected, BATON defers the actual printing of output from print operators until there is processing time available, thus preventing printing operations from interfering with model execution. Otherwise Print operators will be executed and completed in the proper sequence. When the Profiler box is selected, BATON will execute a separate model profiling function, which recapitulates the full model structure and gives counts of the number of times each element has executed (for procedural operators) or been accessed (for hypotheses). All outputs or reports produced by the DGI are displayed in a separate window labeled the output log (FIG. 40), along with other messages or outputs from BATON.

Figure 41:
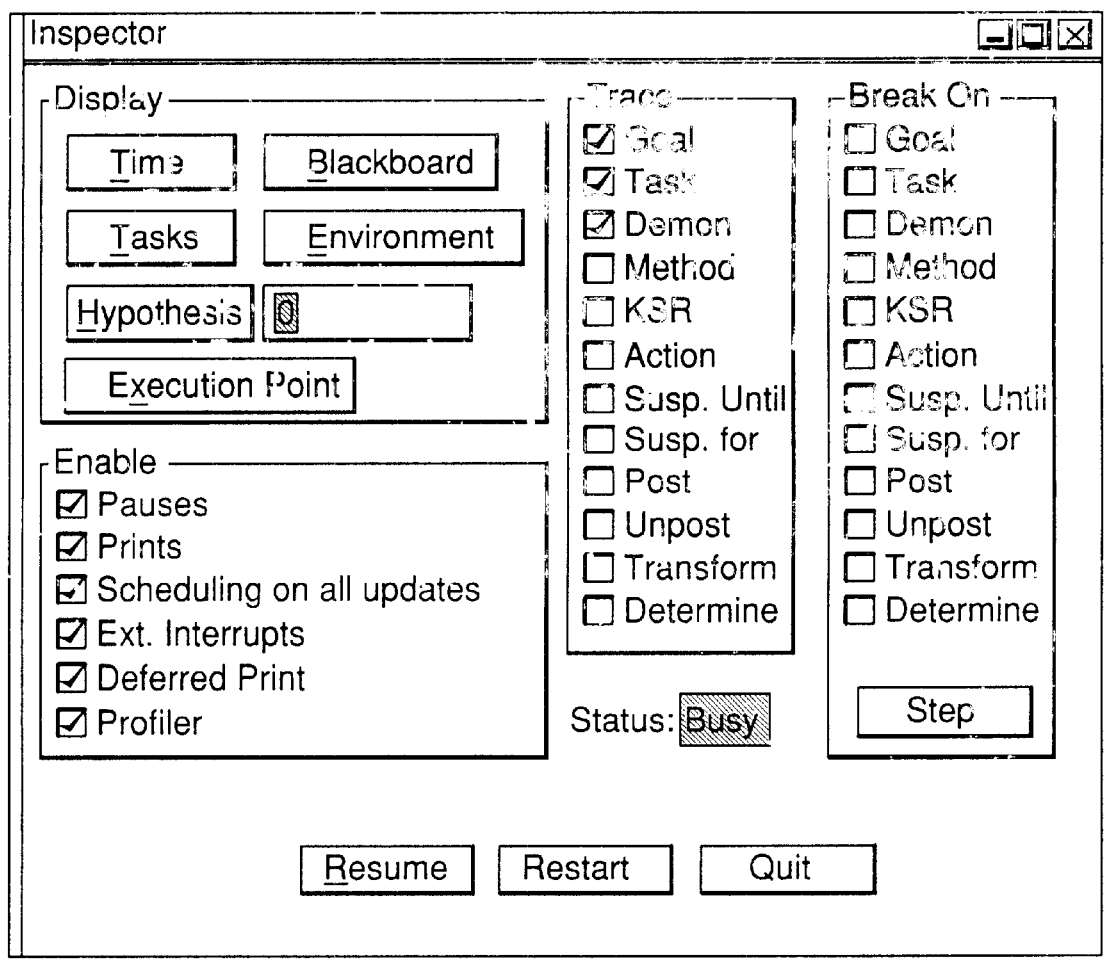
Figure 42:
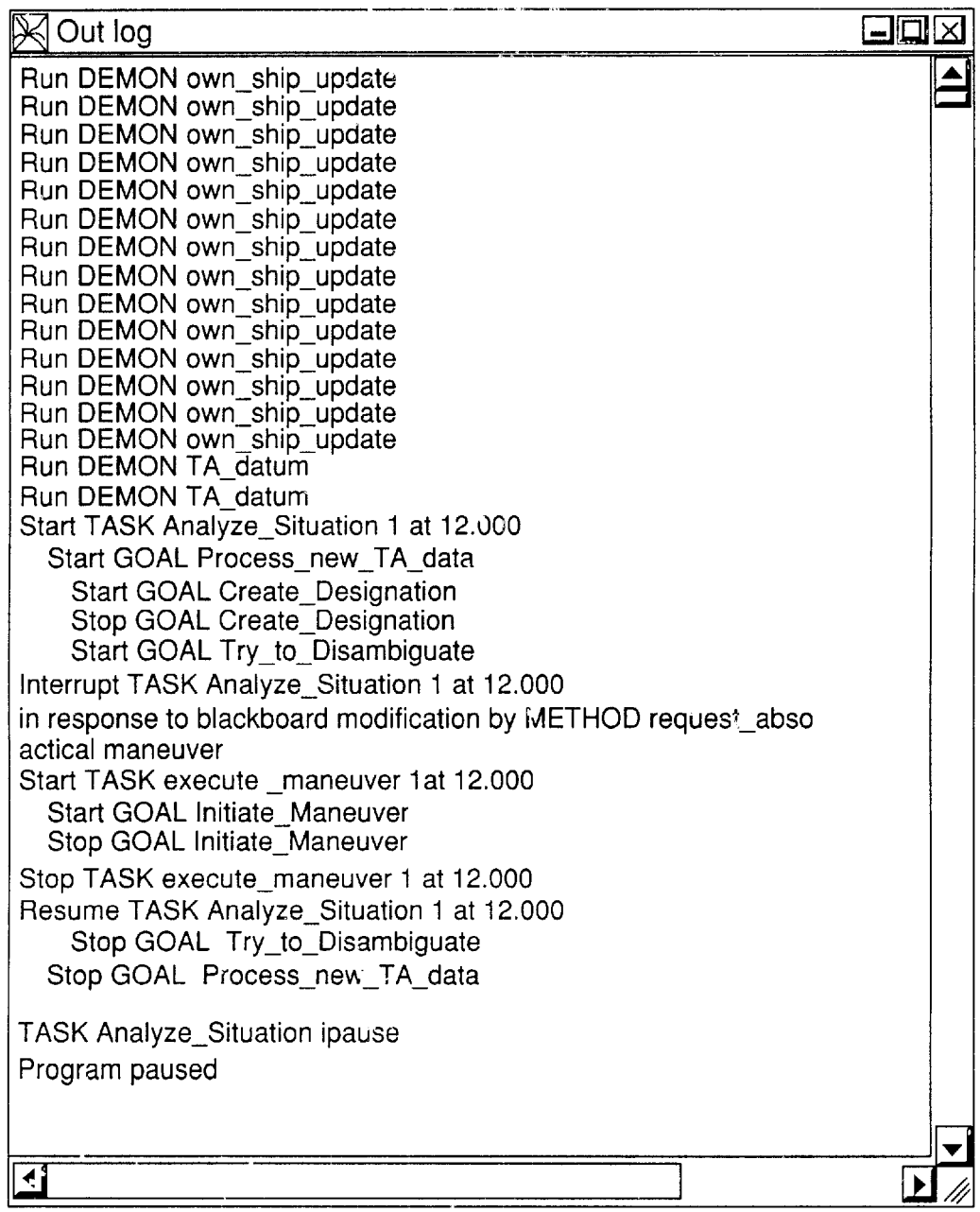
Figure 43:
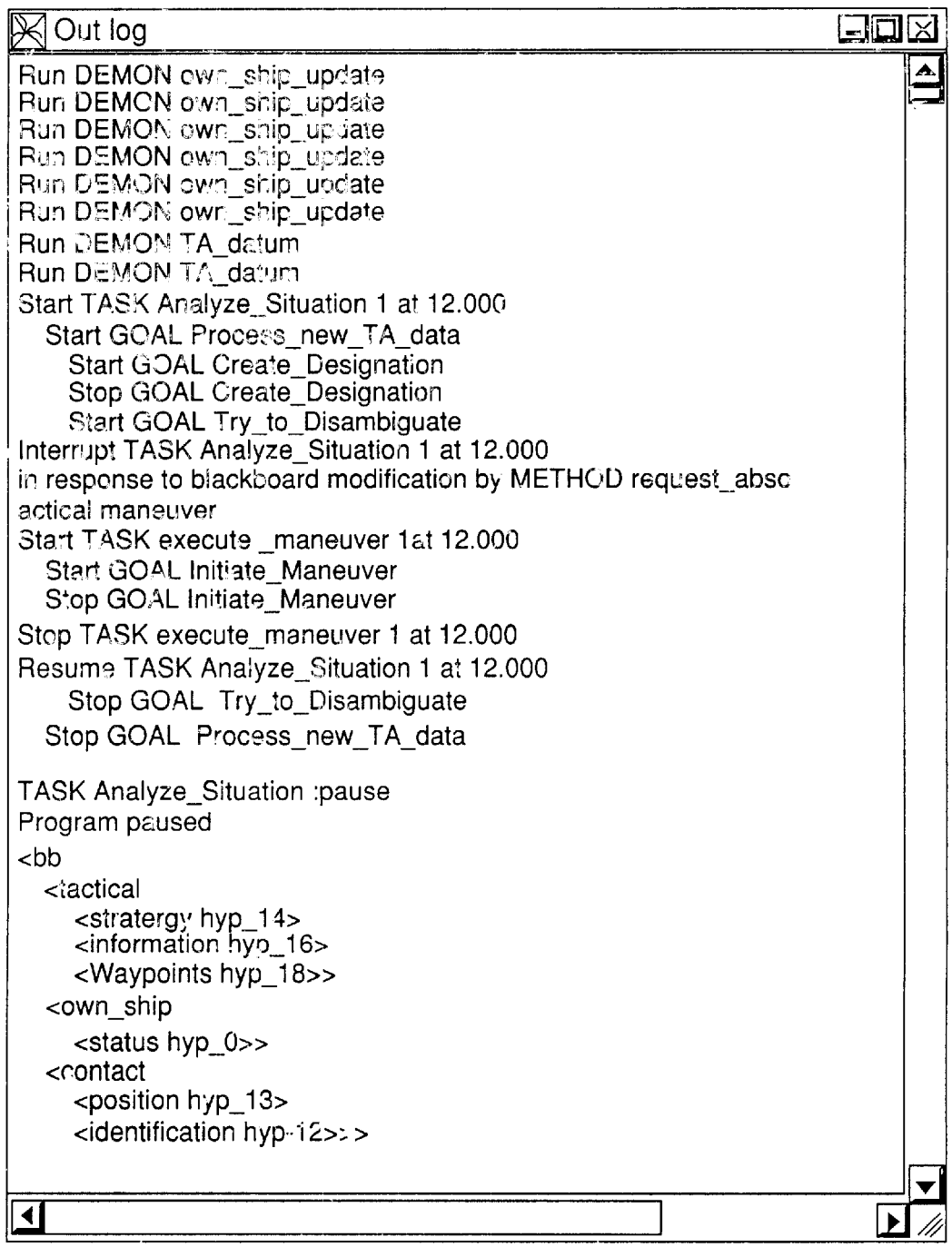
Figure 44:
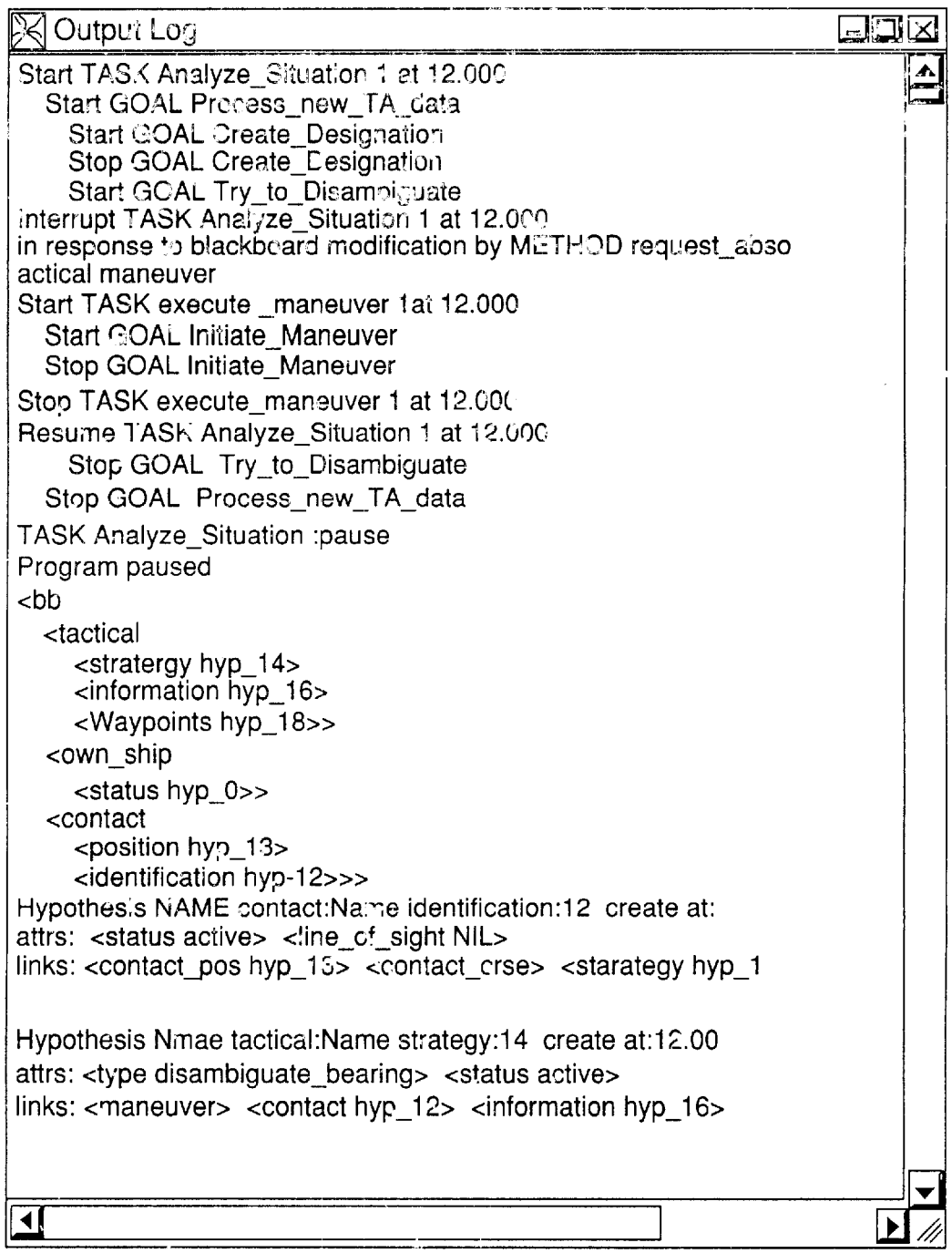

The use of the Inspector is shown in FIGS. 41–46. In FIG. 41, the user has created a set of DGI settings that will control the execution of the model. Before starting execution, the Inspector has been set up to trace the execution of each goal, task, and demon. The result of this is shown in the output log window, in FIG. 42. After observing the trace, the user then clicks on the pause button, decides to examine the blackboard contents, and clicks on the blackboard button. The result is shown in FIG. 43. From this display, the user then focuses on the content of two specific hypotheses; hypothesis 12, on the contact panel, and hypothesis 14 on the tactical panel. These are displayed by typing in the hypothesis number and selecting the Hypothesis button. The resulting display after the second Hypothesis button selection is shown in FIG. 44.

Figure 45:
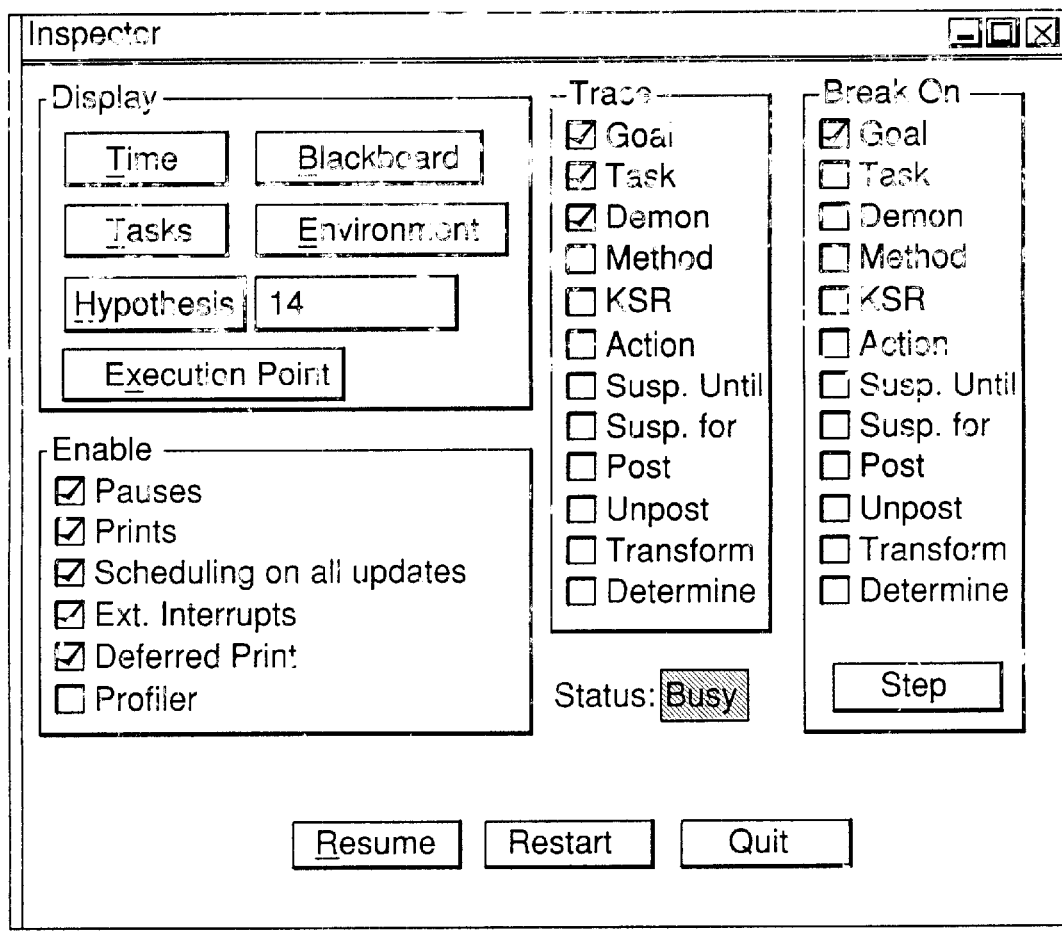

From this exploration of the model, the user then decides to resume execution, but to stop it after each goal started and stopped. This is done by selecting the Goal box on the Step panel, as shown in FIG. 45. The user resumes execution by clicking on the Resume button, and allows the model to execute to the start of the next goal, at which time the model is automatically paused. The user then again resumes the execution to see what processing occurred within that goal, letting it pause again at the end of the goal. The resulting display is shown in FIG. 46.

When model development is complete and the user is interested in running the interface agent in a more compact and efficient manner, the model can be executed directly from BATON, as discussed above. The debugging functionality of the DGI is still available to the user running in this direct BATON mode, but the interface changes. Specifically, all interaction with the debugger occurs in the C console window through keyboard commands. Since the functionality remains the same, no further description need be provided in this regard.

COGNET Execution Language

(CEL)

The following is a description of the specific syntax and semantics of the COGNET Execution Language—CEL. CEL is a symbolic processing language with many similarities to LISP. The basic components of CEL are operators and can be classified into descriptive and functional groups. The structure of the blackboard is defined using the descriptive operators while the GOMS-like task hierarchy uses the functional operators.

NOTATION

The syntax descriptions of the CEL operators use the following conventions:
bold indicates keywords used in the language that must appear as written
italics represents names that the programmer chooses
* identifies elements that may be repeated any number of times (except in the case where it is bold which represents the multiplication operator)
[ ] Any item enclosed in square brackets is optional (while parentheses '( ')' play an integral role in the language, these brackets are only for notational purposes)
Blackboard The blackboard is the main data structure used for describing and storing information related to the problem and its solution states. It is divided into panels that are subdivided into levels. Each level describes a class of hypotheses by enumerating the attributes and links that its members may possess. At run time, the levels store instances (hypotheses) that have been posted to the blackboard.

The operator for describing the blackboard has the following syntax:

```
(blackboard bb_name
    (panel panel_name
        (level level_name
            [(attributes attr_name* )]
            [(links (link_name reverse_link_name)*)]
        )*
    )*
)
``` bb_name is the programmer-defined name of the blackboard. Each panel in the blackboard (of which there can be many) has a name—panel_name—and a set of levels. The individual levels also have names—level_name—and either or both a set of attributes and a set of links to other levels elsewhere in the blackboard. Each attribute has a name but no type information for the values it may take on. Each link also has a name representing the forward direction of the link followed by a reverse link name representing the corresponding backward direction.

Names in CEL consist of case-sensitive sequences of alphanumeric characters excluding '"','"','\', '"','(', ')', '.',',','+', and '−', and beginning with a character. Hence the following can be used as identifiers:

panel_one IsItRaining? Up/Down panel_1 while the following are not:

this*that here-or-there 'hello there' 12_eggs

Attributes

An attribute is specified as a name consisting of alphanumeric characters as previously described. Its value can contain any type of data among the following:

| a number | 1, 2.0, −5 |
| a character string | "Hello, world!", "smile" |
| a symbol | foo, red, apple |
| a list of any of the above | (1 red apple makes 'me' 'smile') |

Links

A link is specified by a name and contains a list of hypotheses. Referring to a link of a hypothesis reveals which hypotheses are linked to this hypothesis in the semantic context of this link. For instance, for two hypotheses A and B representing two instances of a vehicle description class, a link named 'beside' can be use to express the relationship that vehicle A is beside vehicle B. Another link named 'has' can express a relationship between A and an instance W of a wheel description class.

Links are bi-directional. For each link, there is a reverse link. When describing a link, the reverse link name must also be provided. When the link of a hypothesis is modified, the reverse link of the linked hypothesis is automatically updated. In the previous example, the link relation A 'has' W implied a reverse relation W 'is_part _of' A where 'is_ part_of' would have been specified as the reverse link of 'has'.

Hypotheses

The data elements contained in the blackboard are traditionally called 'hypotheses'. Each hypothesis is an instance of a class defined for the particular level of the blackboard to which it belongs. A hypothesis has either or both a set of attributes and a set of links.

Access

There two types of operators to access the blackboard: write operators that modify the blackboard content, and read operators that donot.

Write

Three kinds of operations can modify the blackboard: post, unpost and transform. The CEL syntax of these functions are as follows:

```
(post [(assign_to variable_name)]
    panel_name level_name
    [(significant)]
    [(attributes (attr_name value)*)]
    [(links (link_name hypothesis_or_list_of_hypotheses)*]
)
```

This first argument creates a hypothesis and posts it to the blackboard in the specified level of the specified panel. The resulting hypothesis can be assigned to a local variable passed as the first optional argument. The panel_name and level_name specify the type of the hypothesis as well as the level in which the hypothesis must be posted. The values of the attributes are of generic type (any type of value) and are specified as attribute name-value pairs. Attributes that are not specified will have the default NIL value. Links contain a list of hypotheses. It is possible to provide a single hypothesis for a link, in which case the list will be automatically created. The resulting list, or the one passed as an argument, will constitute the value of the link. It is assumed that all of the hypotheses in a specific link are of the same type. Unspecified links have a default value of an empty list.

(unpost hypothesis_or_list of hypotheses [(significant)])

Removes from the blackboard and destroys the hypothesis passed in the first argument. When a list of hypotheses is provided instead of a single hypothesis, all the hypotheses in the list are removed. All the hypotheses must be of the same type. (transform hypothesis or list of hypotheses

```
(transform hypothesis_or_list_of_hypotheses
    [(significant)]
    [(set_attribute attr_name value)*))
    [(setlink link_name hypothesis)*]
    [(set_all_links link_name hypothesis_or_list_of_hypotheses)*]
    [(remove_link link_name hypothesis)*]
    [(remove_all_links link_name)*]
    [(remove_link link_name list_of_hypotheses)*]
    [(push_link link_name hypothesis)*]
    [(push_link link_name list_of_hypotheses)*]
)
```

Changes the value of the attributes and links of the hypothesis passed in the first argument. When a list of hypotheses is provided instead of a single hypothesis, the transformation is applied to all of the hypotheses in the list. All the hypotheses must be of the same type. The values of the attributes are of generic type (any type of value) and are specified as name/value pairs. Attributes that are not specified will not be changed. Links contain a list of hypotheses. It is possible to provide a single hypothesis for a link, in which case a list will be automatically created with this hypothesis. The resulting list or the one passed as argument will replace the existing list of hypotheses for the link. It is assumed that all of the hypotheses in a specific link are of the same type.

The optional keyword significant, when used, indicates that a post, unpost, or transform might be relevant to other tasks, and will therefore force a rescheduling of all tasks. Note that this might cause the current task to be interrupted by some other task instances.

Read

The read operators are used to test or retrieve attributes, links, or hypotheses in the blackboard. They do not affect the blackboard content. The CEL syntax of these functions is as follows:

(attribute attr_name [hypothesis])

Returns the value of the attribute whose name is given by the first argument. The second argument is optional and indicates the hypothesis from which the attribute must be taken.

(link link_name [hypothesis])

Returns the first hypothesis associated with the link whose name is given by the first argument. The second argument is optional and indicates the hypothesis from which the link must be taken.

(all_links link_name [hypothesis])

Returns all the hypotheses associated with the link whose name is given by the first argument. The second argument is optional and indicates the hypothesis from which the link must be taken. If no hypothesis is provided, it is assumed that the operator is used within a context where there is a default hypothesis, as in the search criteria of a find operator.

```
(find [(assign_to variable_name)]
    panel_name level_name
    [condition]
)
```

Finds the first (most recently created) hypothesis in the specified level of the specified panel of the blackboard that matches the search criteria passed as the condition. The resulting hypothesis can be assigned to a variable passed as the first optional argument. The panel_name and level_name specify the level in which the search for the hypothesis must occur. The last argument specifies the search criteria that must be applied to test every hypothesis of the level. The search criteria is a logical formula that specifies the attribute and link values making up the search template. Every hypothesis of the specified level is tested, in turn, until the criteria can be evaluated to a non-NIL value. The corresponding hypothesis is then returned. When no search criteria are provided, the first hypothesis in the level (most recently created) is returned. Hypotheses are sorted by order of creation so that the first one is the last created. When no hypothesis can be found, the function returns the NIL value.

```
(find_all [(assign_to variable_name)]
    panel_name level_name
    [condition]
)
```

Finds all the hypotheses in the specified level of the specified panel of the blackboard that match the search criteria passed as argument. The resulting list of hypothesis can be assigned to a variable passed as the first optional argument. The panel_name and level_name specify the level in which the search for the hypotheses must occur. The last argument specifies the search criteria that must be applied to test every hypothesis of the level. The search criteria is a logical formula that specifies the attribute and link values making up the search template. Every hypothesis of the specified level is tested in turn. All the hypotheses for which the criteria can be evaluated to a non-NIL value are returned in the result list. When no search criteria are provided, the list of all the hypothesis in the level is returned. When no hypothesis can be found, the function returns an empty list.

```
(find_oldest [(assign_to variable_name)]
    panel_name level_name
    [condition]
)
```

Finds the oldest hypothesis in the specified level of the specified panel of the blackboard that match the search criteria passed as argument. The resulting hypothesis can be assigned to a variable passed as the first optional argument. The panel_name and level_name specify the level in which the search for the hypothesis must occur. The last argument specifies the search criteria that must be applied to test every hypothesis of the level. The search criteria is a logical formula that specifies the attribute and link values making up the search template. Every hypothesis of the specified level is tested, in turn, until the criteria can be evaluated to a non-NIL value. The corresponding hypothesis is then returned. When no search criteria are provided, the last hypothesis in the level (oldest) is returned. Hypotheses are sorted by order of creation so that he first one is the last created. This operator is identical to find except that it looks for hypotheses in reverse order from the level. When no hypothesis can be found, the function returns the NIL value.

```
(find_min [(assign_to variable_name)]
    panel_name level_name (for_attribute attr_name)
    [condition]
)
```

Finds the hypothesis with the minimum value for the attribute specified in the indicated panel and level of the blackboard that matches the search criteria passed as argument. The resulting hypothesis can be assigned to a variable passed as the first optional argument. The panel_name and level_name specify the level in which the search for the hypothesis must occur. The last argument specifies the search criteria that must be applied to test every hypothesis of the level. The search criteria is a logical formula that specifies the attribute and link values making up the search template. Every hypothesis of the specified level is tested in turn. Among all the hypotheses that match the criteria, the hypothesis with the minimum value for the attribute passed as argument with the keyword for_attribute is then returned. When no search criteria is provided, the hypothesis with the minimum attribute value in the level is returned. When no hypothesis can be found, the function returns the NIL value.

```
(find_max [(assign_to variable_name)]
    panel_name level_name (for_attribute attr_name)
    [condition]
)
```

Finds the hypothesis with the maximum value for the attribute specified in the indicated panel and level of the blackboard that matches the search criteria passed as argument. The resulting hypothesis can be assigned to a variable passed as the first optional argument. The panel_name and level_name specify the level in which the search for the hypothesis must occur. The last argument specifies the search criteria that must be applied to test every hypothesis of the level. The search criteria is a logical formula that specifies the attribute and link values making up the search template. Every hypothesis of the specified level is tested in turn. Among all the hypotheses that match the criteria, the hypothesis with the maximum value for the attribute passed as argument with the keyword "for_attribute" is then return. When no search criteria is provided, the hypothesis with the maximum attribute value in the level is returned. When no hypothesis can be found, the function returns the NIL value. An analogous family of read finctions operates on generic lists of hypotheses:
(select_first [(assign_to variable_name)]
   hypothesis_list
   [condition])
(select_all [(assign_to variable_name)]
   hypothesis_list
   [condition])
(select_oldest [(assign_to variable_name)]
   hypothesis_list
   [condition])
(select_min [(assign_to variable_name)]
   hypothesis_list (for_attribute attr_name)
   [condition])
(select_max [(assign_to variable_name)]
   hypothesis_list (for_attribute attr_name)
   [condition])

Implicit Attributes

For each hypothesis there are two pre-defined attributes in addition to the ones explicitly given in the blackboard description: creation time of the hypothesis, and last modification time of the hypothesis. These attributes are automatically assigned and modified by the execution engine and can be accessed using:
(creation_time [hypothesis])
Returns the time at which the hypothesis passed as an optional argument was created.
(last_update_time [hypothesis])
Returns the time at which the hypothesis passed as an optional argument was last transformed.

If no hypothesis is provided, it is assumed that the operator is used within a context where there is a default hypothesis, as in the search criteria of a find operator.

Task/Goal HIERARCHY

There is a limited set of functions used to describe the Task and Goal hierarchy of a COGNET model:
TaskS
The syntax of a task description is as follows:

```
(task task_name
    (trigger_condition condition)
    [(task_instance_context value*)]
    (priority_formula number)
    CEL_expression*
)
```

Defines a task whose name is given by the first argument. The task is instantiated whenever its trigger condition is evaluated to a non-NIL value and no similar instance already exists for this task. Two task instances are defined as similar if all the task instance context items provided by the optional task_instance_context argument are evaluated to the same value. When no task_instance_context is provided, only one task instance per task is allowed. Once a task instance has been created it can be canceled when the trigger condition of the task is no longer satisfied only if the task instance has not been started yet. Otherwise it will continue until completion or it is terminated prematurely with the end_task operator. Only the task with the highest priority is executed at any time. Tasks can suspend themselves or be interrupted by other tasks if its priority is less than another task. The priority is calculated with the priority formula given as argument. Trigger condition and priority are evaluated any time a significant change occurs or the time is updated. When activated, all the operators provided by the remaining arguments are executed in sequence.

Goals

The syntax of a goal description is as follows:

```
(goal unnamed
    [(precondition condition)]
    CEL_expression*
)
```

Executes in sequence all the operators passed as arguments if the optional precondition is evaluated to a non-NIL value, or when no precondition is specified. The execution of a goal can be suspended or interrupted.

Methods

Methods are defined separately, outside the scope of a task or a goal. They can therefore be used by different tasks or goals. They are provided with parameters that become their only context of execution. The description syntax of a method is as follow:

```
(define_method method_name
    (argument_flame*)
    CEL_expression*
)
```

The first argument is the method name. The second enumerates all the names of the arguments of the method. The remaining arguments are the operators that are executed in sequence when the method is invoked. A method can not be used to return a value. The execution of a method can be suspended or interrupted.

Initialization

Initialization tasks are a special type of task that execute prior to the running of a model. They are defined without trigger conditions and without a priority formula. They have the following syntax:
(initialization task_name CEL_expression*)
Initialization tasks are executed before the execution of the model in the order in which they are defined. When executing, all the operators provided by the remaining arguments are executed in sequence.

Determines

These operators are used to implement complex cognitive calculations. Inside a COGNET model, these functions are called with the following syntax:
(define_determine function_name (argument_name*) CEL_expression*)
Defines a determine function. The first argument is the name of the determine function. The second enumerates all the names of the arguments of the determine. The remaining arguments are the operators that are executed in sequence when the determine function is invoked. A determine function returns the value returned by the last operator executed in the sequence. The execution of a determine cannot be suspended or interrupted.

Shell-Related

There are two types of user defined functions: action functions and demon functions.

Actions

These functions are used to access the external environment, whether to obtain data or perform actions. They are defined as a part of an application by the programmer of a COGNET model. They are programmed in C++ language with a special format to allow their interpretation by the execution engine. Inside a COGNET model these actions are defined with the following syntax:

(perform_action action_name (argument_name*))

The first argument is the name of the action function. The second enumerates all the names of the arguments of the action. The execution of a perform_action cannot be suspended or interrupted.

Demons

The syntax of a demon description is as follows:

```
(demon demon_name
    (argument_name*)
    CEL_expression*
)
```

The first argument is the demon name. The second enumerates all the names of the arguments of the demon. The remaining arguments are the operators that are executed in sequence when the demon is invoked. Demons cannot be called within a model. They are called by C++ functions in the shell in response to stimuli in the external world. The execution of a demon cannot be suspended or interrupted.

Definition and Scope of Variables

The most general way to declare and assign a variable is to use the let operator with the following syntax:

(let variable_name value)

Let creates a new variable named with the value given by the first argument and assigns it the value provided by the second argument. If a variable of the same name already exists, the value of the variable will be restored to its previous value when the execution leaves the scope of the new variable. The scope of a variable extends from where it was defined to the end of the body in which it was defined, including all nested goals Once declared, a variable can be modified with update as follows:

(update varible_name value)

This updates the value of the variable given by the first argument with the value provided by the second argument. If the variable does not exist, a new one is defined and a warning is reported.

Symbols

The syntax of a symbol description is as follows:

(symbol symbol_name)

Blocks the evaluations of the symbol given as argument and returns the symbol itself instead of the value associated to it. Symbols can be used as variables to reference a value but can also be used as symbolic values themselves.

There are two special symbols used in CEL:

NIL: the NULL symbol t: the TRUE symbol.

List Manipulation

The syntax of the various list operators is as follows:

(list value*)

Returns a list made of all values passed as arguments.

(length list)

Returns the length of the list passed as argument.

(push value list)

Adds the value passed as first argument to the list passed as second argument. Returns the first element (i.e. newly added) of the list. that has just been added.

(pop list)

Returns the first element of the list passed as argument and removes it from the list. Note that this operator modifies the list so that the list will contain one fewer element.

(nth number list)

Returns the nth element (specified by the number passed as the first argument) of the list passed as the second argument.

Conditional Execution

The syntax of the various conditional operators is as follows:

(if condition (then then_expression)

[(else else_expression)])

Executes the operators provided in the then clause if the condition evaluates to a non-NIL value and executes the operators given in the optional else clause otherwise, if provided.

(cond (condition CEL_expression)*)

Executes the first expression whose associated condition is satisfied. Serves as a case statement.

(pause [condition])

Suspends the execution of the model when the given condition evaluates to a non-NIL value. The default condition is t (always true).

Loop Constructs

The syntax of the various loop constructs is as follows:

(while condition CEL_expression*)

While the condition passed as first argument evaluates to a non-NIL value, executes in sequence all the operators passed as remaining arguments. The loop will not terminate until the condition evaluates to NIL. The condition is evaluated at the beginning of each loop. The execution within a loop can be suspended or interrupted.

(for_each var list CEL expression*)

For each value of the list passed as the second argument, assign this value to the variable given as first argument and execute in sequence all of the operators passed as the remaining arguments. There are as many iterations as elements in the list passed as the second argument. The execution within a loop can be suspended or interrupted.

Task Control

The syntax of the various task control operators is as follows:

(suspend_until condition)

Suspends the execution of the current task until the condition given as argument evaluates to a non-NIL value. The condition is tested any time a blackboard change occurs or the time is updated. Once suspended, other tasks can resume or start their execution.

(suspend_for number)

Suspends the execution of the current task for the duration given by the argument. The time used is the simulated time provided by the shell and not the actual time used by the CPU. Once suspended, other tasks can resume or start their execution.

(suspend_all_until condition)

Suspends the execution of all tasks until the condition given as argument evaluates to a non-NIL value. The condition is tested any time a blackboard change occurs or the time is updated.
(suspend_all_for number)
Suspends the execution of all tasks for the duration given by the argument. The time used is the simulated time provided by the shell and not the actual time used by the CPU.
(end _task)
Terminates the current task instance immediately. This function is intended to be used to terminate prematurely a task once it has been detected that its current execution context has become inconsistent. This situation is most likely to occur after a task has been suspended or interrupted by another task.
(end_model)
Terminate the execution of the model.
Function Calls
The syntax of the various function calls is as follows:
(use_method method_name value*)
Calls the method whose name is given as first argument with the parameters provided by the remaining arguments.
(determine determine_name value*)
Calls the determine function whose name is given as first argument with the parameters provided by the remaining arguments.
(calculate calculate_name value*)
Calls the calculate function whose name is given as first argument with the parameters provided by the remaining arguments. Note, this operator uses the calculate function defined in the C++ shell.
(perform_action action_name value *)
Calls the action function whose name is given as first argument with the parameters provided by the remaining arguments. Note, this operator uses the action function defined in the C++ shell.
Logical Operators
The syntax of the various logical operators is as follows:
(and condition*)
Evaluates all its arguments in sequence until one of them is evaluated to a NIL value. The remaining arguments are not evaluated. Returns NIL if not all the arguments are evaluated to a non-NIL value.
(or condition *)
Evaluates all its arguments in sequence until one of them is evaluated to a non-NIL value. The remaining arguments are not evaluated. Returns NIL if no argument can be evaluated to a non-NIL value.
(not condition)
Returns NIL if its argument is evaluated to a non-NIL value and the symbol t (i.e. true) otherwise.
Relational Operators
The syntax of the various relational operators is as follows:
(=a b)
Returns the symbol t (i.e. true) if its two arguments are identical and NIL otherwise. Two lists are equal if all their elements are equal. Two different hypotheses with the same attributes are not equal. An hypothesis can only be equal to itself.:
(>a b)
Returns the symbol t if its first argument is greater than its second argument and NIL otherwise. (<a b)
Returns the symbol t if its first argument is less than its second argument and NIL otherwise.
(>=a b)
Returns the symbol t if its first argument is greater than or equal to its second argument and NIL otherwise.
(<=a b)
Returns the symbol t if its first argument is less than or equal to its second argument and NIL otherwise.

Arithmetic Operators
The syntax of the various arithmetic operators is as follows:
(+a b)
Returns the sum of its two arguments.
(−a b)
Returns the difference of its two arguments.
(*a b)
Returns the product of its two arguments.
(l a b)
Returns the quotient of its two arguments.
(abs a)
Returns the absolute value of its argument.
(min a b)
Returns the value of the argument that has the minimum value.
(max a b)
Returns the value of the argument that has the maximum value.
Miscellaneous
Other miscellaneous operators include:
(current_time)
Returns the current time as defined by the shell. A function must be called regularly within the shell to update this time.
(print value*)
Print the values of all the arguments
(concatenate value*)
Concatenates the printed version of all of the arguments.
(generate_symbol [symbol])
Returns a new symbol that is guaranteed to be different from any symbol previously generated by this function. It used to generate unique identifiers. The optional symbol given as an argument will be prepended to the generated symbol.

From the foregoing description, it can be seen that the present invention comprises a new and useful workbench for generating an interface agent. It will be appreciated by one skilled in the art that changes can be made to the embodiment described above without departing from the broad inventive concepts thereof. It is understood, therefore, that this invention is not limited to the particular embodiments disclosed but is intended to cover modifications within the spirit and scope of the present invention.

What is claimed is:

1. A computer-based intelligent agent for modeling an interface between a system and a user performing a predefined function in connection with the system, the intelligent agent comprising:

an instance structure representative of a current problem instance;

a perceptual process for executing a plurality of perception knowledge structures, each perception knowledge structure being representative of information that must be perceived from the system, the perception knowledge structure including sub-structures for obtaining information from the system and for updating the instance structure with the obtained information, and wherein the perceptual knowledge structures translate external events into symbolic representations and establish connections to previously acquired perceptual knowledge;

a cognitive process for executing goal-based and hierarchically-organized procedural knowledge components, the procedural knowledge components including task performance structures, wherein each task performance structure includes a goal hierarchy having a single top-level goal and a number of sub-goals, and wherein the goal-based and hierarchically-organized procedural knowledge components are executed by matching patterns against sub-goal preconditions, each task performance structure being representative of a task the intelligent agent can be called on to perform, the task performance structure including sub-structures for accessing the instance structure to obtain instance information and for modifying instance information in the instance structure, each task performance structure having a triggering condition for triggering the task performance structure, the triggering condition being based on a current state of the instance structure as updated by the perception structures; and an attention process for determining how procedural knowledge components compete for attention and for calculating a dynamic priority for each competing procedural knowledge component, including the currently executing procedural knowledge component, to determine a highest momentary priority, the attention process allocating the cognitive process to begin or continue execution of the procedural knowledge component having the highest momentary priority.

2. The intelligent agent of claim 1 wherein the instance structure is organized into a number of panels, each panel corresponding to a different aspect of the system, wherein the instance structure is defined according to the system.

3. The intelligent agent of claim 2 wherein each panel comprises a plurality of hypotheses.

4. The intelligent agent of claim 1 wherein the sub-goals must be accomplished to achieve the top-level goal, the top-level goal having a triggering condition for triggering top-level goal and priority formula that is used by the attention process to determine whether the top-level goal competes for attention and begins execution by the cognitive process.

5. The intelligent agent of claim 1 wherein at least one of the task performance structures further includes a sub-structure selected from the group consisting of a sub-structure for performing an action, a sub-structure for suspending operation of the task performance structure until an expected event occurs, and a sub-structure for performing a mental operation.

6. The intelligent agent of claim 1 wherein the dynamic priority of at least one of the procedural knowledge components at a given moment of time is selected from a group consisting of a pre-defined constant value, and a variable value derived from a formula based on information obtained from the instance structure.

7. The intelligent agent of claim 1 wherein each structure is hierarchically organized into an outline having branches.

8. The intelligent agent of claim 7 further comprising an insertion handle at each point of the outline where a new operator may be added, wherein each insertion handle limits the insertion of new operators to the set of all syntactically and semantically appropriate operators for such insertion handle.

9. The intelligent agent of claim 1 further comprising a shell for translating actions and events in the system into an internal representation that is accessible to the intelligent agent, the shell also for translating requests for actions or events in the system from within the intelligent agent into specific actions or events in the system.

10. The intelligent agent of claim 1 further comprising identifiers and links for each symbol placed in a stored model representation by the perceptual and cognitive processes.

11. The intelligent agent of claim 1 wherein the top-level goal and sub-goals have operators to define local variables.

12. An intelligent agent workbench for developing a computer-based intelligent agent capable of performing pre-defined functions on a system either autonomously or in support of a human user of the system, the workbench comprising:

an intelligent agent authoring tool for allowing a workbench user to create and modify an intelligent agent using a graphical language with integrated automatic tools that preclude the entry of syntactically and semantically inappropriate elements into the agent as it is being created or edited by the intelligent agent authoring tool, by identifying a set of syntactically and semantically appropriate options and providing the options to the intelligent agent authoring tool to be displayed as the only possible options to the user;

an execution engine tool for executing a low-level non-graphical representation of the intelligent agent both within the workbench and outside the workbench as a stand-alone intelligent agent that supports the automatic tools that constrain entry to syntactically and semantically appropriate options;

an interpreter tool for automatically translating between the lower-level non-graphical representation of the intelligent agent and the higher-level graphical representation of the intelligent agent; and a user-programmable interface for translating selected actions and events in the system of interest to the intelligent agent into a form that is accessible to the intelligent agent, and for translating selected classes of actions or events into specific actions or events in the system when called by the intelligent agent.

13. The workbench of claim 12 further comprising a test and debug tool for testing and debugging the intelligent agent for correct syntax and semantics as the intelligent agent is being authored by the intelligent agent authoring tool.

14. The workbench of claim 13 wherein at a point of the intelligent agent where a new operator may be added or where an argument of an existing operator may be changed, the test and debug tool identifies a set of all syntactically and semantically appropriate options for the point and passes the identified set to the intelligent agent authoring tool, the intelligent agent authoring tool limiting the workbench user at such point to the identified set.

15. The workbench of claim 13 wherein once an operator has been defined or changed with the intelligent agent authoring tool, the test and debug tool immediately parses and checks the operator for conflicts and errors and reports any such conflicts and errors to the intelligent agent authoring tool.

16. The workbench of claim 12 wherein the intelligent agent includes structures including an instance structure representative of a current problem instance, a plurality of perception knowledge structures, each perception knowledge structure being representative of information that must be perceived from the system, and a plurality of task performance structures, each task performance structure being representative of a task the intelligent agent can be called on to perform, wherein each structure is hierarchically organized, and wherein the intelligent agent authoring tool visually conveys each structure according to the hierarchical organization thereof.

17. The workbench of claim 16 wherein the intelligent agent authoring tool visually conveys each structure as an outline having branches, and wherein the workbench user may selectively expand and hide each branch.

18. The workbench of claim 17 further comprising a test and debug tool for testing and debugging the intelligent agent, wherein at each point of the outline where a new operator may be added, the test and debug tool identifies a set of all syntactically and semantically appropriate operators for the point and passes the identified set to the intelligent agent authoring tool, the intelligent agent authoring tool limiting the workbench user at such point to the identified set.

19. The workbench of claim 18 wherein the intelligent agent authoring tool displays an insertion handle at each point of the outline where a new operator may be added, and wherein the workbench user activates a particular insertion handle to insert an operator thereat, the intelligent agent authoring tool presenting the identified set for the point of the activated insertion handle in response thereto.

20. The workbench of claim 19 wherein once the workbench user selects an operator from the presented identified set, the interfacing agent authoring tool inserts the selected operator at the location of the activated insertion handle and creates insertion handles above and below the inserted operator in the outline.

21. The intelligent agent workbench of claim 9 further comprising a shell for translating actions and events in the system into an internal representation that is accessible to the intelligent agent.

22. A method for employing an intelligent agent workbench to develop a computer-based intelligent agent capable of performing pre-defined functions on a system either autonomously or in support of a human user of the system, the method comprising the steps of:

allowing a workbench user to create and modify an intelligent agent on the workbench by way of an intelligent agent authoring tool using a graphical language with integrated automatic tools that preclude the entry of syntactically and semantically inappropriate elements into the intelligent agent as it is being created or edited by the intelligent agent authoring tool by identifying a set of syntactically and semantically appropriate options and providing the options to the intelligent agent authoring tool to be displayed as the only possible options to the user;

executing a lower-level non-graphical representation of the intelligent agent on the workbench by way of an execution engine tool, the lower-level non-graphical representation of the intelligent agent also being executable outside the workbench as a stand-alone intelligent agent that supports the automatic tools that contrain entry to syntactically and semantically appropriate options;

automatically translating between the lower-level non-graphical representation of the intelligent agent and the higher-level graphical representation of the intelligent agent on the workbench by way of an interpreter tool; and translating selected actions and events in the system of interest to the intelligent agent into a form that is accessible to the intelligent agent and translating selected classes of actions or events into specific actions or events in the system when called by the intelligent agent by way of a user-programmable interface.

23. The method of claim 22 further comprising the step of testing and debugging the intelligent agent on the workbench for correct syntax and semantics as the intelligent agent is being authored, by way of a test and debug tool.

24. The method of claim 23 further comprising the steps of:

identifying, by the test and debug tool, a set of all syntactically and semantically appropriate options for a point of the intelligent agent where a new operator may be added or where an argument of an existing operator may be changed;

passing, by the test and debug tool, the identified set to the intelligent agent authoring tool; and limiting, by the intelligent agent authoring tool, the workbench user at such point to the identified set.

25. The method of claim 23 further comprising the step of immediately parsing and checking an operator for conflicts and errors and reporting any such conflicts and errors to the intelligent agent authoring tool, by the test and debug tool, once such operator has been defined or changed with the intelligent agent authoring tool.

26. The method of claim 22 wherein the intelligent agent includes structures including an instance structure representative of a current problem instance, a plurality of perception knowledge structures, each perception knowledge structure being representative of information that must be perceived from the system, and a plurality of task performance structures, each task performance structure being representative of a task the intelligent agent can be called on to perform, and wherein each structure is hierarchically organized, the method further comprising the step of visually conveying, by the intelligent agent authoring tool, each structure according to the hierarchical organization thereof.

27. The method of claim 26 further comprising the steps of:

visually conveying, by the intelligent agent authoring tool, each structure as an outline having branches; and selectively expanding and hiding, by the workbench user, each branch.

28. The method of claim 22 further comprising the step of testing and debugging the intelligent agent on the workbench by way of a test and debug tool by:

identifying, by the test and debug tool, a set of all syntactically and semantically appropriate operators for a point of the outline where a new operator may be added;

passing, by the test and debug tool, the identified set to the intelligent agent authoring tool; and limiting, by the intelligent agent authoring tool, the workbench user at such point to the identified set.

29. The method of claim 28 further comprising the steps of:

displaying, by the intelligent agent authoring tool, an insertion handle at a point of the outline where a new operator may be added;

activating, by the workbench user, the insertion handle to insert an operator thereat; and presenting, by the intelligent agent authoring tool, the identified set for the point of the activated insertion handle in response thereto.

30. The method of claim 29 further comprising the steps of:

selecting, by the workbench user, an operator from the presented identified set;

inserting, by the interfacing agent authoring tool, the selected operator at the location of the activated insertion handle; and creating, by the interfacing agent authoring tool, insertion handles above and below the inserted operator in the outline.

31. A method for allowing a workbench user to create and modify a software device on a workbench in a higher-level graphical representation, the software device including a hierarchically organized structure, the method comprising the steps of:

visually conveying the hierarchically organized structure as an outline having branches;

displaying an insertion handle at a point of the outline where a new operator is added;

activating, by the workbench user, the insertion handle to insert an operator thereat;

identifying a set of all syntactically and semantically appropriate operators for the insertion handle; and presenting to the workbench user the identified set of appropriate operators, wherein the workbench user is limited to adding an operator from the identified set.

32. The method of claim 31 further comprising the steps of:

selecting, by the workbench user, an operator from the presented identified set;

inserting the selected operator at the location of the activated insertion handle; and creating insertion handles above and below the inserted operator in the outline.

33. A method for developing a computer-based intelligent agent for modeling an interface between a system and a user performing a pre-defined function in connection with the system, the method comprising the steps of:

recording interactions of the user with the system in real time;

taking verbal protocols from the user regarding the user's interactions with the system;

modeling cognitive tasks by identifying for each cognitive task all instances of that task in the recorded interactions and the verbal protocols and analyzing the instances to define a common hierarchy of goals and sub-goals;

in parallel with the cognitive task modeling, modeling a problem representation by analyzing the verbal protocols to identify categories of information that the user used to describe a problem or problem-solving process; and defining perceptual monitors and a task priority structure.

34. The method of claim 33 wherein the definition of hierarchies of goals and subgoals in the modeling of cognitive tasks is performed using a GOMS analysis process.

35. The method of claim 33 further comprising the step of taking additional verbal protocols from the user regarding the user's interactions with the system to refine the intelligent agent.

36. The method of claim 33 wherein the perceptual monitors are defined by analyzing the verbal protocols to determine points at which the user recognizes relevant sensory stimuli.

37. The method of claim 35 wherein the additional verbal protocols are taken to determine knowledge used to select which tasks to perform at which points in time.

* * * * *